United States Patent
Kim et al.

(10) Patent No.: US 10,152,226 B2
(45) Date of Patent: Dec. 11, 2018

(54) PORTABLE DEVICE AND METHOD OF CHANGING SCREEN OF PORTABLE DEVICE

(71) Applicant: Samsung Electronics Co., Ltd., Suwon-si, Gyeonggi-do (KR)

(72) Inventors: Gu-Sul Kim, Seoul (KR); Nam-Hoi Kim, Suwon-si (KR); Hye-Sun Park, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 15/172,807

(22) Filed: Jun. 3, 2016

(65) Prior Publication Data

US 2016/0357323 A1 Dec. 8, 2016

(30) Foreign Application Priority Data

Jun. 8, 2015 (KR) .................. 10-2015-0080689

(51) Int. Cl.
  *G06F 3/0488* (2013.01)
  *G06F 3/0483* (2013.01)
  *G06F 1/16* (2006.01)

(52) U.S. Cl.
  CPC .......... *G06F 3/04883* (2013.01); *G06F 1/165* (2013.01); *G06F 1/1626* (2013.01);
  (Continued)

(58) Field of Classification Search
  None
  See application file for complete search history.

(56) References Cited

U.S. PATENT DOCUMENTS

| 2009/0070711 A1* | 3/2009 | Kwak | G06F 3/0485 715/829 |
| 2010/0117975 A1* | 5/2010 | Cho | G06F 1/1626 345/173 |

(Continued)

FOREIGN PATENT DOCUMENTS

| EP | 2 830 293 A1 | 1/2015 |
| KR | 10-2013-0081550 A | 7/2013 |

(Continued)

OTHER PUBLICATIONS

Craig Villamor et al., Touch Gesture Reference Guide, XP55024104, Apr. 15, 2010 Retrieved from the Internet: URL:http://web.archive.org/web/20100601214053/http://www.lukew.com/touch/TouchGestureGuide.pdf.

*Primary Examiner* — Nicholas Lee
(74) *Attorney, Agent, or Firm* — Jefferson IP Law, LLP

(57) ABSTRACT

A portable device and a screen changing method of a portable device are provided, which display a second screen corresponding to detected successive motions of first and second touches on an edge touch screen that has a main display area, and a first (or left) edge display area and a second (or right) edge display area, each of which is extended from the main display area, and displays a first screen among a plurality of screens. The device and method may further display a second screen different from a first screen among a plurality of screens corresponding to directions of detected successive motions of first and second touches on an edge touch screen that has a main display area, and a first edge display area and a second edge display area, each of which is extended from the main display area, and displays a first screen among a plurality of screens.

19 Claims, 27 Drawing Sheets

(52) U.S. Cl.
CPC .......... *G06F 1/1652* (2013.01); *G06F 3/0483* (2013.01); *G06F 3/0488* (2013.01); *G06F 3/04886* (2013.01); *G06F 2203/0339* (2013.01); *G06F 2203/04102* (2013.01); *G06F 2203/04803* (2013.01); *G06F 2203/04808* (2013.01)

(56) References Cited

U.S. PATENT DOCUMENTS

| | | |
|---|---|---|
| 2013/0033434 A1 | 2/2013 | Richardson et al. |
| 2013/0076649 A1 | 3/2013 | Myers et al. |
| 2013/0254707 A1 | 9/2013 | Lambourne et al. |
| 2013/0300697 A1 | 11/2013 | Kim et al. |
| 2015/0015513 A1 | 1/2015 | Kwak et al. |
| 2015/0138046 A1 | 5/2015 | Moon |
| 2015/0143238 A1 | 5/2015 | Jung et al. |
| 2016/0066440 A1 | 3/2016 | Choi et al. |

FOREIGN PATENT DOCUMENTS

| | | |
|---|---|---|
| KR | 10-2014-0128704 A | 11/2014 |
| KR | 10-2015-0056356 A | 5/2015 |
| KR | 10-1516766 B1 | 5/2015 |
| WO | 2010/077235 A1 | 7/2010 |
| WO | 2013/009888 A1 | 1/2013 |

\* cited by examiner

PORTABLE DEVICE AND METHOD OF CHANGING SCREEN OF PORTABLE DEVICE

CROSS-REFERENCE TO RELATED APPLICATION(S)

This application claims the benefit under 35 U.S.C. § 119(a) of a Korean patent application filed on Jun. 8, 2015 in the Korean Intellectual Property Office and assigned Serial number 10-2015-0080689, the entire disclosure of which is hereby incorporated by reference.

TECHNICAL FIELD

The present disclosure relates to a portable device and a screen changing method of a portable device. More particularly, the present disclosure relates to a portable device for changing a screen, which is displayed by a plurality of touches detected on a touch screen, and a screen changing method of a portable device.

BACKGROUND

Various services and functions which are currently provided by portable devices, have gradually expanded and enable multitasking. To do so, a display of the portable device has become larger and a resolution of the display provides a higher resolution.

The display of the portable device started as a flat display, and has developed to include other shapes such as a bended or contoured display. In some applications, a portable device with a bended display on one side has been provided, as well as a portable device with a bended display on both sides.

This presents a number of problems. For example, in order to move to the last part on a long webpage in the portable device with the bended display on both sides, a touch gesture such as several flicks is required.

The above information is presented as background information only, and to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages, and to provide at least the advantages described below. Accordingly, an aspect of the present disclosure is to provide a portable device for effectively changing a screen displayed by a plurality of touches detected on an edge touch screen, and a method of changing a screen of a portable device.

In accordance with an aspect of the present disclosure, a portable device is provided. The portable device includes an edge touch screen that has a main display area, a left (or first) edge display area and a right (or second) edge display area, each of the left (or first) edge display area and the right (or second) edge display area is extended from the main display area, and each of the main display area, the left (or first) edge display area and the right (or second) edge display area displays a first screen among a plurality of screens, and a controller that controls a display of the first screen and a second screen different from the first screen among the plurality of screens on the edge touch screen in response to successive motions of a first touch detected on the left edge display area and successive motions of a second touch detected on the right edge display area.

In accordance with another aspect of the present disclosure, a method of changing a screen of a portable device is provided. The method includes detecting successive motions of a first touch detected on a first edge display on an edge touch screen that has a main display area, the first (or left) edge display area and a second (or right) edge display area, each of the first (or left) edge display area and the second (or right) edge display area is extended from the main display area, and each of the main display area, the first (or left) edge display area and the second (or right) edge display area displays a first screen among a plurality of screens, detecting successive motions of a second touch detected on the second edge display, and displaying a second screen different from the first screen among the plurality of screens on the edge touch screen in response to at least one of the detected successive motions of the first touch and the detected successive motions of the second touch.

In accordance with another aspect of the present disclosure, a portable device is provided. The portable device includes an edge touch screen that has a main display area, a first (or left) edge display area and a second (or right) edge display area, each of the first (or left) edge display area and the second (or right) edge display area is extended from the main display area, and each of the main display area, the first (or left) edge display area and the second (or right) edge display area displays a first screen among a plurality of screens, and a controller that controls a determined function in accordance with a combination of a direction of successive motions of a first touch detected on the left edge display area and a direction of successive motions of a second touch detected on the right edge display area.

The present disclosure can provide a portable device and a screen changing method of a portable device, which can display a second screen corresponding to detected successive motions of first and second touches on an edge touch screen that has a main display area, and a first (or left) edge display area and a second (or right) edge display area, each of which is extended from the main display area, and displays a first screen among a plurality of screens.

The present disclosure can provide a portable device and a screen changing method of a portable device, which can capture a first screen in response to successive motions up to a main display area of a first touch detected on a first edge display area and successive motions up to the main display area of a second touch detected on a second edge display area on an edge touch screen that has the main display area, and the first (or left) edge display area and the second (or right) edge display area, each of which is extended from the main display area, and displays a first screen among a plurality of screens.

The present disclosure can provide a portable device and a screen changing method of a portable device, which can display a first screen of a first application, which is executed before the execution of a second application, in response to successive motions up to a first edge display area of a first touch detected on a main display area and successive motions up to a second edge display area of a second touch detected on the main display area on an edge touch screen that has the main display area, and the first (or left) edge display area and the second (or right) edge display area, each of which is extended from the main display area, and displays a second screen of a second application.

The present disclosure is not limited thereto and various embodiments of the present disclosure can provide a portable device and a screen changing method of a portable device, which can perform a determined function in accordance with a combination of a direction of successive motions of a first touch detected on a left edge display area and a direction of successive motions of a second touch detected on a right edge display area on an edge touch screen that has the main display area, and the first (or left) edge display area and the second (or right) edge display area, each of which is extended from the main display area, and displays a first screen among a plurality of screens.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
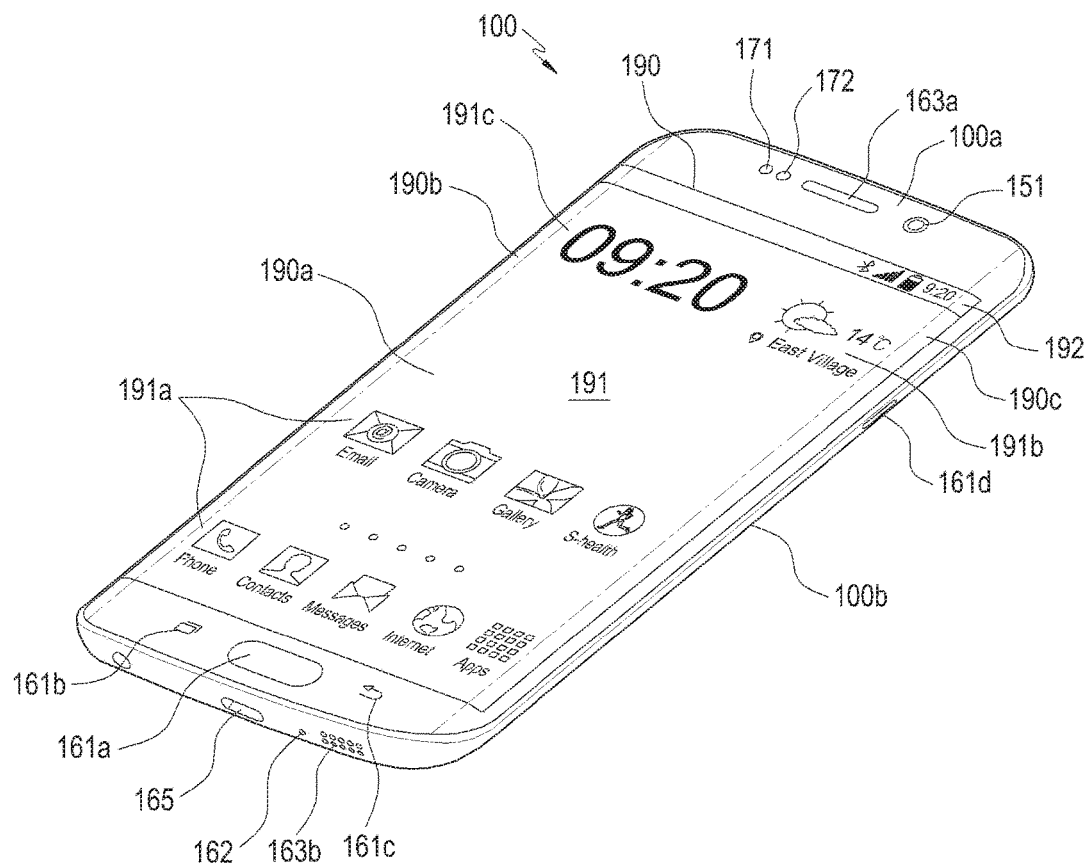
FIG. 1 is front perspective view illustrating a portable device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the spirit and scope of the present disclosure. In addition, descriptions of well-known functions and constructions may be omitted for clarity and conciseness.

The terms and words used in the following description and claims are not limited to the bibliographical meanings, but are merely used to enable a clear and consistent understanding of the present disclosure. Accordingly, it should be apparent to those skilled in the art that the following description of various embodiments of the present disclosure is provided for illustration purpose only, and not for the purpose of limiting the present disclosure as defined by the appended claims and their equivalents.

It is to be understood that the singular forms "a", "an", and "the", include plural referents unless the context clearly dictates otherwise. Thus, for example, reference to "a component surface" includes reference to one or more of such surfaces.

Ordinal terms such as "first" and "second" may be used to describe various elements, but these elements are not limited by the terms. The above terms may be used to distinguish one element from another element. For example, a first element may be named a second element in the scope of protection of the present disclosure. Further, a second element may also be named a first element. As used herein, the term "and/or" includes any and all combinations of one or more disclosed items.

An application implies software which is executed on an operating system (OS) for a computer or a mobile OS, and is used by a user. For example, the application includes a web browser, a photo album application, a word processor, a spread sheet, a contact application, a calendar application, a memo application, an alarm application, a social networking service (SNS) application, a game market, a chatting application, a map application, a music player, or a video player.

The application according to an embodiment of the present disclosure may refer to software executed by a portable device or an external device (for example, a server) connected to the portable device wirelessly or through a wire. Further, the application according to an embodiment of the present disclosure may refer to software executed by the portable device in accordance with a received user input.

Contents may be displayed in the executed application. For example, the contents may include a video file or an audio file reproduced in a video player, which is one of the applications, a music file reproduced in a music player, a photo file displayed in a photo gallery, and a webpage file displayed in a web browser. The contents may include a video file, an audio file, a text file, an image file, or a webpage displayed or executed in the application.

In an embodiment of the present disclosure, the term "video" may be used with the same meaning as a dynamic image. Further, the contents may include a video file, an audio file, a text file, an image file, or a webpage executed in accordance with a received user input (for example, a touch).

The contents may include an application screen and a user interface that configures the application screen. Further, the contents may include one content or a plurality of contents.

A widget refers to a mini application, which is one of the graphical user interfaces (GUIs) that more smoothly support an interaction between the user and the application or OS. For example, the widgets may include a weather widget, a calculator widget, and a clock widget.

In the present disclosure, the terms are used to describe an embodiment, and are not intended to limit and/or restrict the present disclosure. As used herein, the singular forms are intended to include the plural forms as well, unless the context clearly indicates otherwise. In the description, it should be understood that the terms "include" or "have" indicate existence of a feature, a number, an operation, a structural element, parts, or a combination thereof, and do not exclude the existences or probability of addition of one or more other features, numeral, operations, structural elements, parts, or combinations thereof. The same reference numerals represented in each of the drawings indicate elements that perform substantially the same functions.

FIG. 1 is front perspective view illustrating a portable device according to an embodiment of the present disclosure.

Referring to FIG. 1, an edge touch screen 190 is located in a center area of a front surface 100a of a portable device 100. The edge touch screen 190 may refer to a display panel (not shown) which can be bent or contoured. Further, the edge touch screen 190 may include a touch panel (not shown) corresponding to a display panel (not shown). A detailed description of the edge touch screen 190 will be made below.

The edge touch screen 190 may be formed through a thin flexible printed circuit board (not shown) and be curved or bent. The edge touch screen 190 may include a main touch screen 190a and edge touch screens 190b and 190c. In the edge touch screen 190, the main touch screen 190a and the edge touch screens 190b and 190c on both sides may be integrally and/or seamlessly formed.

The edge touch screen 190 may include the main touch screen 190a and may further include one of the left (or first) edge touch screen 190b and the right (or second) edge touch screen 190c.

FIG. 1 illustrates an example where a home screen 191 is displayed on the edge touch screen 190. A plurality of different home screens may be displayed on the edge touch screen 190 of the portable device 100. A short cut icon 191a, a weather widget 191b, and a clock widget 191c corresponding to applications which can be selected by a touch (for example, including hovering) may be displayed on the home screen 191.

A status bar 192 which displays a status of the portable device 100 such as a battery charging status, intensity of a received signal, and a current time may be displayed on an upper portion of the home screen 191. Further, the home screen 191 of the portable device 100 may be located below the status bar 192 or only the home screen 191 may be displayed without the status bar 192.

A first camera 151, a plurality of speakers 163a and 163b, a proximity sensor 171, and an illumination sensor 172 (see FIG. 2) may be located on the upper portion of the front surface 100a of the portable device 100. A second camera 152 (see FIG. 2), and a flash 153 (see FIG. 2) may be located on a rear surface of the portable device 100.

A home button 161a, a recently executed app button 161b, and a back button 161c may be located on a lower portion of the front surface 100a of the portable device 100. The buttons 161a to 161c may be implemented by touch buttons as well as physical buttons. Further, the buttons 161a to 161c may be displayed with text or another icon within the touch screen 190.

A power/lock button 161d and a volume button (not shown) may be located on a side surface 100b of the portable device 100. The side surface 100b of the portable device 100 may be connected to the front surface 100a and the rear surface (not shown) of the portable device 100. The side surface 100b of the portable device 100 may include a left side surface, a right side surface, an upper portion, and a lower portion.

One or more speakers 163a may be located on the upper portion of the portable device 100. A microphone 162, a connector 165 and/or the speaker 163b may be located on the lower portion of the portable device 100. An insertion hole (not shown) into which an input pen 167 (see FIG. 2) having a button (not shown) can be inserted may be located on the lower portion of the portable device 100. The input pen 167 (see FIG. 2) may be stored within the portable device 100 through the insertion hole (not shown) and removed from the portable device 100 to be used.

Figure 2:
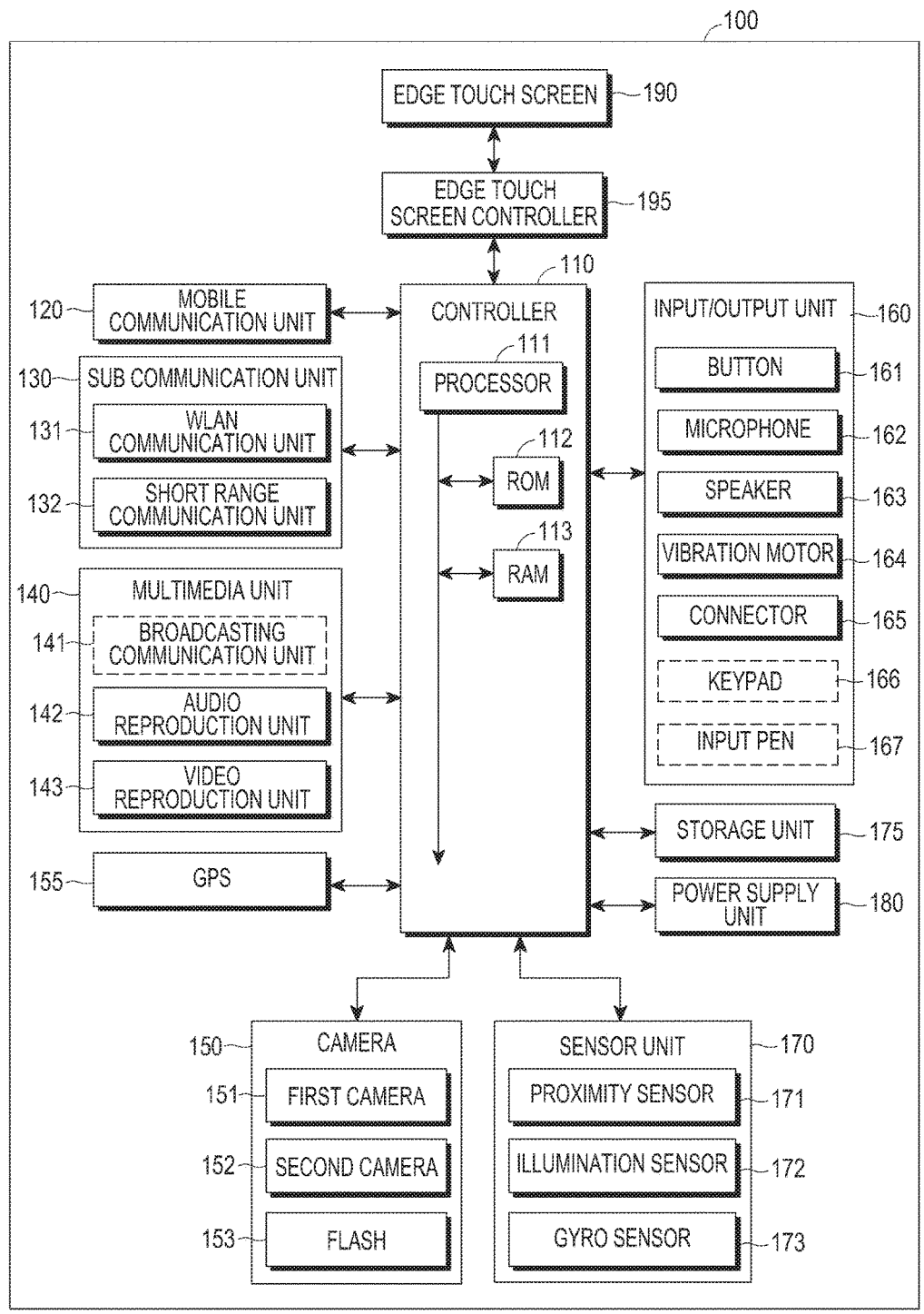
FIG. 2 is a block diagram illustrating a portable device according to an embodiment of the present disclosure.

FIG. 2 is a block diagram illustrating a portable device according to an embodiment of the present disclosure.

Referring to FIG. 2, a portable device 100 may be connected to another device (for example, a wearable device or a server) by using a mobile communication unit 120, a sub communication unit 130, and the connector 165 through a wire or wirelessly. For example, the portable device 100 may include a mobile phone, a smart phone, a tablet device, an MP3 player, a video player, an electronic board, a monitor, an electronic device having a display (for example, a refrigerator, a washing machine, or an air conditioner), or a display device (not shown).

The display device (not shown) may be implemented by an analog television (TV), a digital TV, a three-dimensional (3D)-TV, a smart TV, a light-emitting diode (LED) TV, an organic LED (OLED) TV, a plasma TV, a curved TV having a fixed curvature screen, a flexible TV having a fixed curvature screen, a bended TV having a fixed curvature screen, and/or a curvature variable TV having a screen curvature which can be changed by a received user input, but it may be understood by those skilled in the art that the display device is not limited thereto.

The portable device 100 may transmit or receive data (or contents) by the edge touch screen 190 to or from the outside through the communication unit 120 or the sub communication unit 130. The portable device 100 may also transmit or receive data (or contents) by the input pen 167 and the edge touch screen 190 to or from the outside through the communication unit 120 or the sub communication unit 130. The portable device 100 may also transmit or receive data (or contents) to or from the outside in accordance with an interaction (for example, a touch or a touch gesture) input into the edge touch screen 190. Further, the portable device 100 may also transmit or receive data (or contents) by the display unit (for example, an embodiment in which there is only a display panel without a touch panel) (not shown) to or from the outside through the communication unit 120 or the sub communication unit 130.

The portable device 100 includes a controller 110, the mobile communication unit 120, the sub communication unit 130, a multimedia unit 140, a camera 150, a global positioning system (GPS) 155, an input/output unit 160, a sensor unit 170, a storage unit 175, and a power supply unit 180. Further, the portable device 100 includes the edge touch screen 190 and an edge touch screen controller 195.

The controller 110 may include a processor 111. The controller 110 may further include a read only memory (ROM) 112 which stores a control program for control of the portable device 100, and a random access memory (RAM) 113 which stores signals or data input from the outside of the portable device 100, or is used as a storage region for various tasks performed by the portable device 100.

The controller 110 performs functions of controlling the general operations of the portable device 100 and signal flows between internal elements 120 to 195, and processing data. The controller 110 controls power supply to the internal elements 120 to 195 by using the power supply unit 180. Further, when a user input is received or a preset condition is met, the controller 110 may operate a sensor of the sensor unit 170 or execute an OS or an application stored in the storage unit 175.

The processor 111 may include a graphic processing unit (GPU) (not shown) for graphic processing. The processor 111 may be implemented in a system on chip (SoC) form, including a core (not shown) and the GPU (not shown). TO do so, the processor 111 may include a single core, a dual core, a triple core, a quadruple core, and a core of a multiple thereof. Further, the processor 111, the ROM 112, and the RAM 113 may be connected with each other through a bus or buses.

The controller 110 may control the mobile communication unit 120, the sub communication unit 130, the multimedia unit 140, the camera 150, the GPS 155, the input/output unit 160, the sensor unit 170, the storage unit 175, the power supply unit 180, the touch screen 190, and the touch screen controller 195.

The controller 110 according to an embodiment of the present disclosure also controls an edge touch screen that has a main display area, and a left (or first) edge display area and a right (or second) edge display area, each of which is extended from the main display area, and displays a first screen among a plurality of screens, and controls a display of a second screen different from the first screen among the plurality of screens in response to successive motions of a first touch detected on the left edge display area and successive motions of a second touch detected on the right edge display area.

The controller 110 may control a display of one of an initial screen and a last screen among the plurality of screens on the edge touch screen in accordance with a direction of the successive motions of the first touch and a direction of the successive motions of the second touch.

The controller 110 may control a detection of the direction of the successive motions of the first touch and the direction of the successive motions of the second touch by using one of a route of the successive motions of the touch, an allowable slope, and a setting area.

The controller 110 may also detect a last location of the first touch as one of the main display area and the edge display area.

The controller 110 may also detect a last location of the second touch as one of the main display area and the edge display area.

The controller 110 may also detect a route of the successive motions of the first touch as one of a straight line and a curved line.

The controller 110 may also detect, on the main display area, the last location of the first touch of which the route of the successive motions is the curved line following a curvature of the first edge display area.

The controller 110 may also detect a route of the successive motions of the second touch as one of a straight line and a curved line.

The controller 110 may also detect, on the main display area, the last location of the second touch of which the route of the successive motions is the curved line following a curvature of the first edge display area.

The controller 110 may control a provision of feedback corresponding to at least one of an arrival at the last location of the first touch successively moving, and an arrival at a last location of the second touch successively moving, that includes at least one of visual feedback, audible feedback, and tactile feedback.

The controller 110 may also control a display of a third screen different from the first screen and the second screen among the plurality of screens for a determined time before displaying the second screen different from the first screen among the plurality of screens on the edge touch screen in response to the successive motions of the first touch detected on the left edge display area and the successive motions of the second touch detected on the right edge display area.

When one of the plurality of detected touches successively moves but the other is fixed, the controller 110 may control a display of the second screen different from the first screen among the plurality of screens on the edge touch screen in response to the first touch detected on the left edge display area and the second touch detected on the right edge display area.

When one of the plurality of detected touches successively moves but the other is fixed, the controller 110 may control a display of the first screen and the second screen different from the first screen among the plurality of screens on the edge touch screen in response to the fixing of the first touch detected on the left edge display area and the successive motions of the second touch detected on the right edge display area.

The controller 110 according to another embodiment of the present disclosure may control an edge touch screen that has a main display area, and a left (or first) edge display area and a right (or second) edge display area, each of which is extended from the main display area, and displays a first screen among a plurality of screens, and control a determined function in accordance with a combination of a direction of successive motions of a first touch detected on the left edge display area and a direction of successive motions of a second touch detected on the right edge display area.

The controller 110 may also control a performance of one of a first function for, when the direction of the detected successive motions of the first touch and the direction of the detected successive motions of the second touch in the right edge display area correspond to a first direction, changing the first screen to an initial screen among the plurality of screens, a second function for, when the direction of the detected successive motions of the first touch and the direction of the detected successive motions of the second touch in the right edge display area correspond to a second direction, changing the first screen to a last screen among the plurality of screens, and a third function for, when the direction of the detected successive motions of the first touch and the direction of the detected successive motions of the second touch in the right edge display area correspond to a third direction, capturing the first screen.

The controller 110 according to another embodiment of the present disclosure controls an edge touch screen that has a main display area, and a first (or left) edge display area and a second (or right) edge display area, each of which is extended from the main display area, and displays a first screen among a plurality of screens, and controls a capture of the first screen in response to successive motions up to the main display area of a first touch detected on the first edge display area and successive motions up to the main display area of a second touch detected on the second edge display area.

The controller 110 may also control a provision of a visual feedback in response to the successive motions up to the main display area of the first touch detected on the first edge display area and the successive motions up to the main display area of the second touch detected on the second edge display area.

The controller 110 may also control a provision of a visual feedback for changing the first screen to a reduced screen having a set size at one of the constant velocity and the non-constant velocity and moving the screen to one side.

The controller 110 according to another embodiment of the present disclosure controls an edge touch screen that has a main display area, and a first (or left) edge display area and a second (or right) edge display area, each of which is extended from the main display area, and displays a second screen of a second application, and controls a display of a first screen of a first application, which is executed before the execution of the second application, in response to successive motions up to the first edge display area of a first touch detected on the main display area and successive motions up to the second edge display area of a second touch detected on the main display area.

The controller 110 may also control a display of the first screen of the first application, which is executed before the execution of the second application, in response to arrival at the first edge display area of the successive motions of the first touch detected on the main display area and arrival at the second display area of the successive motions of the second touch detected on the main display area.

The controller 110 may also control a display of the first screen of the first application, which is executed before the execution of the second application, in response to first arrival at the first edge display area of the successive motions of the first touch detected on the main display area and first arrival at the second display area of the successive motions of the second touch detected on the main display area.

The controller 110 according to another embodiment of the present disclosure controls an edge touch screen that has a main display area, and a first (or left) edge display area and a second (or right) edge display area, each of which is extended from the main display area, and displays a first screen and controls a change to a first edge screen displayed on the first edge display area to a third edge screen in response to successive motions up to the main display area of a first touch detected on the first edge display area and a second touch detected on the second edge display area.

The controller 110 may also control a change to a second edge screen displayed on the second edge display area to the first screen in response to the change from the first edge screen displayed on the first edge display area to the third edge screen.

The controller 110 according to another embodiment of the present disclosure controls an edge touch screen that has a main display area, and a first (or left) edge display area and a second (or right) edge display area, each of which is extended from the main display area, and displays a first screen, and controls a change to a first edge screen displayed on the first edge display area to a third edge screen in response to successive motions up to the main display area of a first touch detected on the first edge display area and a second touch detected on the second edge display area.

The controller 110 may also control a change to a second edge screen displayed on the second edge display area to the first screen in response to the change from the first edge screen displayed on the first edge display area to the third edge screen.

The controller 110 according to another embodiment of the present disclosure controls an edge touch screen that has a main display area, and a first (or left) edge display area and a second (or right) edge display area, each of which is extended from the main display area, and displays a first screen, and controls a change of a second edge screen displayed on the second edge display area to a fourth edge screen in response to successive motions up to the main display area of a first touch detected on the second edge display area and a second touch detected on the first edge display area.

The controller 110 may also control a change to a first edge screen displayed on the first edge display area to the second screen in response to the change from the second edge screen displayed on the second edge display area to the fourth edge screen.

The controller 110 according to another embodiment of the present disclosure controls an edge touch screen that has a main display area, and a first (or left) edge display area and a second (or right) edge display area, each of which is extended from the main display area, and displays a first screen, and controls a change to a second edge screen displayed on the second edge display area to a fourth edge screen in response to successive motions up to the main display area of a first touch detected on the second edge display area.

The controller 110 may also control a change to a first edge screen displayed on the first edge display area to the second screen in response to the change from the second edge screen displayed on the second edge display area to the fourth edge screen.

According to an embodiment of the present disclosure, the term "controller" may include the processor 111, the ROM 112, and the RAM 113, or combinations thereof.

The mobile communication unit 120 may be connected to another device (for example, another portable device, a wearable device, or a server) through a mobile communication network by using one or more antennas under a control of the controller 110. The mobile communication unit 120 may receive data (or contents) from another device also under a control of the controller 110. The received data (or contents) may be stored in the storage unit 175 also under a control of the controller 110.

The mobile communication unit 120 may transmit/receive a wireless signal for a voice call, a video call, a short message service (SMS), a multimedia message service (MMS) or data communication to/from a mobile phone (not shown), a smart phone (not shown), a tablet personal computer (PC), or another portable device (not shown) having a connectable phone number.

The sub communication unit 130 may be connected to another device (for example, another portable device, a wearable device, or a server) through a wireless local area network (WLAN) communication unit 131 and/or a short-range communication unit 132 under a control of the controller 110. The sub communication unit 130 may receive data (or contents) from another device also under a control of the controller 110. The received data (or contents) may be stored in the storage unit 175 also under a control of the controller 110.

The WLAN communication unit 131 may be wirelessly connected to an access point (AP) in a place where the AP is installed under a control of the controller 110. The WLAN communication unit 131 may include, for example, Wi-Fi. The WLAN module 131 supports a WLAN standard (IEEE802.11x) of the Institute of Electrical and Electronics Engineers (IEEE). The short-range communication unit 132 may wirelessly perform short-range communication between the portable device 100 and an external device without the AP under a control of the controller 110.

The short-range communication may include Bluetooth, Bluetooth low energy, infrared data association (IrDA), ultra wideband (UWB), and near field communication (NFC).

The portable device 100 may include one of the mobile communication unit 120, the WLAN communication unit 131, and the short-range communication unit 132 or a combination of the mobile communication unit 120, the WLAN communication unit 131, and the short-range communication unit 132 according to a function and/or performance. The portable device 100 may be connected to various external accessories (for example, a wireless speaker or a wireless headset) by using one of the mobile communication unit 120 and the sub communication unit 130.

According to an embodiment of the present disclosure, the term "communication unit" includes the mobile communication unit 120 and/or the sub communication unit 130.

The multimedia unit 140 may receive an external broadcast and reproduce audio data and/or a video under a control of the controller 110. The multimedia unit 140 may include a broadcasting communication unit 141, an audio reproduction unit 142, and/or a video reproduction unit 143.

The broadcasting communication module 141 may receive a broadcasting signal (for example, a TV broadcasting signal, a radio broadcasting signal, or a data broadcasting signal) and broadcasting supplement information (for example, electronic program guide: (EPG) or electronic service guide: (ESG)) output from an external broadcasting station through an antenna (not shown) under a control of the controller 110. Further, the controller 110 may control a reproduction of the received broadcasting signal and the broadcasting supplement information by using a touch screen, a video coder-decoder (CODEC) (not shown), and an audio CODEC (not shown).

The audio reproduction unit 142 may reproduce an audio source (for example, an audio file including file extensions such as Moving Picture Experts Group (MPEG-1 or MPEG-2) audio layer 3 (MP3), windows media audio (WMA), (OGG), or windows wave (WAV)) pre-stored in the storage unit 175 of the portable device 100 or received from the outside under a control of the controller 110.

According to an embodiment of the present disclosure, the audio reproduction unit 142 may reproduce audible feedback corresponding to switching to another screen according to a touch gesture input into the edge touch screen 190. For example, the audio reproduction unit 142 may reproduce the audible feedback (for example, an output of the audio source stored in the storage unit) corresponding to the switching to another screen according to a touch gesture input into the edge touch screen 190 under a control of the controller 110.

According to an embodiment of the present disclosure, the audio reproduction unit 142 may reproduce the audible feedback (for example, the output of the audio source stored in the storage unit) corresponding to a touch or successive motions of the touch detected on the edge touch screen 190 through the audio CODEC under a control of the controller 110.

The video reproduction unit 143 may reproduce a digital video source (for example, a video file including file extensions such as MPEG, MPG, MP4, audio video interleaved (AVI), MOV, or MKV) pre-stored in the storage unit 175 of the portable device 100 or received from the outside by using the video CODEC under a control of the controller 110. A multimedia application, which can be installed in the portable device 100, may reproduce the audio source or the video source by using the audio CODEC and/or the video CODEC. Further, the multimedia application, which can be installed in the portable device 100, may reproduce the video source by using a hardware CODEC (not shown) and/or a software CODEC (not shown).

According to an embodiment of the present disclosure, the video reproduction unit 143 may reproduce visual feedback corresponding to switching to another screen according to a touch gesture input into the edge touch screen 190. For example, the video reproduction unit 143 may reproduce the visual feedback (for example, an output of the video source stored in the storage unit) corresponding to the switching to another screen according to a touch gesture input into the edge touch screen 190 under a control of the controller 110.

It may be easily understood by those skilled in the art that various types of video CODECs and audio CODECs, which can reproduce audio/video files having various file extensions are available.

The multimedia unit 140 may include the audio reproduction unit 142 and the video reproduction unit 143, with or without the broadcasting communication unit 141, in accordance with the performance or structure of the portable device 100. Further, the controller 110 may be implemented to include the audio reproduction unit 142 or the video reproduction unit 143 of the multimedia unit 140.

According to an embodiment of the present disclosure, the term "audio CODEC" may include one or more audio CODECs. According to an embodiment of the present disclosure, the term "video CODEC" may include one or more video CODECs.

The camera 150 may photograph a still image or a video under a control of the controller 110. The camera 150 may include at least one of the first camera 151 on the front surface 100a of the portable device 100 and the second camera 152 on the rear surface (not shown) of the portable device 100. For example, the camera 150 may include one of the first camera 151 and the second camera 152, or both the first camera 151 and the second camera 152. Further, the first camera 151 or the second camera 152 may include an auxiliary light source (for example, a flash 153) providing an amount of light required for photography.

The camera 150 may be implemented to include the first camera 151 on the front surface of the portable device 100 and to further include an additional camera (for example, a third camera (not shown)) adjacent to the first camera 151. For example, an interval between the third camera (not shown) and the first camera 151 may be larger than 30 mm and smaller than 80 mm. When the camera 150 further includes the third camera (not shown), the controller 110 may photograph a three dimensional still image or a three dimensional video by using the first camera 151 and the third camera (not shown).

The camera 150 may be implemented to include the second camera 152 on the rear surface and to further include an additional camera (for example, a fourth camera (not shown)) adjacent to the second camera 152. For example, an interval between the fourth camera (not shown) and the second camera 152 may be larger than 30 mm and smaller than 80 mm. When the camera 150 further includes the fourth camera (not shown), the controller 110 may photograph a three dimensional still image or a three dimensional video by using the second camera 152 and the fourth camera (not shown). Further, the camera 151 or 152 may perform wide angle photographing, telephoto photographing, and close-up photographing by using an additional lens (not shown) attachable to/detachable from a separate adaptor (not shown).

The GPS 155 may periodically receive a signal (for example, orbit information of a GPS satellite, time information of a satellite, and a navigation message) from a plurality of GPS satellites (not shown) on the Earth's orbit. In an outdoor case, the portable device 100 may calculate locations of a plurality of GPS satellites (not shown) and the portable device 100 by using signals received from the plurality of GPS satellites (not shown) and calculate a distance therebetween by using a transmission/reception time difference. A location, time, or movement speed of the portable device 100 may be calculated through triangulation. An additional GPS satellite may be required to compensate for the orbit or time.

In an indoor case where signals are received from the plurality of GPS satellites (not shown) through the GPS 155, the portable device 100 may calculate a location, time, or movement speed of the portable device 100.

In the indoor case where signals are not received from the plurality of GPS satellites (not shown) through the GPS 155, the portable device 100 may detect the location or movement speed of the portable device 100 by using a wireless AP (not shown). The detection of the location of the portable device 100 indoors may use a cell identification (ID) scheme using an ID of a wireless AP, an enhanced cell ID scheme using the ID of the wireless AP and a received signal strength (RSS), or an angle of arrival (AoA) scheme using an angle of a signal transmitted from the AP and received by the portable device 100.

Further, the portable device 100 may detect the location or movement speed of the portable device 100 located indoors by using a wireless beacon (not shown). It is easily understood by those skilled in the art that the indoor location of the portable device 100 can be detected through other various schemes as well as the above schemes.

The input/output unit 160 may include at least one of one or more buttons 161, the microphone 162, a speaker 163, a vibration motor 164, the connector 165, a keypad 166, and the input pen 167.

FIGS. 5A to 5G illustrate screens of a portable device according to an embodiment of the present disclosure.

Figure 5A:
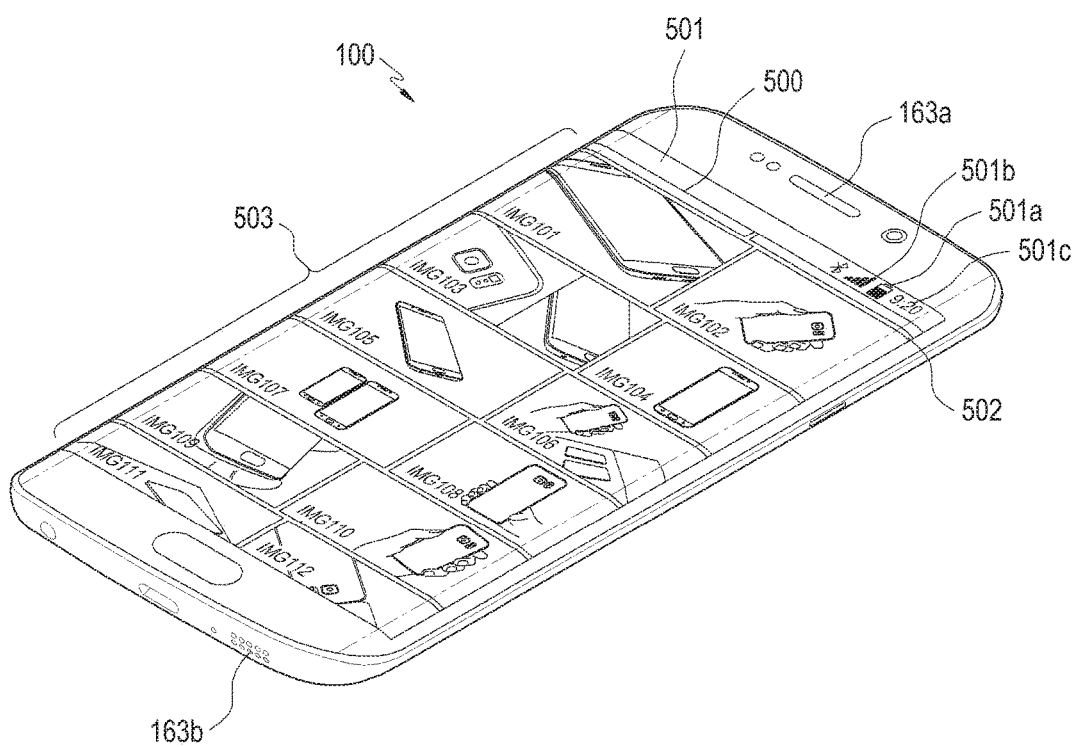
FIGS. 5A to 5G illustrate screens of a portable device according to an embodiment of the present disclosure.

Referring to FIGS. 1, 2 and 5A, the buttons 161 may include the home button 161*a*, the recently executed app button 161*b*, and/or the back button 161*c* located on a lower portion of the front surface 100*a* of the portable device 100. The buttons 161 may also include the power/lock button 161*d* and one or more volume buttons (not shown) located on the side surface 100*b* of the portable device 100. Further, the buttons 161 of the portable device 100 may include only the home button 161*a*, the power/lock button 161*d* and the volume buttons (not shown). The buttons 161 may be implemented by touch buttons as well as physical buttons. Further, the buttons 161 of the portable device 100 may be displayed on the touch screen 190 in a text, image, or icon form. A form, location, function, and name of the buttons 161 illustrated in FIG. 1 are only examples and it is easily understood by those skilled in the art that they are not limited thereto and can be changed, transformed, or modified.

The microphone 162 receives a voice or a sound from the outside and generates an electrical signal under a control of the controller 110. The electrical signal generated by the microphone 162 may be converted by the audio CODEC and stored in the storage unit 175 or output through the speaker 163 under a control of the controller 110. Referring to FIGS. 1 and 2, one or more microphones 162 may be located on the front surface 100*a*, the side surface 100*b*, and/or the rear surface of the portable device 100. Further, one or more microphones may be located on only the side surface 100*b* of the portable device 100.

The speaker 163 may output sounds corresponding to various signals (for example, a wireless signal, a broadcasting signal, an audio source, a video file, and taking a picture) decoded by the audio CODEC under a control of the controller 110.

The speaker 163 may output a sound (for example, a touch control sound corresponding to a phone number input or a button control sound for taking a picture) corresponding to a function performed by the electronic device 100. Referring to FIGS. 1 and 2, one or more speakers 163 may be located on the front surface 100*a*, the side surface 100*b*, and/or the rear surface of the portable device 100. One or more speakers may be located on the front surface 100*a* of the portable device 100. Further, one speaker may be located on each of the front surface and the rear surface of the portable device 100. One speaker 163*a* may be located on the front surface 100*a* of the portable device 100 and a plurality of speakers (not shown) may be located on the rear surface.

A plurality of speakers (not shown) may be located on the side surface 100*b* of the portable device 100. The portable device 100 having an additional speaker (not shown) located on the side surface 100*b* of the portable device 100 may provide the user with a sound effect distinguished from another portable device (not shown) having a speaker located on the front surface 100*a* and the rear surface.

According to an embodiment of the present disclosure, the speaker 163 may output audible feedback corresponding to switching to another screen according to a touch gesture input into the edge touch screen 190. For example, the speaker 163 may output audible feedback corresponding to switching to another screen according to a touch gesture input into the edge touch screen 190 under a control of the controller 110.

The vibration motor 164 may convert an electrical signal into mechanical vibration under a control of the controller 110. The vibration motor 164 may include a linear vibration motor, a bar type vibration motor, a coin type vibration motor, or a piezoelectric element vibration motor. For example, when a voice call request is received from another portable device (not shown), the vibration motor 164 may operate in the portable device 100 in a vibration mode under a control of the controller 110.

One or more vibration motors 164 may be located in the portable device 100. Further, the vibration motor 164 may vibrate the entire portable device 100 or locally vibrate only some portion of the portable device 100.

According to an embodiment of the present disclosure, the vibration motor 164 may output tactile feedback corresponding to switching to another screen according to a touch gesture input into the edge touch screen 190. For example, the vibration motor 164 may output tactile feedback corresponding to switching to another screen according to a touch gesture input into the edge touch screen 190 under a control of the controller 110. Further, the vibration motor 164 may provide various tactile feedbacks (for example, a vibration strength and a vibration duration time) pre-stored or received from the outside based on a control command of the controller 110.

The connector 165 may be used as an interface for connecting the portable device 100 and an external device (not shown) or a power source (not shown). The connector 165 may be located on one of the upper portion, the lower portion, and the side surface of the portable device 100.

The portable device 100 may transmit or receive data (or contents) stored in the storage unit 175 to or from the outside through a wired cable connected to the connector 165 under a control of the controller 110. The portable device 100 may receive power from a power source (not shown) through a wired cable connected to the connector 165 or charge a battery (not shown) under a control of the controller 110. Further, the portable device 100 may be connected to an accessory (for example, a speaker (not shown) and a keyboard dock (not shown)) through the connector 165.

The keypad 166 may receive a key input from the user in order to control the portable device 100. The keypad 166 includes a physical keypad (not shown) formed on the front surface of the portable device 100, a virtual keypad (not shown) displayed within the edge touch screen 190, and a physical keypad (not shown) connectable wirelessly or through a wire. It is easily understood by those skilled in the art that the physical keypad (not shown) formed on the front surface of the portable device 100 may be excluded according to the performance or structure of the portable device 100.

The input pen 167 may touch (or select) an object (for example, a menu, text, image, video, figure, icon, and short cut icon) displayed (or configured) on the edge touch screen 190 or a screen displayed by a writing/drawing application (for example, a memo screen, note pad screen, or a calendar screen).

The input pen 167 may touch or select, as directed by the user, contents (for example, a text file, image file, audio file, video file, or webpage) displayed on the edge touch screen 190 of the portable device 100 or a screen displayed by a writing/drawing application (for example, a memo screen, note pad screen, or a calendar screen).

The input pen 167 may also perform handwriting or drawing (for example, painting or sketching) on a screen of a writing application (for example, a memo screen) or a drawing application (for example, canvas screen) displayed on the edge touch screen 190 of the portable device 100 by the user.

The input pen 167 may touch a touch screen (including the edge touch screen) using a capacitive type, a resistive type, or an electromagnetic resonance (EMR) type technique, or input a character by using a displayed virtual keypad. The input pen 167 may include a stylus pen or a haptic pen (not shown) having a vibrating vibration device (for example, actuator or vibration motor) included therein. Further, the input pen 167 may operate (for example, vibrate) the vibration device in accordance with sensing information detected by a sensor (for example, an acceleration sensor) (not shown) included within the input pen 167 as well as control information received from the portable device 100.

When the input pen 167 is removed from the insertion hole (not shown), the controller 110 may execute the set writing/drawing application and display a screen (not shown) of the writing/drawing application screen on the edge touch screen 190.

The input pen 167 may also include a user's finger (for example, including a thumb). For example, a writing or drawing may be input by the user's finger in an application displayed on a capacitive type touch screen (including a capacitive type edge touch screen) or a resistive type touch screen (including a resistive type edge touch screen).

When the writing or drawing is input by the user's finger in the capacitive type edge touch screen or the resistive type edge touch screen, the controller 110 may detect a touch by one of the fingers including the thumb through the touch screen 190 and the touch screen controller 195.

It is easily understood by those skilled in the art that a shape of the insertion hole (not shown) of the portable device 100 and/or a shape (for example, circular cross section or polygonal cross section) or a structure (for example, including a battery (not shown)) of the input pen 167 can be changed according to the function or structure of the portable device 100.

The sensor unit 170 may detect a status of the portable device 100 and/or a condition around the portable device 100. The sensor unit 170 may include one or more sensors. For example, the sensor unit 170 may include the proximity sensor 171 for detecting whether the user approaches the portable device 100, the illumination sensor 172 for detecting an amount of light around the portable device 100, or a fingerprint sensor 173 for detecting a fingerprint of the user of the portable device 100. Further, the sensor unit 170 may include an acceleration sensor (not shown) for detecting an acceleration of three axes (for example, x axis, y axis, and z axis) applied to the portable device 100, a gravity sensor for detecting an action direction of gravity, or an altimeter for measuring a pressure in the air and detecting an altitude.

The sensor unit 170 may measure each of a motion acceleration and a gravitational acceleration of the portable device 100. When the portable device 100 has no motion, the sensor unit 170 may measure only the gravitational acceleration. Further, the sensor unit 170 may further include a heart rate sensor (not shown) for detecting the user's heartbeat.

At least one sensor included in the sensor unit 170 may detect the status of the portable device 100, generate an electrical signal corresponding to the detection, and transmit the generated signal to the controller 110. It is easily understood by those skilled in the art that the sensors included in the sensor unit 170 can be added, changed, combined or deleted according to the function and performance of the portable device 100.

The storage unit 175 may store signals or data input/output in response to the operations of the mobile communication unit 120, the sub communication unit 130, the multimedia unit 140, the camera 150, the GPS 155, the input/output unit 160, the sensor unit 170, and the touch screen 190, under a control of the controller 110. The storage unit 175 may store a GUI related to a control program for the control of the portable device 100 or the controller 110, an application provided from a manufacturer or downloaded from the outside, images for providing the GUI, user information, documents, databases, or relevant data.

The storage unit 175 according to an embodiment of the present disclosure may store resolution information of the edge touch screen 190, portable device information including size information, wearable device information, or server information. The storage unit 175 may store size information of the main touch screen of the edge touch screen 190, size information of the first (or left) edge touch screen, and size information of the second (or right) edge touch screen. The storage unit 175 may store single curvature information and multi-curvature information of the edge touch screen 190.

FIGS. 7A to 7D illustrate screens of a portable device according to an embodiment of the present disclosure.

FIGS. 8A to 8F illustrate screens of a portable device according to another embodiment of the present disclosure.

Referring to FIGS. 2, 5A to 5G, 7A to 7D and 8A to 8F, the storage unit 175 of the portable device 100 may store first touch location information corresponding to a first touch 510, second touch location information corresponding to a second touch 511, eleventh touch location information corresponding to an eleventh touch 710, twelfth touch location information corresponding to a twelfth touch 711, twenty first touch location information corresponding to a twenty first touch 810, and twenty second touch location information corresponding to a twenty second touch 811.

The storage unit 175 may also store location information of a plurality of touches corresponding to successive motions of the first touch 510, location information of a plurality of touches corresponding to successive motions of the second touch 511, location information of a plurality of touches corresponding to successive motions of the eleventh touch 710, location information of a plurality of touches corresponding to successive motions of the twelfth touch 711, location information of a plurality of touches corresponding to successive motions of the twenty first touch 810, and location information of a plurality of touches corresponding to successive motions of the twenty second touch 811.

The storage unit 175 may also store final location information of the successively moving first touch 510, final location information of the successively moving second touch 511, final location information of the successively moving eleventh touch 710, final location information of the successively moving twelfth touch 711, final location information of the successively moving twenty first touch 810, and final location information of the successively moving twenty second touch 811.

The storage unit 175 may also store allowable slope information, setting area information, and time interval information.

The storage unit 175 may also store a change from a first screen 500 to a second screen 520 or 530, a captured image of the first screen 500, displaying of a previous screen of the first screen 500, user recognizable visual feedback (for example, video source) which is output onto the touch screen 190 in response to a change from a first edge screen 820 to a second edge screen 822, user recognizable audible feedback (for example, sound source) which is output from the speaker 163, and user recognizable tactile feedback (for example, haptic pattern) which is output from the vibration motor 164.

The storage unit 175 may also store a feedback provision time (for example, 500 ms) of the feedback provided to the user.

The term "storage unit" includes the storage unit 175, the ROM 112 and the RAM 113 within the controller 110, or a memory card (not shown) (for example, a micro secure digital (SD) card or a memory stick) installed in the portable device 100. The storage unit may include a nonvolatile memory, a volatile memory, a hard disk drive (HDD), or a solid state drive (SSD).

The power supply unit 180 may supply power to the elements 120 to 195 located within the portable device 100 under a control of the controller 110. The power supply unit 180 may supply power, which is input from an external power source (not shown) through a wired cable (not shown) connected to the connector 165, to each element of the portable device 100 under a control of the controller 110. Further, the power supply unit 180 may supply power to one or more batteries (not shown) and charge the batteries under a control of the controller 110. One or more batteries (not shown) may be located between the touch screen 190 located on the front surface 100a and the rear surface (not shown).

The power supply unit 180 may wirelessly charge one or more batteries (not shown) by using a coil (not shown) under a control of the controller 110 (for example, through a magnetic resonance scheme, an electromagnetic wave scheme, an acoustic scheme, or a magnetic induction scheme).

The edge touch screen 190 includes an edge touch panel (not shown) for receiving a touch input and an edge display panel (not shown) for displaying a screen. The touch screen 190 may provide a GUI corresponding to various services (for example, a voice call, video call, data transmission, broadcast reception, photo shoot, video view, or application execution) to the user. The edge touch screen 190 transmits an analog signal corresponding to a single touch or a multi-touch input through the home screen 191 or the GUI to the edge touch screen controller 195. The touch screen 190 may receive the single touch or the multi-touch through a user's body (for example, fingers including the thumb) or the input pen 167.

Figure 3:
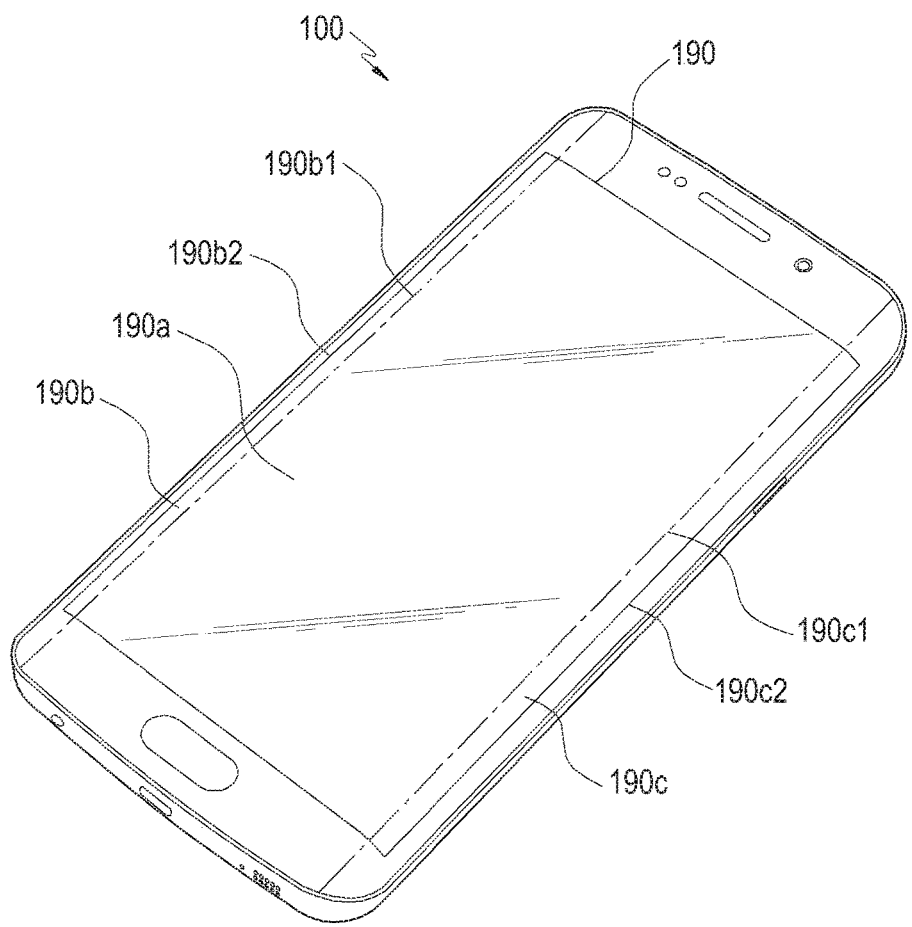
FIG. 3 is front perspective view illustrating an edge touch screen of a portable device according to an embodiment of the present disclosure.

FIG. 3 is front perspective view illustrating a touch screen of a portable device according to an embodiment of the present disclosure.

Referring to FIG. 3, the edge touch screen 190 of the portable device 100 may be an integral touch screen with both sides bended. The edge touch screen 190 may include the main display area 190a and the edge display areas 190b and 190c. The main display area 190a may be flat or have a curvature (for example, approximate to a flat surface) smaller than curvatures of the edge display areas 190b and 190c.

According to an embodiment of the present disclosure, the main touch screen may include a touch screen corresponding to the main display area 190a. Further, the edge touch screen may include a touch screen corresponding to the edge display areas 190b and 190c. The main touch screen area may include a touch screen area corresponding to the main display area 190a. Further, the edge touch screen area may include a touch screen area corresponding to the edge display areas 190b and 190c.

The first edge touch screen may refer to a touch screen corresponding to one edge display area between the edge display areas 190b and 190c. The second edge touch screen may refer to a touch screen corresponding to the other edge display area, which is not the first edge touch screen area, between the edge display areas 190b and 190c. For example, when the first edge touch screen is the touch screen corresponding to the edge display area 190b, the second edge touch screen may be the touch screen corresponding to the edge display area 190c. In contrast, when the first edge touch screen is the touch screen corresponding to the edge display area 190c, the second edge touch screen may be the touch screen corresponding to the edge display area 190b.

The main display area 190a may be separated from the edge display areas 190b and 190c by virtual lines 190b1 and 190c1. The virtual lines 190b1 and 190c1 may refer to lines from which the curvature of the main display area 190a starts being changed. The virtual lines 190b1 and 190c1 may also refer to lines at which the curvature of the main display area 190a is changed to the curvature of the edge display areas 190b and 190c. The virtual lines 190b1 and 190c1 may correspond to lines at which the curvature of the main display area 190a is changed to one of first curvatures of the single curvature and the multi-curvature of the edge display areas 190b and 190c.

The curvature of the edge display areas 190b and 190c may include one of a single curvature and a multi-curvature. In the edge display areas 190b and 190c, the single curvature may refer to the edge display areas 190b and 190c having one curvature. For example, the single curvature is larger than or equal to 13 R and equal to or smaller than 5 R. Cross sections (not shown) of both sides of the portable device including the edge display areas 190b and 190c having the single curvature may include a semicircle or an oval.

In the edge display areas 190b and 190c, the multi-curvature may refer to the edge display areas 190b and 190c having a first curvature corresponding to areas including the virtual lines (including 190b1 and 190c1), which are extended and bended from the main display area 190a, and a second or more curvature corresponding to areas (for example, including edge areas 190b2 and 190c2 of the edge display areas 190*b* and 190*c*) contacted with the bezel of the front surface, the second curvature being different from the first curvature.

For example, the first curvature may be 12 R or 13 R, where R is the radius of a curvature between a front surface and a rear surface of the portable device 100. The first curvature may be larger than or equal to 13 R and equal to or smaller than 5 R. Further, the second curvature may be 6.5 R or 6.9 R. The second curvature may be larger than or equal to 8 R and equal to or smaller than 4 R. Cross sections (not shown) of both sides of the portable device including the edge display areas 190*b* and 190*c* having the multi-curvature may include a semicircle or an oval.

The curvature of the left edge display area 190*b* and the curvature of the right edge display area 190*c* may be different. When the edge display areas 190*b* and 190*c* correspond to the single curvature, the curvature of the left edge display area 190*b* may be, for example, 13 R. Further, the curvature of the right edge display area 190*c* may be 6.5 R.

One of the edge display areas 190*b* and 190*c* may have the single curvature, and the other edge display area may have the multi-curvature. For example, the left edge display area 190*b* may correspond to the single curvature and the right edge display area 190*c* may correspond to the multi-curvature. The single curvature of the left edge display area 190*b* may be 13 R, and the first curvature of the right edge display area 190*c* may be 12 R and the second curvature of the right edge display area 190*c* may be 6.5 R.

In an embodiment of the present disclosure, the single curvature value and/or the multi-curvature value are only examples and the present disclosure is not limited thereto. It is easily understood by those skilled in the art that the single curvature value and/or the multi-curvature value can be changed.

The edge display panel (not shown) includes a plurality of pixels and displays an image through the pixels. For example, the edge display panel (not shown) may include a liquid crystal display (LCD), an LED, or an OLED. The edge display panel (not shown) may display various operation states of the portable device 100, and various images and a plurality of objects according to an application or service execution.

According to an embodiment of the present disclosure, a touch is not limited to a contact between the touch screen 190 and a user's body or the input pen 167, and also includes a non-contact gesture. For example, the non-contact gesture may include hovering having an interval between the touch screen 190 and the user's body or the input pen 167, which is equal to or smaller than 50 mm. It is easily understood by those skilled in the art that a non-contact interval, which can be detected by the edge touch screen 190, can be changed according to the performance or the structure of the portable device 100.

The edge touch screen 190 may be implemented in, for example, a resistive type, a capacitive type, an infrared type, or an acoustic wave type.

The edge touch screen 190 may include an EMR type. The edge touch screen of the electromagnetic tolerance (EMT) type may further include a separate edge touch panel (not shown) of the EMR type for receiving an input of an input pen (not shown) having a resonant circuit that resonates in a loop coil of the EMR type.

The edge touch screen 190 according to an embodiment of the present disclosure may output visual feedback corresponding to switching to another screen in response to a touch gesture input into the edge touch screen 190. The edge touch screen 190 may display visual feedback corresponding to contents changed in accordance with switching to another screen in response to a touch gesture input into the edge touch screen 190 under a control of the controller 110.

According to an embodiment of the present disclosure, a display unit may include the edge touch screen 190.

The edge touch screen controller 195 converts an analog signal corresponding to a single touch or a multi-touch received from the touch screen 190 into a digital signal and transmits the converted digital signal to the controller 110. The controller 110 may calculate an X coordinate and a Y coordinate (and a Z coordinate in the case of a non-contact gesture) corresponding to a touch location of the touch input into the edge touch screen 190 based on the digital signal received from the edge touch screen controller 195.

The controller 110 may control the edge touch screen 190 by using the digital signal received from the edge touch screen controller 195. For example, the controller 110 may display a short cut icon displayed on the edge touch screen 190 in response to the input touch to be distinguished from other short cut icons or execute an application (for example, a phone call) corresponding to the selected short cut icon and display an application screen on the edge touch screen 190.

The edge touch screen controller 195 may be implemented by one edge touch screen controller or a plurality of edge touch screen controllers. The edge touch screen controller 195 may be included in the controller 110 according to the performance or the structure of the portable device 100.

Separately from the analog signal corresponding to the single touch or the multi-touch received from the edge touch screen 190, the edge touch screen controller 195 may convert an analog signal corresponding to a touch received from the edge touch screen 190 of the EMR type into a digital signal and transmits the converted digital signal to the controller 110. The controller 110 may calculate an X coordinate and a Y coordinate corresponding to a touch location on the edge touch screen of the EMR type based on the digital signal received from the edge touch screen controller 195. Further, the edge touch screen of the EMR type may use an edge touch screen controller of the EMR type (not shown).

Although the portable device 100 illustrated in FIGS. 1 to 3 includes one edge touch screen, the portable device 100 may include a plurality of edge touch screens. Each edge touch screen may be located in each housing (not shown) and each housing (not shown) may be connected to each other by one or a plurality of hinges (not shown).

A plurality of edge touch screens disposed on the top/bottom or the left/right may also be located on the front surface of one housing (not shown). The plurality of edge touch screens may be implemented by one edge display panel and a plurality of edge touch panels. The plurality of edge touch screens may be implemented by one edge touch panel corresponding to a plurality of edge display panels. Further, the plurality of edge touch screens may be implemented by a plurality of edge touch panels corresponding to a plurality of edge display panels.

It is easily understood by those skilled in the art that at least one element can be added to or deleted or changed from the elements of the portable device 100 illustrated in FIGS. 1 to 3 according to the performance of the portable device 100.

Figure 4A:
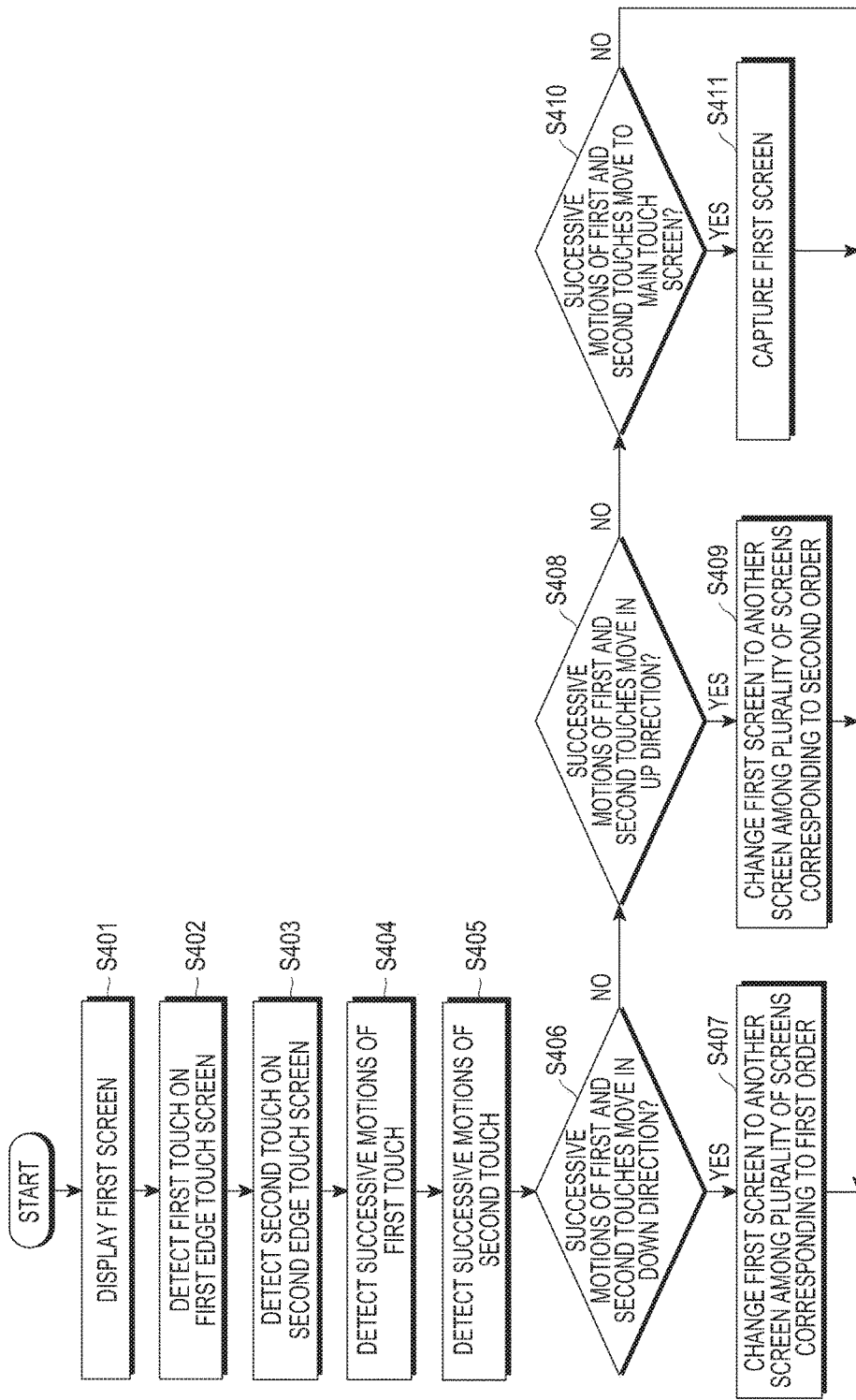
FIG. 4A is a flowchart illustrating a screen changing method of a portable device according to an embodiment of the present disclosure.

FIG. 4A is a flowchart illustrating a screen changing method of a portable device according to an embodiment of the present disclosure.

In operation S401 of FIG. 4A, a first screen is displayed on the edge touch screen.

Referring to FIG. 5A, a first screen 500 and a status bar 501 may be displayed on the edge touch screen 190 of the portable device 100. The first screen 500 may include a display area 502. The status bar 501 may include a charging state 501a of the battery, a strength 501b of a received signal of the mobile phone, or a time 501c. It is easily understood by those skilled in the art that the items displayed on the status bar 501 are not limited to those shown, and various items related to the status of the portable device 100 can be included.

The first screen 500 may display a title bar (not shown) for showing a name of a first application (for example, a web browser) executed in the portable device 100 and one or more images 503 displayed through the application (for example, a webpage of the web browser).

The first screen 500 may include the one or more images 503 (for example, image data (IMG) 101 to IMG 112) provided by the application (for example, the web browser), one or more folders (not shown) for storing one or more images, and/or tabs (not shown) for classifying one or more images to be distinguished from each other.

When a friend list (not shown) or a time line (not shown) provided by a messenger program (not shown), which is one of the applications is longer than a length (horizontal length or vertical length) of the edge touch screen 190, the friend list (not shown) or the time line (not shown) may be provided through a plurality of screens.

When a page (not shown) provided by a word processor (not shown), a spread sheet program (not shown), and/or a presentation program (not shown) which is one of the applications is longer than the length (horizontal length or vertical length) of the edge touch screen 190, the page (not shown) may be provided through a plurality of screens.

When a time line (not shown) provided by a SNS application which is one of the applications is longer than the length (horizontal length or vertical length) of the edge touch screen 190, the time line (not shown) may be provided through a plurality of screens. It is easily understood by those skilled in art that applications providing a plurality of screens are not limited to the above described applications, and can be variously changed.

In the web browser, which is one of the applications, the number of screens provided by the application (for example, the web browser) may be changed according to the number of images 503 displayed in the display area 502 of the first screen 500, the number of folders (not shown), and/or the number of tabs. For example, when the number of all images 503 is 100 and the number of images displayed on one screen is 10, a total number of screens provided by the application may be 10. When the number of all images 503 is 500 and the number of images displayed on one screen is 20, a total number of screens provided by the application may be 25. When the title bar is not displayed as illustrated in FIG. 5A, the first screen 500 may mean the display area 502.

The status bar 501 may not be displayed on the edge touch screen 190 according to the OS of the portable device 100 or the application. For example, when the status bar 501 is not displayed, the edge touch screen 190 may display only the display area 502.

The first screen 500 may be displayed in the main display area 190a and the edge display areas 190b and 190c of the edge touch screen 190. Some of the first screen 500 (for example, an upper area, a lower area, a left area, and a right area) may be displayed in the edge display areas 190b and 190c having a preset first curvature. Some of the first screen 500 (for example, the upper area, the lower area, the left area, and the right area) may be displayed in the edge display areas 190b and 190c having a preset multi-curvature. Some of the first screen 500 (for example, the upper area, the lower area, the left area, and the right area) may be displayed in the edge display areas 190b and 190c having the single curvature and the multi-curvature, respectively.

Some of the first screen 500 (for example, the upper area, the lower area, the left area, and the right area) may be displayed to be spaced apart from the edge areas 190b2 and 190c2 of the edge display areas 190b and 190c (for example, by 3 mm or less).

In operation S402 of FIG. 4A, a first touch is detected on the first edge touch screen.

Figure 5B:
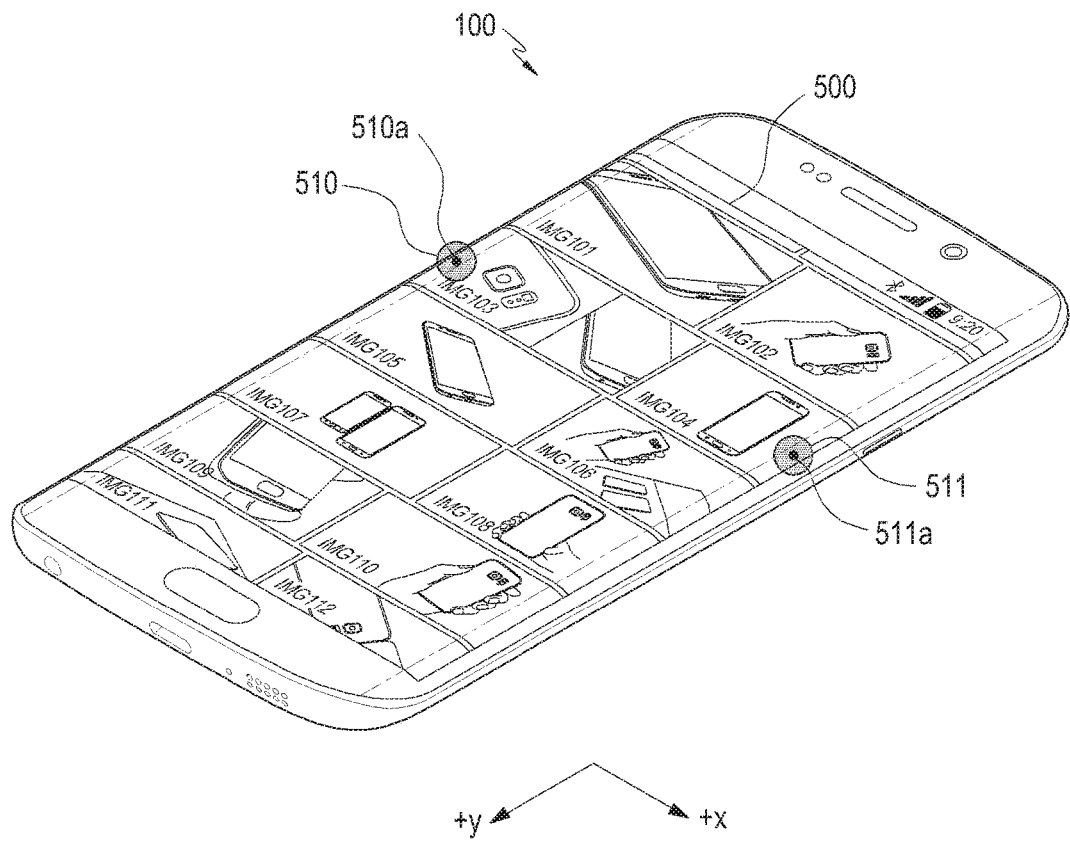

Referring to FIG. 5B, the user conducts the first touch 510 on the edge touch screen 190. The controller 110 may detect the first touch 510 by using the edge touch screen 190 and the edge touch screen controller 195. Further, the controller 110 may detect the first touch 510 by using the first (or left) edge touch screen 190b and the edge touch screen controller 195. The controller 110 may calculate a first touch location 510a (for example, X1 and Y1 coordinates) corresponding to the first touch 510 by using an electrical signal received from the edge touch screen controller 195.

The controller 110 may store first touch location information corresponding to the first touch location 510a in the storage unit 175. The stored first touch location information may include a touch identifier (ID), a touch location, a touch detection time, or touch information (for example, a touch pressure, touch direction, and touch duration time, and the like) for history management.

The first touch 510 detected on the edge touch screen 190 or the first edge touch screen 190b may be generated by a touch of, for example, one of the fingers including the thumb or the touch input pen 167. Further, the first touch 510 may be generated by one hand of either the left hand or the right hand.

According to another embodiment of the present disclosure, the number of touches detected on the edge touch screen 190 or the first edge touch screen 190b is not limited to one and a plurality of touches can be detected. When a plurality of touches are detected on the edge touch screen 190 or the first edge touch screen 190b, the controller 110 may store a plurality of touch locations corresponding to the plurality of touches and a plurality of pieces of touch location information in the storage unit 175. The first edge touch screen 190b or the number of touches detectable on the edge touch screen 190 can be easily understood by those skilled in the art.

In operation S403 of FIG. 4A, a second touch is detected on the second edge touch screen.

Referring to FIG. 5B, the user conducts the second touch 511 on the edge touch screen 190. The controller 110 may detect the second touch 511 by using the edge touch screen 190 and the edge touch screen controller 195. The controller 110 may detect the second touch 511 by using the second (or right) edge touch screen 190c and the edge touch screen controller 195. The controller 110 may calculate a second touch location 511a (for example, X2 and Y2 coordinates) corresponding to the second touch 511 by using an electrical signal received from the edge touch screen controller 195.

The controller 110 may store second touch location information corresponding to the second touch location 511a in the storage unit 175. The stored second touch location information may include a touch ID, a touch location, a touch detection time, or touch information (for example, a touch pressure, touch direction, and touch duration time, and the like) for history management.

The second touch 511 detected (for example, contacted or hovered) on the edge touch screen 190 or the second edge touch screen 190c may be generated by a touch of, for example, one of the fingers including the thumb or the touch input pen 167.

Further, the second touch 511 may be generated by the other hand except for the one hand of the left hand or the right hand corresponding to the first touch 510. For example, when the first touch 510 is generated by the left hand, the second touch 511 may be generated by the right hand. When the first touch 510 is generated by the right hand, the second touch 511 may be generated by the left hand.

According to another embodiment of the present disclosure, the number of touches detected on the edge touch screen 190 or the second edge touch screen 190c is not limited to one and a plurality of touches can be detected. When a plurality of touches are detected on the edge touch screen 190 or the second edge touch screen 190c, the controller 110 may store a plurality of touch locations corresponding to the plurality of touches and a plurality of pieces of touch location information in the storage unit 175. The number of touches detectable on the edge touch screen 190 or the second edge touch screen 190c can be easily understood by those skilled in the art.

In operation S404 of FIG. 4A, successive motions of the first touch are detected.

Figure 5C:
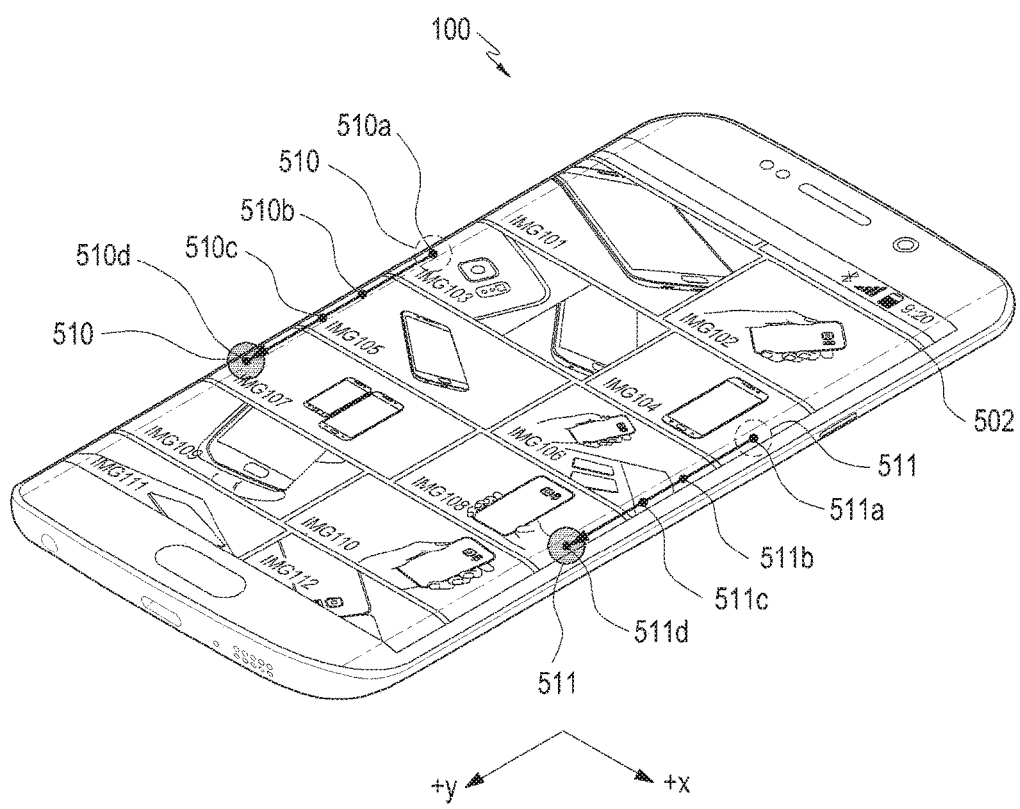

Referring to FIG. 5C, the controller 110 may detect (or calculate) successive motions (for example, a plurality of X and Y coordinates corresponding to the successive touches) of the first touch 510 by using the first edge touch screen 190b and the edge touch screen controller 195. The successive motions of the first touch 510 may be stored in the storage unit 175 under a control of the controller 110. The number of touches contacted on the first edge touch screen 190b may be singular or plural.

The successive motions (for example, a movement from a first location 510a to a second location 510b, from the second location 510b to a third location 510c, and from the third location 510c to a last location 510d) of the first touch 510 may refer to a first touch gesture detected on the first edge touch screen 190b. The successive motions (for example, the movement from the first location 510a to the last location 510d) of the first touch 510 may refer to the first touch gesture detected on the first edge touch screen 190b in a down direction (for example, +y axis direction).

The successive motions (for example, the movement from the first location 510a to the last location 510d) of the first touch 510 may mean that the contact between the first edge touch screen 190b and the first touch 510 is continuously maintained. Further, in the successive motions of the first touch 510, the contact on the first edge touch screen 190b may be touch-released at the last location 510d.

The successive motions (for example, a movement from the first location 510a to the last location 510d) of the first touch 510 may refer to the first touch gesture detected from the first edge touch screen 190b to the main touch screen 190a. The successive motions (for example, the movement from the first location 510a to the last location 510d) of the first touch 510 may mean that the contact of the first touch 510 from the first edge touch screen 190b to the main touch screen 190a is continuously maintained. Further, in the successive motions of the first touch 510, the contact on the main touch screen 190a may be touch-released at the last location 510d.

In an embodiment of the present disclosure, there may be a plurality of touches included in the "successive motions of the touch", however the above described four touch locations are only an embodiment and the present disclosure is not limited thereto. It is easily understood by those skilled in the art that the number of touches included in the successive motions of the touch can be changed.

Referring to FIG. 5C, the successive motions of the first touch 510 in a down direction from the first edge touch screen 190b may include a drag, drag & drop, flick, or swipe. Further, the successive motions of the first touch 510 in a down direction from the first edge touch screen 190b to the main touch screen 190a may include a drag, drag & drop, flick, or swipe.

In operation S405 of FIG. 4A, successive motions of the second touch are detected.

Referring to FIG. 5C, the controller 110 may detect (or calculate) successive motions (for example, a plurality of X and Y coordinates corresponding to the successive touches) of the second touch 511 by using the second edge touch screen 190c and the edge touch screen controller 195. The successive motions of the second touch 511 may be stored in the storage unit 175 under a control of the controller 110. The number of touches contacted on the second edge touch screen 190c may be singular or plural.

The successive motions (for example, a movement from a first location 511a to a second location 511b, from the second location 511b to a third location 511c, and from the third location 511c to a last location 511d) of the second touch 511 may refer to a second touch gesture detected on the second edge touch screen 190c. The successive motions (for example, the movement from the first location 511a to the last location 511d) of the second touch 511 may refer to the second touch gesture detected on the second edge touch screen 190c in a down direction (for example, y axis direction).

The successive motions (for example, the movement from the first location 511a to the last location 511d) of the second touch 511 may mean that the contact between the second edge touch screen 190c and the second touch 511 is continuously maintained. Further, in the successive motions of the second touch 511, the contact on the second edge touch screen 190c may be touch-released at the last location 511d.

The successive motions (for example, a movement from the first location 511a to the last location 511d) of the second touch 511 may refer to the second touch gesture detected from the second edge touch screen 190c to the main touch screen 190a. The successive motions (for example, the movement from the first location 511a to the last location 511d) of the second touch 511 may mean that the contact of the second touch 510 from the second edge touch screen 190c to the main touch screen 190a is continuously maintained. Further, in the successive motions of the second touch 511, the contact on the main touch screen 190a may be touch-released at the last location 511d.

In an embodiment of the present disclosure, there may be a plurality of touches included in the "successive motions of the touch", however the above described four touch locations are only an embodiment and the present disclosure is not limited thereto. It is easily understood by those skilled in the art that the number of touches included in the successive motions of the touch can be changed.

Referring to FIG. 5C, the successive motions of the second touch 511 in a down direction from the second edge touch screen 190c may include a drag, drag & drop, flick, or swipe. Further, the successive motions of the second touch 511 in a down direction from the second edge touch screen 190c to the main touch screen 190a may include a drag, drag & drop, flick, or swipe.

In operation S406 of FIG. 4A, successive motions of the first and/or second touch moving in a down direction are detected.

Referring to FIG. 5C, the first touch 510 successively moving in a down direction (for example, y axis direction) may arrive at the last location 510d from the first location 510a. The controller 110 may calculate the last location 510d of the first touch 510 moving in the down direction on the first edge touch screen 190b by using the edge touch screen controller 195 and the storage unit.

The last location of the first touch 510 successively moving in the down direction may be different according to a route and/or a movement distance of the successive motions of the first touch 510. For example, the last location of the first touch 510 successively moving in the down direction may be one of 510b, 510c, and 510d included along the route of the successive motions of the first touch 510. Further, when the movement distance of the successive motions of the first touch 510 is short, the last location of the first touch 510 successively moving in the down direction may be the location 510b. When the movement distance of the successive motions of the first touch 510 is long, the last location of the first touch 510 successively moving in the down direction may be the location 510d or 510c.

The controller 110 may detect the successive motions of the first touch 510 in the down direction by using an allowable slope range (not shown). The controller 110 may calculate a slope of a straight line connecting the first location 510a and the last location 510b, 510c, or 510d, of the first touch 510.

When a horizontal direction and a vertical direction of the portable device 100 correspond to an x axis direction and a y axis direction, respectively, the allowable slope range of the successive motions of the first touch 510 in the down direction may refer to an area between an extension line from the first location 510a corresponding to a slope of +45 degrees in a +x axis direction based on the y axis, and an extension line corresponding to a slope of −45 degrees in an x axis direction. A slope of −45 degrees in a −x axis direction may be limited by the edge area 190b2. The allowable slope range may be equal to or smaller than ±5 degrees, equal to or smaller than ±15 degrees, equal to or smaller than ±25 degrees, equal to or smaller than ±35 degrees, or equal to or smaller than ±65 degrees, but embodiments are not limited thereto.

The storage unit 175 may store allowable slope information corresponding to the allowable slope range under a control of the controller 110.

It is easily understood by those skilled in the art that the allowable slope range can be changed in accordance with the horizontal length and/or the vertical length of the first edge touch screen 190b. Further, it is easily understood by those skilled in the art that the allowable slope range can be changed in accordance with the horizontal length of the first edge touch screen 190b and the main touch screen 190a and/or the vertical length of the first edge touch screen 190b and the main touch screen 190a.

In an embodiment of the present disclosure, the last location of the first touch 510 successively moving in the down direction may be in an area within the allowable slope range.

The controller 110 may detect the successive motions of the first touch 510 in the down direction by using a setting area (not shown). The setting area may refer to a semicircle with a radius of 3 cm having the first location 510a of the first touch 510 as the center in a y axis direction. The semicircle with the radius of 3 cm in a −x axis direction may be limited by the edge area 190b2. The radius of the setting area may be equal to or smaller than 1 cm, equal to or smaller than 2 cm, equal to or smaller than 3 cm, equal to or smaller than 4 cm, or equal to or smaller than 5 cm, but embodiments are not limited thereto.

The storage unit 175 may store setting area information corresponding to the setting area under a control of the controller 110.

It is easily understood by those skilled in the art that the setting area can be changed in accordance with the horizontal length (for example, y axis direction) and/or the vertical direction (for example, x axis direction) of the first edge touch screen 190b. Further, it is easily understood by those skilled in the art that the setting area can be changed in accordance with the horizontal length of the first edge touch screen 190b and the main touch screen 190a and/or the vertical length of the first edge touch screen 190b and the main touch screen 190a.

In an embodiment of the present disclosure, the last location of the first touch 510 successively moving in the down direction may be within the setting area. The route from the first location 510a to the last location of the first touch 510 successively moving in the down direction may pass through the setting area.

The controller 110 may detect the successive motions of the first touch 510 in the down direction based on a combination of an time interval as well as the allowable slope range and the setting area. For example, the controller 110 may detect the successive motions of the first touch 510 in the down direction by using a combination of the allowable slope range and the time interval and a combination of the setting area and the time interval.

The time interval may refer to an interval between the time of the first location 510a of the first touch 510 and the time of the last location 510d. For example, the time interval may be equal to or smaller than 500 ms. The time interval may be equal to or smaller than 100 ms, equal to or smaller than 200 ms, equal to or smaller than 300 ms, equal to or smaller than 500 ms, equal to or smaller than 700 ms, or equal to or smaller than 1000 ms, but embodiments are not limited thereto.

The storage unit 175 may store time interval information corresponding to the combination of the allowable slope range and the time interval, and the combination of the setting area and the time interval, under a control of the controller 110.

In an embodiment of the present disclosure, the last location of the first touch 510 successively moving in the down direction may be in an area within the allowable slope range within the time interval.

In an embodiment of the present disclosure, the last location of the first touch 510 successively moving in the down direction may be within the setting area within the time interval. Further, the route from the first location 510a to the last location of the first touch 510 successively moving in the down direction may pass through the setting area within the time interval.

Referring to FIG. 5C, the second touch 511 successively moving in the down direction (for example, y axis direction) may arrive at the last location 511d from the first location 511a. The controller 110 may calculate the last location 511d of the second touch 511 moving in the down direction on the second edge touch screen 190c by using the edge touch screen controller 195 and the storage unit 175.

The last location of the second touch 511 successively moving in the down direction may be different according to a route and/or a movement distance of the successive motions of the second touch 511. For example, the last location of the second touch 511 successively moving in the down direction may be one of 511b, 511c, and 511d, included along the route of the successive motions of the second touch 511. Further, when the movement distance of the successive motions of the second touch 511 is short, the last location of the second touch 511 successively moving in the down direction may be the location 511b. When the movement distance of the successive motions of the second touch 511 is long, the last location of the second touch 511 successively moving in the down direction may be the location 511d or 511c.

The controller 110 may detect the successive motions of the second touch 511 in the down direction by using an allowable slope range. The controller 110 may calculate a slope of a straight line connecting the first location 511a and the last location 511b, 511c, or 511d of the second touch 511.

Since the detection of the successive motions of the second touch 511 in the down direction using the allowable slope range in operation S406 of FIG. 4A is substantially similar (for example, a touch difference) to the detection of the successive motions of the first touch 510 in the down direction using the allowable slope range, a duplicate description will be omitted.

In an embodiment of the present disclosure, the last location of the second touch 511 successively moving in the down direction may be in an area within the allowable slope range.

The controller 110 may detect the successive motions of the second touch 511 in the down direction by using the setting area. The setting area may refer to a semicircle with a radius of 3 cm having the first location 510a of the first touch 510 as the center in a y axis direction.

Since the detection of the successive motions of the second touch 511 in the down direction using the setting area in operation S406 of FIG. 4A is substantially similar (for example, a touch difference) to the detection of the successive motions of the first touch 510 in the down direction using the setting area, a duplicate description will be omitted.

In an embodiment of the present disclosure, the last location of the second touch 511 successively moving in the down direction may be within the setting area. The route from the first location 511a to the last location of the second touch 511 successively moving in the down direction may pass through the setting area.

The controller 110 may detect the successive motions of the second touch 511 in the down direction based on a combination of a time interval as well as the allowable slope range and the setting area. For example, the controller 110 may detect the successive motions of the second touch 511 in the down direction by using a combination of the allowable slope range and the time interval, and a combination of the setting area and the time interval.

The time interval may refer to an interval between the time of the first location 511a of the second touch 511, and the time of the last location 511d. For example, the time interval may be equal to or smaller than 500 ms. The time interval may be equal to or smaller than 200 ms, equal to or smaller than 300 ms, equal to or smaller than 500 ms, equal to or smaller than 700 ms, or equal to or smaller than 1000 ms, but embodiments are not limited thereto.

In an embodiment of the present disclosure, the last location of the second touch 511 successively moving in the down direction may be in an area within the allowable slope range within the time interval.

In an embodiment of the present disclosure, the last location of the second touch 511 successively moving in the down direction may be within the setting area within the time interval. Further, the route from the first location 511a to the last location of the second touch 511 successively moving in the down direction may pass through the setting area within the time interval.

Figure 5D:
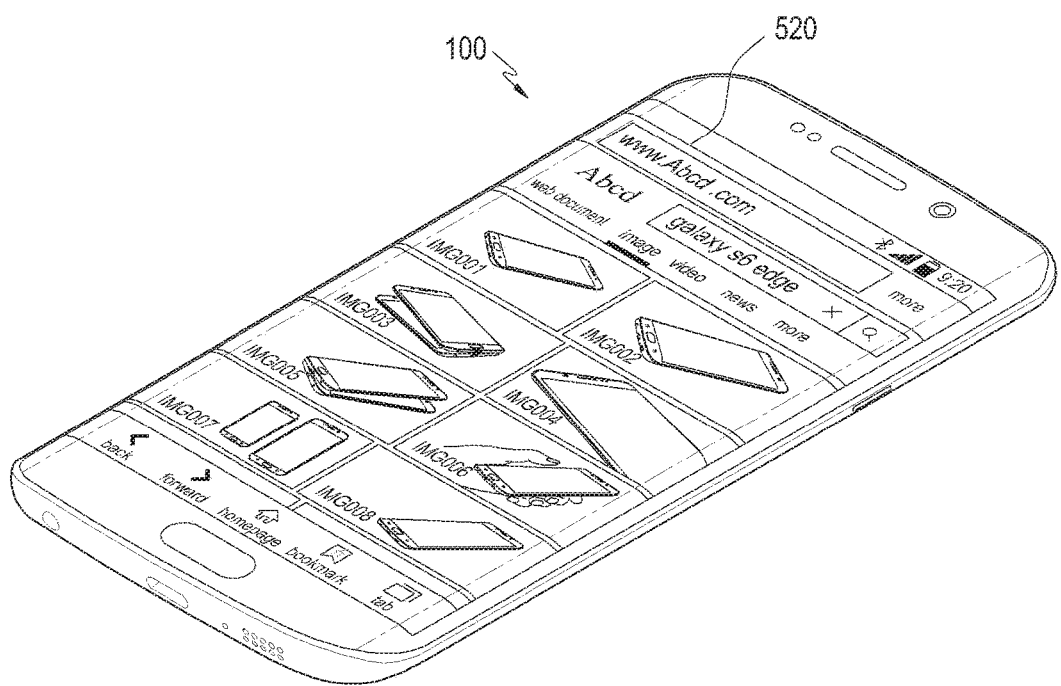
Figure 5E:
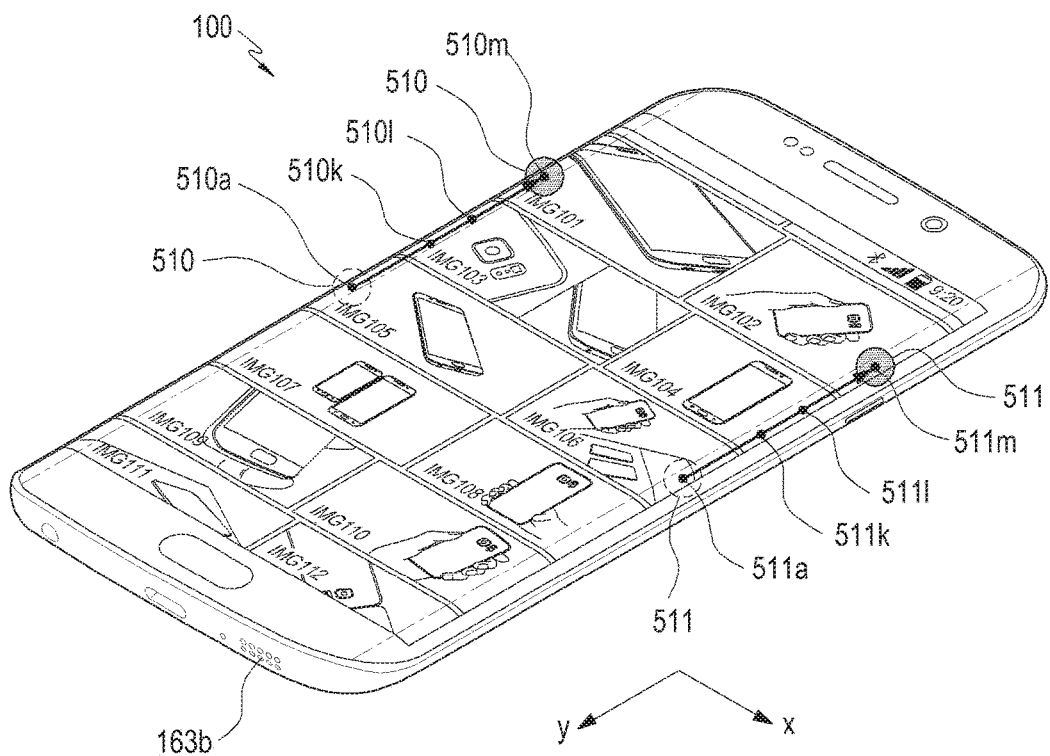
Figure 5F:
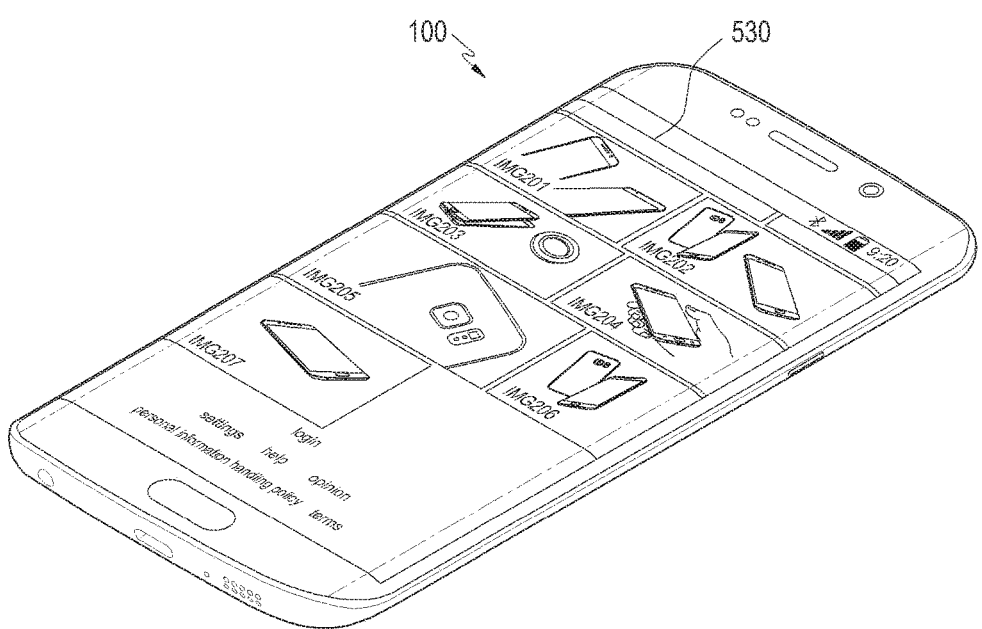
Figure 5G:
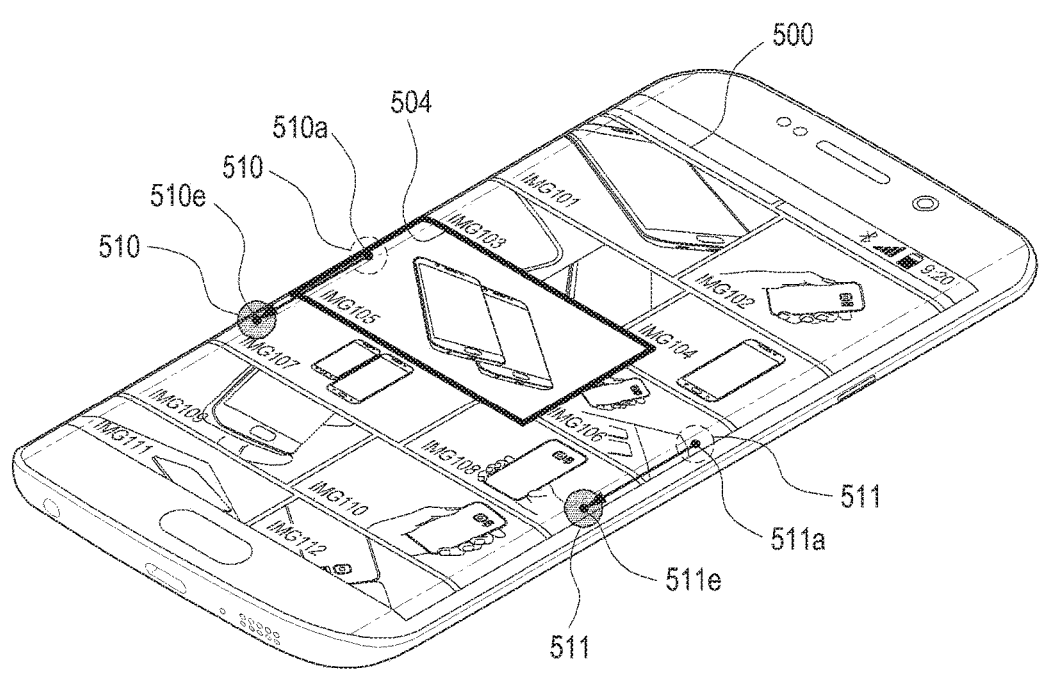

Referring to FIG. 5G, the controller 110 may display a thumbnail image 504 in response to the first touch 510 (for example, a movement from the location 510a to a location 510e) successively moving in the down direction and/or the second touch 511 (for example, a movement from the location 511a to a location 511e) successively moving in the down direction. Further, the controller 110 may display another screen (including another screen including the thumbnail image 504) (not shown) except for the first screen 500, the second screen 520 (see FIG. 5D), and the third screen 530 (see FIG. 5F) in response to the first touch 510 (for example, the movement from the location 510a to the location 510e) successively moving in the down direction and/or the second touch 511 (for example, the movement from the location 511a to the location 511e) successively moving in the down direction.

The thumbnail image 504 may be one of the images displayed on the first screen 500 or one of the images displayed on the remaining screens (not shown) except for the first screen 500. The controller 110 may randomly select the thumbnail image 504 to be displayed.

The controller 110 may display one or a plurality of thumbnail images in response to the first touch 510 successively moving in the down direction and/or the second touch 511 successively moving in the down direction. When a plurality of thumbnail images are displayed in response to the first touch 510 successively moving in the down direction and/or the second touch 511 successively moving in the down direction, the controller 110 may display each of the thumbnail images at a regular time interval (for example, 50 ms, but values can be changed).

The controller 110 may display the thumbnail image 504 only in the main touch screen area. Further, the controller 110 may display the thumbnail image 504 over the main touch screen area and the edge touch screen area as illustrated in FIG. 5G.

The controller 110 may also display the thumbnail image 504 before the touch arrives at the last location of the first touch 510 and/or the touch arrives at the last location of the second touch 511.

The controller 110 may provide feedback corresponding to the arrival at the last location of the first touch 510 to the user. The controller 110 may also provide feedback corresponding to the arrival at the last location of the second touch 511 to the user. Further, the controller 110 may provide feedback corresponding to the arrival at the last location of the first touch 510 and the arrival at the last location of the second touch 511 to the user.

The provided feedback may be provided as one of a visual feedback, an audible feedback, and a tactile feedback. Further, the controller 110 may provide a combination of the visual feedback, the audible feedback, and the tactile feedback to the user.

The visual feedback may include a visual effect (for example, a separate image or fading such as an animation effect applied to the separate image) (not shown) corresponding to the arrival at the last location of the first touch 510. The visual feedback may include a visual effect corresponding to the arrival of the last location of the second touch 511. Further, the visual feedback may include a visual effect corresponding to the arrival at the last location of the first touch 510 and the arrival at the last location of the second touch 511.

The controller 110 may display the visual feedback on the edge touch screen 190. The controller 110 may display the visual feedback on one of the main touch screen 190*a*, the first edge touch screen 190*b*, and the second edge touch screen 190*c*. Further, the controller 110 may display the visual feedback on a combination of the main touch screen 190*a*, the first edge touch screen 190*b*, and the second edge touch screen 190*c*.

The audible feedback may include a sound corresponding to the arrival of the last location of the second touch 510. The audible feedback may also include a sound corresponding to the arrival of the last location of the second touch 511. Further, the audible feedback may include a sound corresponding to the arrival of the last location of the second touch 510 and the arrival of the last location of the second touch 511.

The controller 110 may output the audible feedback through the speaker 163. For example, the controller 110 may output the audible feedback through one of the first speaker 163*a* and the second speaker 163*b*. Further, the controller 110 may output the audible feedback through a combination of the speaker 163*a* and the speaker 163*b*.

The tactile feedback may include a vibration corresponding to the arrival at the last location of the first touch 510. The tactile feedback may also include a vibration corresponding to the arrival at the last location of the second touch 511. Further, the tactile feedback may include a vibration corresponding to the arrival to the last location of the first touch 510 and the arrival to the last location of the second touch 511.

The controller 110 may output the tactile feedback through the vibration motor 164. When there is a plurality of vibration motors, the controller may selectively output the tactile feedback through one of the plurality of vibration motors.

A feedback provision time (for example, 500 ms) provided to the user may be changed through environment settings (not shown). Further, at least one of a plurality of feedbacks (for example, the visual feedback, the audible feedback, and the tactile feedback) provided in response to the arrival at the lost location of the first touch 510 and/or the second touch 511 may be selected.

When the successive motions of the first and second touches successively moving in the down direction are not detected, operation S408 is performed.

When the successive motions of the first and second touches successively moving in the down direction are detected, a first screen is changed to another screen corresponding to a first order among a plurality of screens in operation S407.

Referring to FIG. 5D, the controller 110 may change the first screen 500 to another screen 520 (for example, a first screen among the plurality of screens) corresponding to the first order among the plurality of screens in response to the arrival at the last location of the first touch 510. The controller 110 may also change the first screen 500 to another screen 520 (for example, an initial screen among the plurality of screens) corresponding to the first order among the plurality of screens in response to the arrival at the last location of the second touch 511. The controller 110 may also change the first screen 500 to another screen 520 (for example, an initial screen among the plurality of screens) corresponding to the first order among the plurality of screens in response to both the arrival at the last location of the first touch 510 and the arrival at the last location of the second touch 511.

When the first touch 510 and the second touch 511 successively move in the down direction, the controller 110 may change the first screen 500 to another screen 520 (for example, an initial screen among the plurality of screens) corresponding to the first order among the plurality of screens in response to the first arrival at the last location of the first touch 510. When the first touch 510 and the second touch 511 successively move in the down direction, the controller 110 may also change the first screen 500 to another screen 520 (for example, a first screen among the plurality of screens) corresponding to the first order among the plurality of screens in response to the first arrival at the last location of the second touch 511.

When the first touch 510 successively moves in the down direction, but and the second touch 511 does not move, the controller 110 may change the first screen 500 to another screen 520 (for example, an initial screen among the plurality of screens) corresponding to the first order among the plurality of screens in response to the arrival at the last location of the first touch 510. When the second touch 511 successively moves in the down direction, but the first touch 510 does not move, the controller 110 may change the first screen 500 to another screen 520 (for example, a first screen among the plurality of screens) corresponding to the first order among the plurality of screens in response to the arrival at the last location of the second touch 511.

The other screen 520 may be a first screen corresponding to a first order of the first screen 500 (for example, facing the initial screen) among the plurality of screens (for example, IMG 001 to IMG 008 displayed in the application) corresponding to the successive motions of the touch. The changed screen 520 may have a number of images which is different from the number of images displayed on the first screen 500 before the change. Further, the changed screen 520 may have a number of images which is the same as the number of images displayed on the first screen 500 before the change.

The controller 110 may provide feedback corresponding to the change to the other screen 520. The provided feedback may be provided as one of a visual feedback, an audible feedback, and a tactile feedback. Further, the controller 110 may provide a combination of the visual feedback, the audible feedback, and the tactile feedback to the user.

The visual feedback may include a visual effect (for example, a separate image or fading such as an animation effect applied to the separate image) (not shown) corresponding to the change to the other screen 520.

The controller 110 may display the visual feedback corresponding to the change to the other screen 520 on the edge touch screen 190. The controller 110 may also display the visual feedback on one of the main touch screen 190*a*, the first edge touch screen 190*b*, and the second edge touch screen 190*c*. Further, the controller 110 may display the visual feedback on a combination of the main touch screen 190*a*, the first edge touch screen 190*b*, and the second edge touch screen 190*c*.

The audible feedback may include a sound corresponding to the change to the other screen 520. The controller 110 may output the audible feedback through the speaker 163. For example, the controller 110 may output the audible feedback through one of the first speaker 163*a* and the second speaker 163*b*. Further, the controller 110 may output the audible feedback through a combination of the first speaker 163a and the second speaker 163b.

The tactile feedback may include a vibration corresponding to the change to the other screen 520. The controller 110 may output the tactile feedback through the vibration motor 164. When there is a plurality of vibration motors, the controller may selectively output the tactile feedback through one of the plurality of vibration motors.

A feedback provision time (for example, 500 ms) provided to the user may be changed through environment settings (not shown). Further, at least one of a plurality of feedbacks (for example, the visual feedback, the audible feedback, and the tactile feedback) provided in response to the change to the other screen 520 may be selected.

When the controller changes the first screen 500 to the other screen 520 corresponding to the first order among the plurality of screens in operation S407 of FIG. 4A, the screen changing method of the portable device ends.

When the controller detects no successive motions of the first and/or second touches moving in the down direction, operation S408 is performed.

In operation S408, successive motions of the first and/or second touches moving in an up direction are detected.

Referring to FIG. 5E, the first touch 510 successively moving in an up direction (for example, −y axis direction) may arrive at a last location 510*m* from the first location 510*a*, a second location 510*k*, and a third location 510*l*. The controller 110 may calculate the last location 510*m* of the first touch 510 moving in the up direction on the first edge touch screen 190*b* by using the edge touch screen controller 195 and the storage unit.

The last location of the first touch 510 successively moving in the up direction may be different according to a route and/or a movement distance of the successive motions of the first touch 510. For example, the last location of the first touch 510 successively moving in the up direction may be one of 510*k*, 510*l*, and 510*m* included along the route of the successive motions of the first touch 510. Further, when the movement distance of the successive motions of the first touch 510 is short, the last location of the first touch 510 successively moving in the up direction may be the location 510*k*. When the movement distance of the successive motions of the first touch 510 is long, the last location of the first touch 510 successively moving in the up direction may be the location 510*m* or 510*l*.

The controller 110 may detect the successive motions of the first touch 510 in the up direction by using an allowable slope range. The controller 110 may calculate a slope of a straight line connecting the first location 510*a* and the last location 510*k*, 510*l*, or 510*m* of the first touch 510.

Since the detection of the successive motions of the first touch 510 in the up direction using the allowable slope range in operation S408 of FIG. 4A is substantially similar (for example, a direction difference) to the detection of the successive motions of the first touch 510 in the down direction using the allowable slope range in operation S406 of FIG. 4A, a duplicate description will be omitted.

In an embodiment of the present disclosure, the last location of the first touch 510 successive moving in the up direction may be in an area within the allowable slope range.

The controller 110 may detect the successive motions of the first touch 510 in the up direction by using a setting area (not shown). The setting area may refer to a semicircle with a radius of 3 cm having the first location 510*a* of the first touch 510 as the center.

Since the detection of the successive motions of the first touch 510 in the up direction using the setting area in operation S408 of FIG. 4A is substantially similar (for example, a direction difference) to the detection of the successive motions of the first touch 510 in the down direction using the setting area in operation S406 of FIG. 4A, a duplicate description will be omitted.

In an embodiment of the present disclosure, the last location of the first touch 510 successively moving in the up direction may be in an area within the setting area. Further, the route from the first location 510*a* to the last location of the first touch 510 successively moving in the up direction may pass through the setting area.

The controller 110 may detect the successive motions of the first touch 510 in the up direction based on a combination of a time interval, as well as the allowable slope range and the setting area. For example, the controller 110 may detect the successive motions of the first touch 510 in the up direction by using a combination of the allowable slope range and the time interval, and a combination of the setting area and the time interval.

Since the detection of the successive motions of the first touch 510 in the up direction using the combination of the allowable slope range and the time interval, and the combination of the setting area and the time interval in operation S408 of FIG. 4A is substantially similar (for example, a direction difference) to the detection of the successive motions of the first touch 510 in the down direction using the combination of the allowable slope range and the time interval, and the combination of the setting area and the time interval in operation S406 of FIG. 4A, a duplicate description will be omitted.

In an embodiment of the present disclosure, the last location of the first touch 510 successively moving in the up direction may be in an area within the allowable slope range within the time interval.

In an embodiment of the present disclosure, the last location of the first touch 510 successively moving in the up direction may be in an area within the setting area within the time interval. Further, the route from the first location 510*a* to the last location of the first touch 510 successively moving in the up direction may pass through the setting area within the time interval.

Referring to FIG. 5E, the second touch 511 successively moving in an up direction (for example, −y axis direction) may arrive at a last location 511*m* from the first location 511*a*, a second location 511*k*, and a third location 511*l*. The controller 110 may calculate the last location 511*m* of the second touch 511 moving in the up direction on the second edge touch screen 190*c* by using the edge touch screen controller 195 and the storage unit.

The last location of the second touch 511 successively moving in the up direction may be different according to a route and/or a movement distance of the successive motions of the second touch 511. For example, the last location of the second touch 511 successively moving in the up direction may be one of 511*k*, 511*l*, and 511*m* included along the route of the successive motions of the second touch 511. Further, when the movement distance of the successive motions of the second touch 511 is short, the last location of the second touch 511 successively moving in the up direction may be the location 511*k*. When the movement distance of the successive motions of the second touch 511 is long, the last location of the second touch 511 successively moving in the up direction may be the location 511*l* or 511*m*.

The controller 110 may detect the successive motions of the second touch 511 in the up direction by using an allowable slope range. The controller 110 may calculate a slope of a straight line connecting the first location 511*a* and the last location 511*k*, 511*l*, or 511*m* of the second touch 511.

Since the detection of the successive motions of the second touch 511 in the up direction using the allowable slope range in operation S408 of FIG. 4A is substantially similar (for example, a touch difference) to the detection of the successive motions of the first touch 510 in the up direction using the allowable slope range in operation S408 of FIG. 4A, a duplicate description will be omitted.

In an embodiment of the present disclosure, the last location of the second touch 511 successively moving in the up direction may be in an area within the allowable slope range.

The controller 110 may detect the successive motions of the second touch 511 in the up direction by using a setting area. The setting area may refer to a semicircle with a radius of 3 cm having the first location 510*a* of the first touch 510 as the center in the y axis direction.

Since the detection of the successive motions of the second touch 511 in the up direction using the setting area in operation S408 of FIG. 4A is substantially similar (for example, a touch difference) to the detection of the successive motions of the first touch 510 in the up direction using the setting area in operation S408 of FIG. 4A, a duplicate description will be omitted.

In an embodiment of the present disclosure, the last location of the second touch 511 successively moving in the up direction may be located within the setting area. Further, the route from the first location 511*a* to the last location of the second touch 511 successively moving in the up direction may pass through the setting area.

The controller 110 may detect the successive motions of the second touch 511 in the up direction based on a combination of a time interval as well as the allowable slope range and the setting area. For example, the controller 110 may detect the successive motions of the second touch 511 in the up direction by using a combination of the allowable slope range and the time interval and a combination of the setting area and the time interval.

Since the detection of the successive motions of the second touch 511 in the up direction using the combination of the allowable slope range and the time interval and the combination of the setting area and the time interval in operation S408 of FIG. 4A is substantially similar (for example, a direction difference) to the detection of the successive motions of the first touch 510 in the up direction using the combination of the allowable slope range and the time interval and the combination of the setting area and the time interval in operation S408 of FIG. 4A, a duplicate description will be omitted.

In an embodiment of the present disclosure, the last location of the second touch 511 successively moving in the up direction may be in an area within the allowable slope range within the time interval.

In an embodiment of the present disclosure, the last location of the second touch 511 successively moving in the up direction may be within the setting area within the time interval. Further, the route from the first location 511*a* to the last location of the second touch 511 successively moving in the up direction may pass through the setting area within the time interval.

The controller 110 may display a thumbnail image (not shown) in response to the first touch 510 successively moving in the up direction and/or the second touch 511 successively moving in the up direction.

Since the displaying of the thumbnail image in operation S408 of FIG. 4A is substantially similar (for example, a direction difference and an image difference) to the displaying of the thumbnail image in operation S406 of FIG. 4A, a duplicate description will be omitted.

The controller 110 may provide feedback corresponding to the arrival at the last location of the first touch 510 successively moving in the up direction to the user. The controller 110 may also provide feedback corresponding to the arrival at the last location of the second touch 511 successively moving in the up direction to the user. Further, the controller 110 may provide feedback corresponding to both the arrival at the last location of the first touch 510 successively moving in the up direction and the arrival at the last location of the second touch 511 successively moving in the up direction to the user.

The provided feedback may be provided as one of a visual feedback, an audible feedback, and a tactile feedback. Further, the controller 110 may provide a combination of the visual feedback, the audible feedback, and the tactile feedback to the user.

Since the feedback corresponding to the arrival at the last location of the first touch 510 and/or the second touch 511 successively moving in the up direction in operation S408 of FIG. 4A is substantially similar (for example, a direction difference) to the feedback corresponding to the arrival at the last location of the first touch 510 and/or the second touch 511 successively in the down direction in operation S406 of FIG. 4A, a duplicate description will be omitted.

When the successive motions of the first and second touches successively moving in the up direction are not detected, operation S410 is performed.

When the successive motions of the first and second touches successively moving in the up direction are detected, a first screen is changed to another screen corresponding to a second order among a plurality of screens in operation S409.

Referring to FIG. 5F, the controller 110 may change the first screen 500 to another screen 530 corresponding to the second order among the plurality of screens in response to the arrival at the last location of the first touch 510 successively moving in the up direction. The controller 110 may also change the first screen 500 to another screen 530 (for example, a last screen among the plurality of screens) corresponding to the second order among the plurality of screens in response to the arrival at the last location of the second touch 511 successively moving in the up direction. The controller 110 may also change the first screen 500 to another screen 530 corresponding to the second order among the plurality of screens in response to both the arrival at the last location of the first touch 510 successively moving in the up direction and the arrival at the last location of the second touch 511 successively moving in the up direction.

When the first touch 510 and the second touch 511 successively move in the up direction, the controller 110 may change the first screen 500 to another screen 530 (for example, a last screen among the plurality of screens) corresponding to the second order among the plurality of screens in response to the first arrival at the last location of the first touch before the arrival at the last location of the second touch 511. When the first touch 510 and the second touch 511 successively move in the up direction, the controller 110 may also change the first screen 500 to another screen 530 (for example, a first screen among the plurality of screens) corresponding to the first order among the plurality of screens in response to the first arrival at the last location of the second touch 511.

When the first touch 510 successively moves in the up direction, but the second touch 511 does not move, the controller 110 may change the first screen 500 to another screen 530 (for example, a last screen among the plurality of screens) corresponding to the second order among the plurality of screens in response to the arrival at the last location of the first touch 510. When the second touch 511 successively moves in the up direction, but the first touch 510 does not move, the controller 110 may change the first screen 500 to another screen 530 corresponding to the second order among the plurality of screens in response to the arrival at the last location of the second touch 511.

The other screen 530 may be an initial screen corresponding to a second order of the first screen 500 (for example, facing the last screen) among the plurality of screens (for example, IMG 201 to IMG 207 displayed in the application) corresponding to the successive motions of the touch. The changed screen 530 may have a number of images which is different from the number of images displayed on the first screen 500 before the change. Further, the changed screen 530 may have a number of images which is the same as the number of images displayed on the first screen 500 before the change.

The controller 110 may provide feedback corresponding to the change to the other screen 530. The provided feedback may be provided as one of a visual feedback, an audible feedback, and a tactile feedback. Further, the controller 110 may provide a combination of the visual feedback, the audible feedback, and the tactile feedback to the user.

Since the feedback corresponding to the change to the other screen 530 in operation S409 of FIG. 4A is substantially similar (for example, a screen difference) to the feedback corresponding to the change to the other screen 520 in operation S407 of FIG. 4A, a duplicate description will be omitted.

When the controller 110 changes the first screen 500 to the other screen 530 corresponding to the second order among the plurality of screens in operation S409 of FIG. 4A, the screen changing method of the portable device ends.

When the controller detects no successive motions of the first and/or second touches moving in the up direction, operation S410 is performed.

FIGS. 6A to 6D illustrate screens of a portable device according to another embodiment of the present disclosure.

In operation S410 of FIG. 4A, successive motions of the first and/or second touches moving in a main touch screen direction are detected.

Figure 6A:
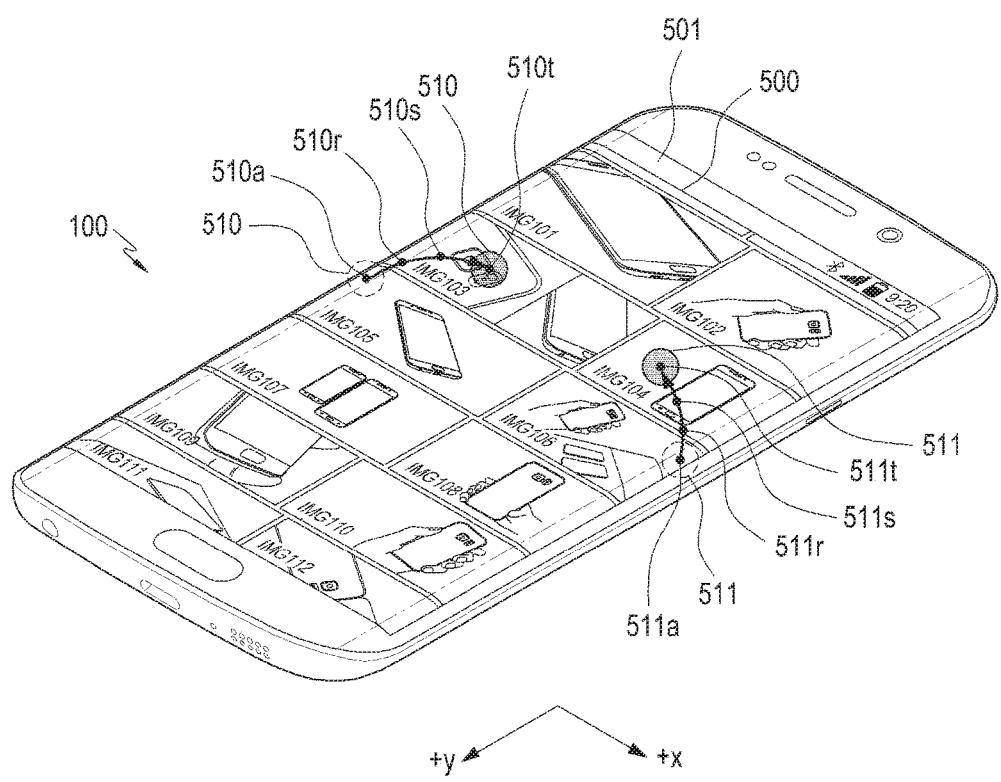
FIGS. 6A to 6D illustrate screens of a portable device according to an embodiment of the present disclosure.

Referring to FIG. 6A, the first touch 510 successively moving in a main touch screen direction (for example, −x axis direction) may arrive at a last location 510*t* from the first location 510*a*, a second location 510*r*, and a third location 510*s*. The controller 110 may calculate the last location 510*t* of the first touch 510 moving in the main touch screen direction on the first edge touch screen 190*b* by using the edge touch screen controller 195 and the storage unit 175.

The last location of the first touch 510 successively moving in the main touch screen direction may be different according to a route and/or a movement distance of the successive motions of the first touch 510. For example, the last location of the first touch 510 successively moving in the up direction may be one of 510*r*, 510*s*, and 510*t*, included along the route of the successive motions of the first touch 510. Further, when the movement distance of the successive motions of the first touch 510 is short, the last location of the first touch 510 successively moving in the up direction may be the location 510*r*. When the movement distance of the successive motions of the first touch 510 is long, the last location of the first touch 510 successively moving in the up direction may be the location 510*s* or 510*t*.

The successive motions of the first touch 510 successively moving in the main touch screen direction may correspond to a curved line. For example, the route of the successive motions of the first touch 510 successively moving in the main touch screen direction may correspond to a curved line following a curvature of the first edge touch screen 190*b*.

The controller 110 may detect the successive motions of the first touch 510 in the up direction by using an allowable slope range. The controller 110 may calculate a slope of a straight line (or arc) connecting the first location 510*a* and the last location 510*r*, 510*s*, or 510*t*, of the first touch 510.

Since the detection of the successive motions of the first touch 510 in the main touch screen direction using the allowable slope range in operation S410 of FIG. 4A is substantially similar (for example, a direction difference) to the detection of the successive motions of the first touch 510 in the down direction using the allowable slope range in operation S406 of FIG. 4A, a duplicate description will be omitted.

In an embodiment of the present disclosure, the last location of the first touch 510 successively moving in the main touch screen direction may be in an area within the allowable slope range.

The controller 110 may detect the successive motions of the first touch 510 in the main touch screen direction by using a setting area. The setting area may refer to a semi-circle with a radius of 3 cm having the first location 510*a* of the first touch 510 as the center in the y axis direction Since the detection of the successive motions of the first touch 510 in the main touch screen direction using the setting area in operation S410 of FIG. 4A is substantially similar (for example, a direction difference) to the detection of the successive motions of the first touch 510 in the down direction using the setting area in operation S406 of FIG. 4A, a duplicate description will be omitted.

In an embodiment of the present disclosure, the last location of the first touch 510 successively moving in the main touch screen direction may be within the setting area. Further, the route from the first location 510*a* to the last location of the first touch 510 successively moving in the main touch screen direction may pass through the setting area.

The controller 110 may detect the successive motions of the first touch 510 in the main touch screen direction based on a combination of a time interval as well as the allowable slope range and the setting area. For example, the controller 110 may detect the successive motions of the first touch 510 in the main touch screen direction by using a combination of the allowable slope range and the time interval, and a combination of the setting area and the time interval.

Since the detection of the successive motions of the first touch 510 in the main touch screen direction using the combination of the allowable slope range and the time interval, and the combination of the setting area and the time interval in operation S410 of FIG. 4A is substantially similar (for example, a direction difference) to the detection of the successive motions of the first touch 510 in the down direction using the combination of the allowable slope range and the time interval, and the combination of the setting area and the time interval in operation S406 of FIG. 4A, a duplicate description will be omitted.

In an embodiment of the present disclosure, the last location of the first touch 510 successively moving in the main touch screen direction may be in an area within the allowable slope range within the time interval.

In an embodiment of the present disclosure, the last location of the first touch 510 successively moving in the main touch screen direction may be within the setting area within the time interval. Further, the route from the first location 510*a* to the last location of the first touch 510 successively moving in the main touch screen direction may pass through the setting area within the time interval.

Referring to FIG. 6A, the second touch 511 successively moving in a main touch screen direction (for example, −x axis direction) may arrive at the last location 511*t* from the first location 511*a*, a second location 511*r*, and a third location 511*s*. The controller 110 may calculate the last location 511*t* of the second touch 511 moving in the main touch screen direction on the second edge touch screen 190*c* by using the edge touch screen controller 195 and the storage unit 175.

The last location of the second touch 511 successively moving in the main touch screen direction may be different according to a route and/or a movement distance of the successive motions of the second touch 511. For example, the last location of the second touch 511 successively moving in the main touch screen direction may be one of 511*r*, 511*s*, and 511*t*, included along the route of the successive motions of the second touch 511. Further, when the movement distance of the successive motions of the second touch 511 is short, the last location of the second touch 511 successively moving in the main touch screen direction may be the location 511*r*. Further, when the movement distance of the successive motions of the second touch 511 is long, the last location of the second touch 511 successively moving in the main touch screen direction may be the location 511*s* or 511*t*.

The successive motions of the second touch 511 successively moving in the main touch screen direction may be a curved line. The route of the successive motions of the second touch 511 successively moving in the main touch screen direction may correspond to a curved line following a curvature of the second edge touch screen 190*c*.

The controller 110 may detect the successive motions of the second touch 511 in the up direction by using an allowable slope range. The controller 110 may calculate a slope of a straight line connecting the first location 511*a* and the last location 511*r*, 511*s*, or 511*t* of the second touch 511.

Since the detection of the successive motions of the second touch 511 in the main touch screen direction using the allowable slope range in operation S410 of FIG. 4A is substantially similar (for example, a direction difference) to the detection of the successive motions of the second touch 511 in the down direction using the allowable slope range in operation S406 of FIG. 4A, a duplicate description will be omitted.

In an embodiment of the present disclosure, the last location of the second touch 511 successively moving in the main touch screen direction may be in an area within the allowable slope range.

The controller 110 may detect the successive motions of the second touch 511 in the main touch screen direction by using a setting area. The setting area may refer to a semicircle with a radius of 3 cm having the first location 511*a* of the second touch 511 as the center in the y axis direction.

Since the detection of the successive motions of the second touch 511 in the main touch screen direction using the setting area in operation S410 of FIG. 4A is substantially similar (for example, a direction difference) to the detection of the successive motions of the second touch 511 in the down direction using the setting area in operation S406 of FIG. 4A, a duplicate description will be omitted.

In an embodiment of the present disclosure, the last location of the second touch 511 successively moving in the main touch screen direction may be within the setting area. Further, the route from the first location 511*a* to the last location of the second touch 511 successively moving in the main touch screen direction may pass through the setting area.

The controller 110 may detect the successive motions of the second touch 511 in the main touch screen direction based on a combination of a time interval as well as the allowable slope range and the setting area. For example, the controller 110 may detect the successive motions of the second touch 511 in the main touch screen direction by using a combination of the allowable slope range and the time interval and a combination of the setting area and the time interval.

Since the detection of the successive motions of the second touch 511 in the main touch screen direction using the combination of the allowable slope range and the time interval and the combination of the setting area and the time interval in operation S410 of FIG. 4A is substantially similar (for example, a direction difference) to the detection of the successive motions of the first touch 510 in the down direction using the combination of the allowable slope range and the time interval and the combination of the setting area and the time interval in operation S406 of FIG. 4A, a duplicate description will be omitted.

In an embodiment of the present disclosure, the last location of the second touch 511 successively moving in the main touch screen direction may be in an area within the allowable slope range within the time interval.

In an embodiment of the present disclosure, the last location of the second touch 511 successively moving in the main touch screen direction may be within the setting area within the time interval. Further, the route from the first location 511*a* to the last location of the second touch 511 successively moving in the main touch screen direction may pass through the setting area within the time interval.

The controller 110 may provide feedback corresponding to the arrival at the last location of the first touch 510 successively moving in the main touch screen direction to the user. The controller 110 may also provide feedback corresponding to the arrival at the last location of the second touch 511 successively moving in the main touch screen direction to the user. Further, the controller 110 may provide feedback corresponding to both the arrival at the last location of the first touch 510 successively moving in the main touch screen direction and the arrival at the last location of the second touch 511 successively moving in the main touch screen direction to the user.

The provided feedback may be provided as one of a visual feedback, an audible feedback, and a tactile feedback. Further, the controller 110 may provide a combination of the visual feedback, the audible feedback, and the tactile feedback to the user.

Figure 6B:
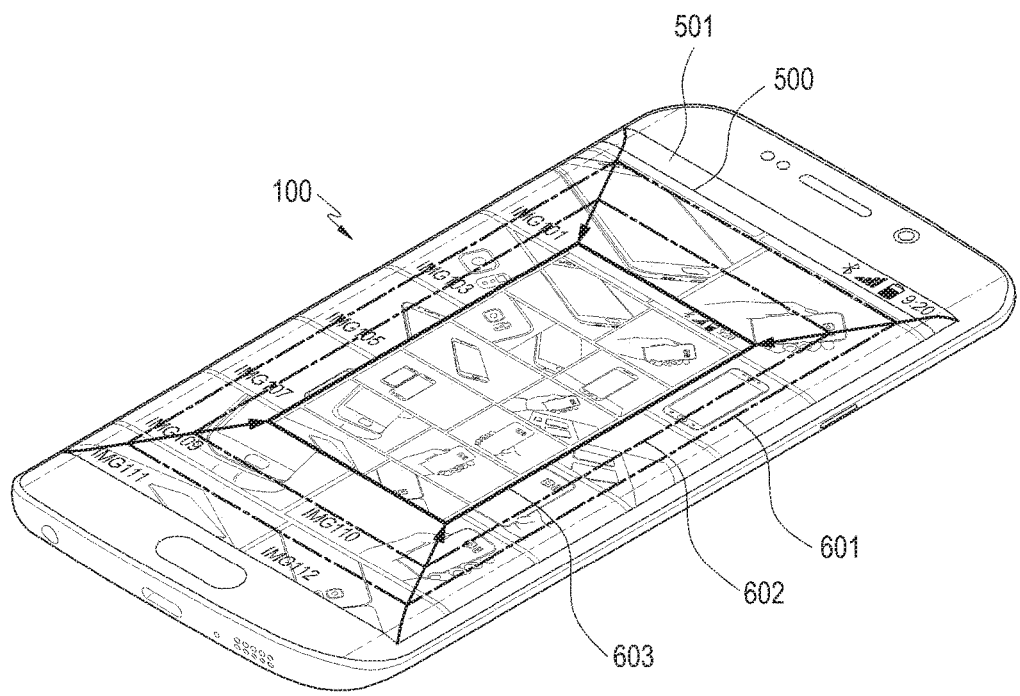

Referring to FIG. 6B, the visual feedback may be feedback for reducing the first screen 500 to be a reduced screen 603 having a determined size (for example, 50% of the first screen 500, but values can be changed). The controller 110 may gradually reduce (for example, 500→601→602→603) the first screen 500 to be the reduced screen 603 at one of a constant velocity and a non-constant velocity. The reduced screen 603 may be displayed to overlap the first screen 500. The reduced screen 603 may have one or more transparent regions (which can be changed, combined or configured in any number of ways).

The number of intermediate reduced screens 601 and 602 displayed during the reduction process from the first screen 500 to the reduced screen 603 is one example, and it is easily understood by those skilled in the art that the number of intermediate reduced screens can be changed.

Figure 6C:
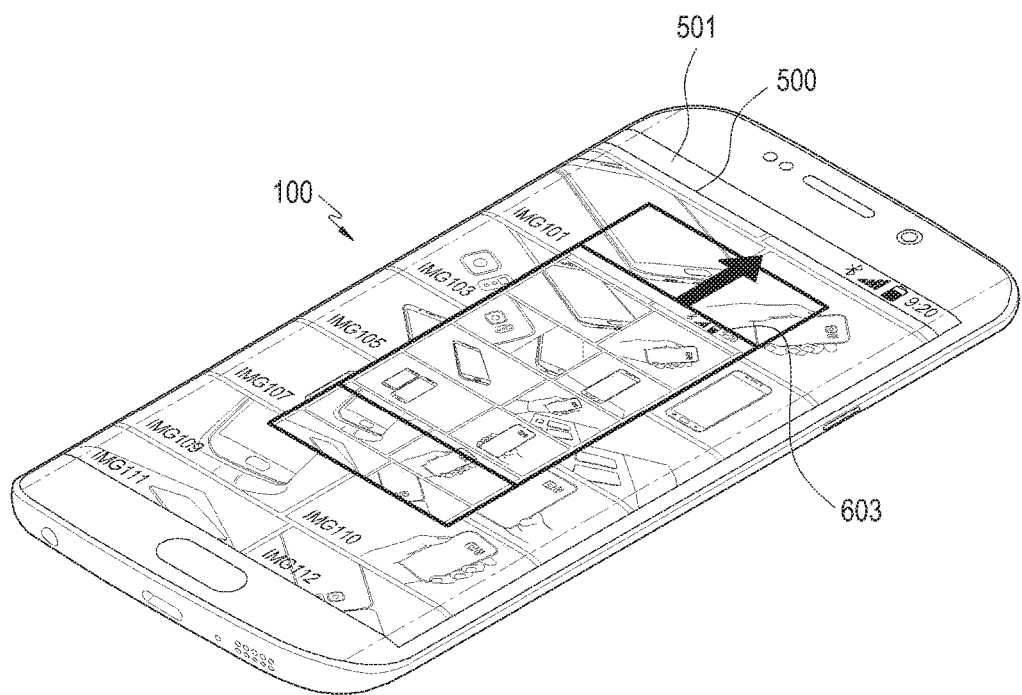

Referring to FIG. 6C, the reduced screen 603 may move or be moved to one side of the edge touch screen 190. When the reduced screen 603 moves to one side of the edge touch screen 190, the controller 110 may further reduce the reduced screen 603 and gradually move the reduced screen 603. Further, the reduced screen 603 may move to the one side of the edge touch screen 190 at one of the constant velocity and the non-constant velocity at which reduction occurred.

The one side of the edge touch screen 190 to which the reduced screen 603 can move may include an upper portion, a lower portion, a left side, or a right side and may, for example, correspond to an orientation of the portable device 100.

When the successive motions of the first and second touches successively moving in the main touch screen direction are not detected at operation S410, the screen changing method of the portable device ends.

In operation S411 of FIG. 4A, the first screen is captured.

Figure 6D:
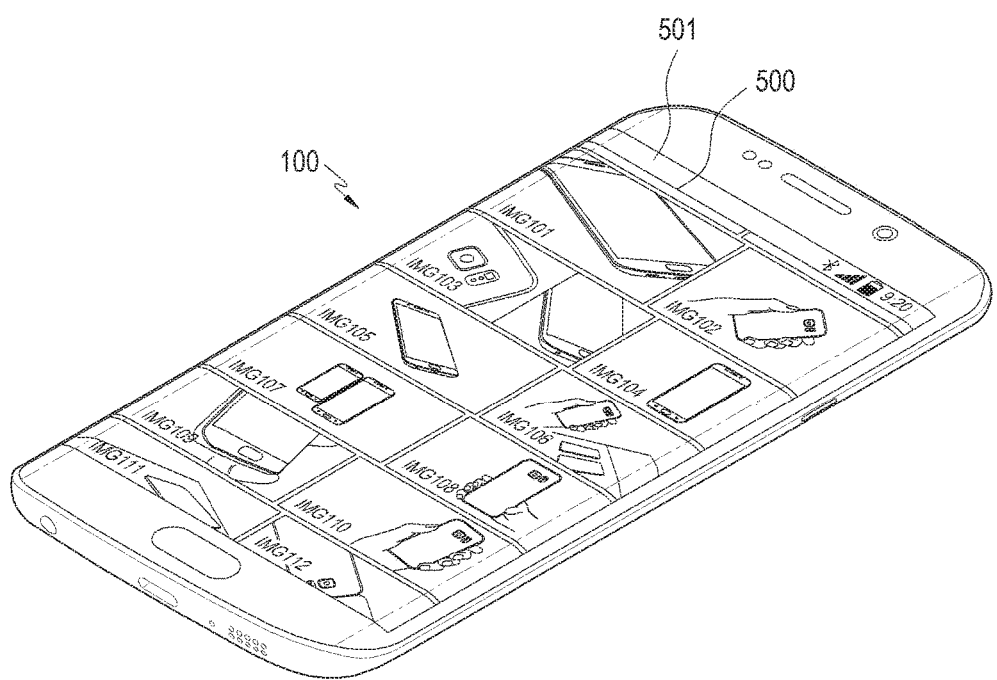

Referring to FIG. 6D, the controller 110 captures the first screen 500 in response to the arrival at the last location of the first touch 510 successively moving in the main touch screen direction. The controller 110 may also capture the first screen 500 in response to the arrival at the last location of the second touch 511 successively moving in the main touch screen direction. The controller 110 may also capture the first screen 500 in response to both the arrival at the last location of the first touch 510 successively moving in the main touch screen direction and the arrival at the last location of the second touch 511 successively moving in the main touch screen direction.

When the first touch 510 and the second touch 511 successively move in the main touch screen direction, the controller 110 may capture the first screen 500 in response to the first arrival at the last location of the first touch 510. Further, when the first touch 510 and the second touch 511 successively move in the main touch screen direction, the controller 110 may capture the first screen 500 in response to the first arrival at the last location of the second touch 511.

When the first touch 510 successively moves in the main touch screen direction, but the second touch 511 does not move, the controller 110 may capture the first screen 500 in response to the arrival at the last location of the first touch 510. When the second touch 511 successively moves in the main touch screen direction, but the first touch 510 does not move, the controller 110 may capture the first screen 500 in response to the arrival at the last location of the second touch 511.

Referring to FIG. 6D, when the first screen 500 is captured, the controller 110 may display the first screen 500. When an output of feedback corresponding to the arrival at the last location of the first touch 510 successively moving in the main touch screen direction is completed, the controller 110 may also display the first screen 500.

The controller 110 may provide the feedback corresponding to the capturing of the first screen 500. The provided feedback may be provided as one of a visual feedback, an audible feedback, and a tactile feedback. Further, the controller 110 may provide a combination of the visual feedback, the audible feedback, and the tactile feedback to the user.

Since the feedback corresponding to the capturing of the first screen 500 in operation S411 of FIG. 4A is substantially similar (for example, screen capturing) to the feedback corresponding to the change to the other screen 520 in operation S407 of FIG. 4A, a duplicate description will be omitted.

When the controller 110 captures the first screen 500 in operation S411 of FIG. 4A, the screen changing method of the portable device ends.

Figure 4B:
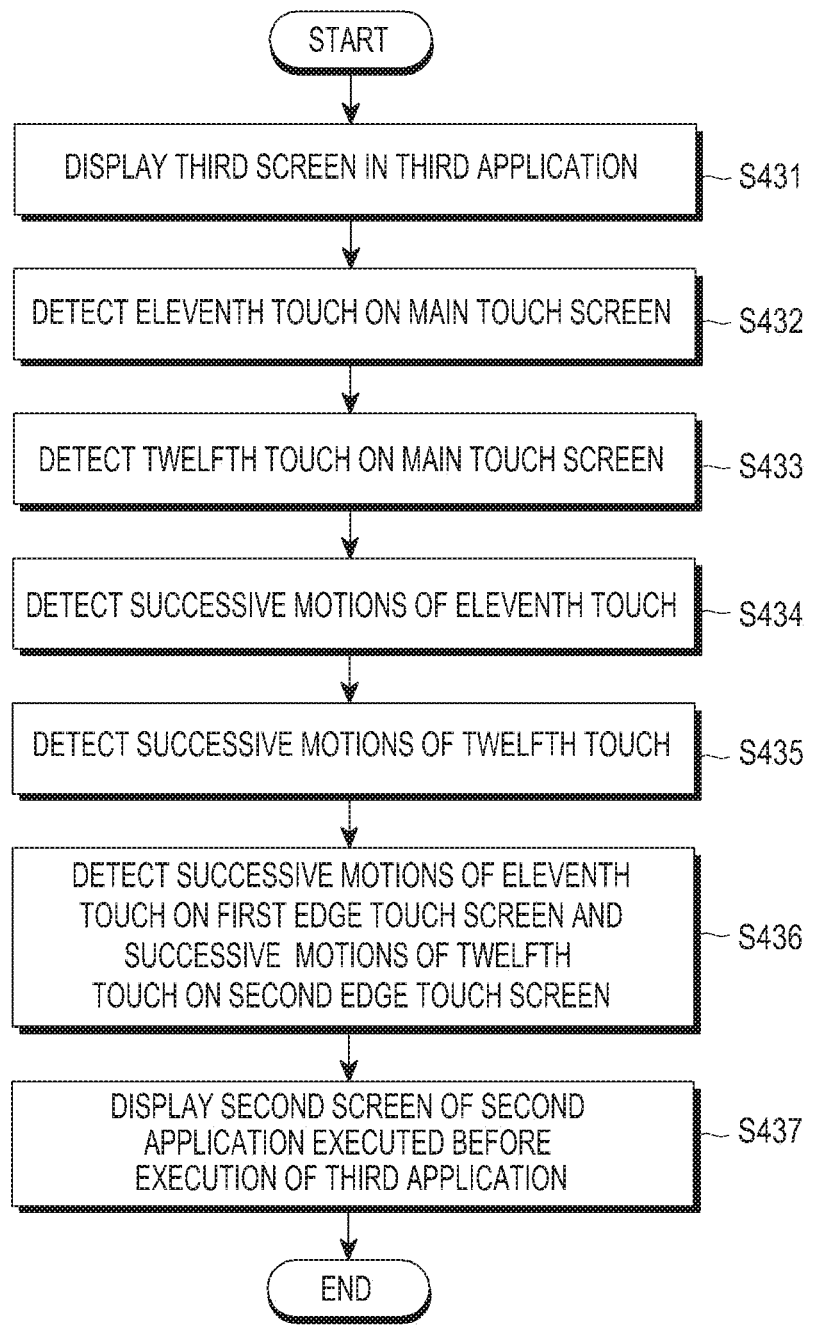
FIG. 4B is a flowchart illustrating a screen changing method of a portable device according to an embodiment of the present disclosure.

FIG. 4B is a flowchart illustrating a screen changing method of a portable device according to another embodiment of the present disclosure.

FIGS. 7A to 7D illustrate screens of a portable device according to an embodiment of the present disclosure.

In operation S431 of FIG. 4B, a third screen is displayed in a third application.

Figure 7A:
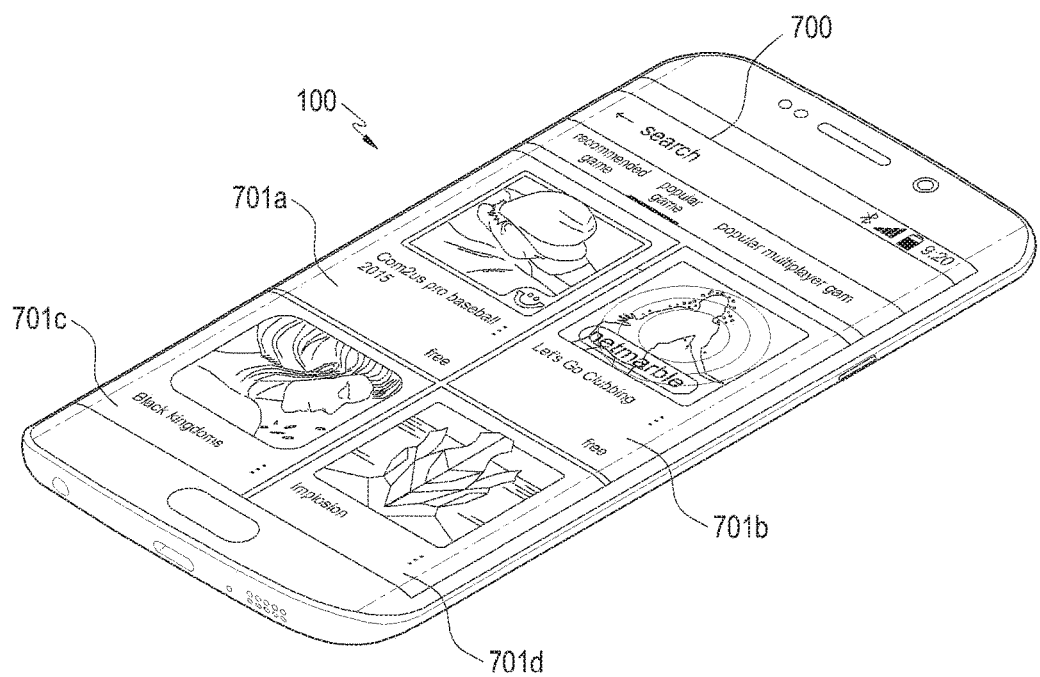
FIGS. 7A to 7D illustrate screens of a portable device according to an embodiment of the present disclosure.

Referring to FIG. 7A, a second screen 700 is displayed on the edge touch screen 190.

The controller 110 may execute a second application and display the second screen 700 in response to a user input (not shown). The second screen 700 may display a title bar (not shown) for showing a name of the second application (for example, a game market) executed in the portable device 100 and one or more games (for example, games 701a, 701b, 701c and 701d) displayed through the second application.

The second application executed in the portable device 100 may be one of various applications (for example, a messenger, an SNS, and the like), but the present disclosure is not limited thereto.

The user may select one of the displayed games and install the selected game in the portable device. Further, the user may end the second application.

Figure 7B:
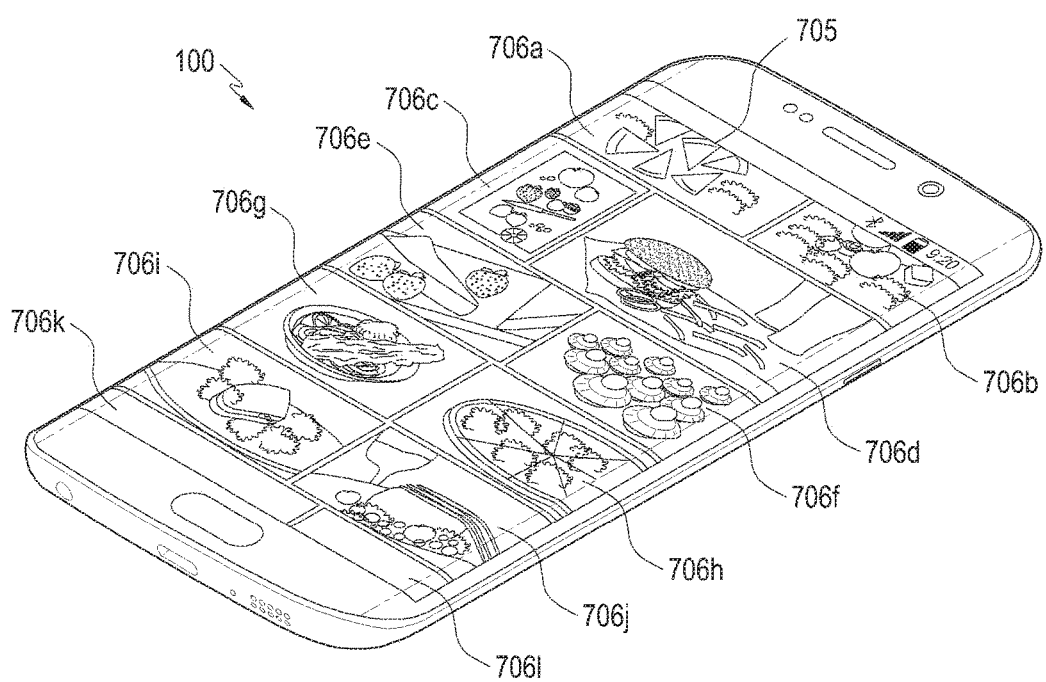

Referring to FIG. 7B, a third screen 705 is displayed on the edge touch screen 190.

The controller 110 may execute a third application and display the third screen 705 in response to a user input (not shown). The third screen 705 may display a title bar (not shown) for showing a name of the third application (for example, a photo album) executed in the portable device 100 and one or more photos (for example, photos 706a, 706b, 706c, 706d, 706e, 706f, 706g, 706h, 706i, 706j, 706k and 706l) displayed through the third application.

The third application executed in the portable device 100 may be one of various applications (for example, a messenger, an SNS, and the like) but the present disclosure is not limited thereto.

In operation S432 of FIG. 4B, an eleventh touch is detected on the main touch screen.

Figure 7C:
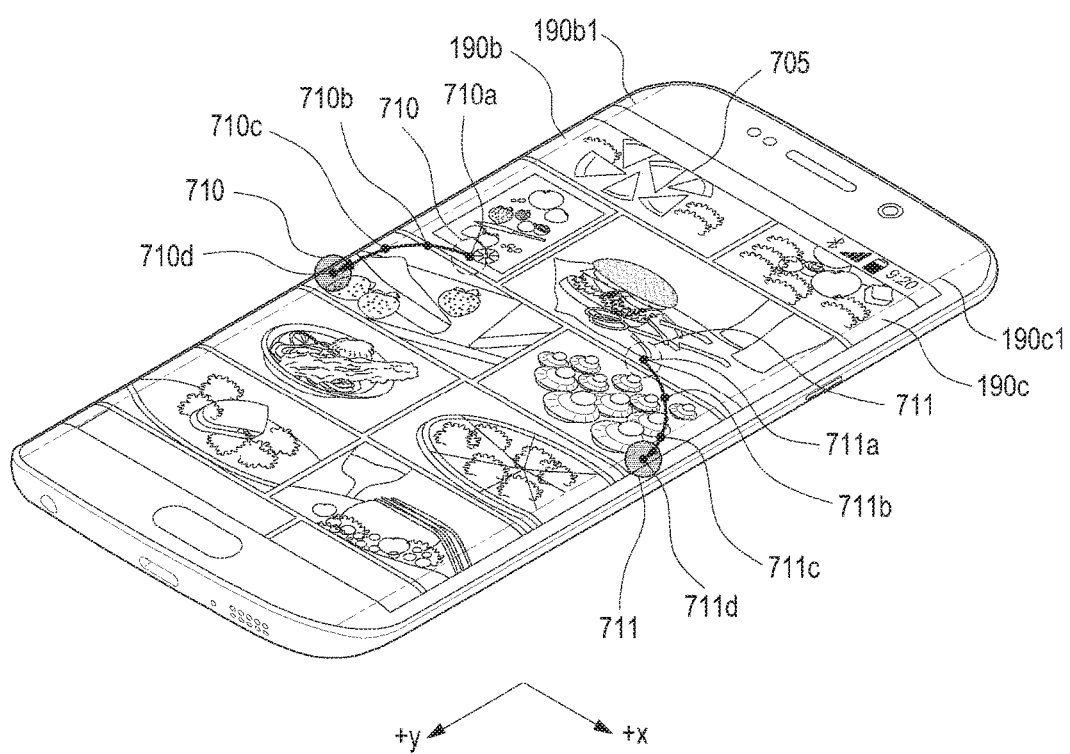

Referring to FIG. 7C, the user conducts the eleventh touch 710 on the main touch screen 190a. The controller 110 may detect the eleventh touch 710 by using the edge touch screen 190 and the edge touch screen controller 195. Further, the controller 110 may detect the eleventh touch 710 by using the main touch screen 190a and the edge touch screen controller 195. The controller 110 may calculate an eleventh touch location 710a (for example, X11 and Y11 coordinates) corresponding to the eleventh touch 710 by using an electrical signal received from the edge touch screen controller 195.

The controller 110 may store eleventh touch location information corresponding to the eleventh touch location 710a in the storage unit 175. The stored eleventh touch location information may include a touch ID, a touch location, a touch detection time, or touch information (for example, a touch pressure, touch direction, and touch duration time) for history management.

Since the detection of the eleventh touch on the main touch screen in operation S432 of FIG. 4B is substantially similar (for example, a difference in the detected touch location) to the detection of the first touch on the first edge touch screen in operation S402 of FIG. 4A, a duplicate description will be omitted.

In operation S433 of FIG. 4B, a twelfth touch is detected on the main touch screen.

Referring to FIG. 7C, the user conducts the twelfth touch 711 on the main touch screen 190a. The controller 110 may detect the twelfth touch 711 by using the edge touch screen 190 and the edge touch screen controller 195. Further, the controller 110 may detect the twelfth touch 711 by using the main touch screen 190a and the edge touch screen controller 195. The controller 110 may calculate a twelfth touch location 711a (for example, X12 and Y12 coordinates) corresponding to the twelfth touch 710 by using an electrical signal received from the edge touch screen controller 195.

The controller 110 may store twelfth touch location information corresponding to the twelfth touch location 711a in the storage unit 175. The stored twelfth touch location information may include a touch ID, a touch location, a touch detection time, or touch information (for example, a touch pressure, touch direction, and touch duration time) for history management.

Since the detection of the twelfth touch on the main touch screen in operation S433 of FIG. 4B is substantially similar (for example, a difference in the detected touch location) to the detection of the eleventh touch on the main edge touch screen in operation S403 of FIG. 4A, a duplicate description will be omitted.

In operation S434 of FIG. 4B, successive motions of the eleventh touch are detected.

Referring to FIG. 7C, the controller 110 may detect (or calculate) successive motions (for example, a plurality of X and Y coordinates corresponding to the successive touches) of the eleventh touch 710 by using the main touch screen 190a and the edge touch screen controller 195. The successive motions of the eleventh touch 710 may be stored in the storage unit 175 under a control of the controller 110. The number of touches contacted on the main touch screen 190a may be singular or plural.

The successive motions (for example, a movement from a first location 710a, a second location 710b, and a third location 710c, to a last location 710d) of the eleventh touch 710 may refer to an eleventh touch gesture detected on the main touch screen 190a. The successive motions (for example, the movement from the first location 710a to the last location 710d) of the eleventh touch 710 may refer to an eleventh touch gesture detected on the main touch screen 190a in a left direction (for example, −x axis direction).

The successive motions (for example, the movement from the first location 710a to the last location 710d) of the eleventh touch 710 may mean that the contact between the main touch screen 190a and the eleventh touch 710 is continuously maintained. Further, in the successive motions of the eleventh touch 710, the contact on the main touch screen 190a may be touch-released at the last location 710d.

The successive motions (for example, the movement from the first location 710a to the last location 710d) of the eleventh touch 710 may refer to an eleventh touch gesture detected from the main touch screen 190a to the first edge touch screen 190b beyond the virtual line 190b1. The successive motions (for example, the movement from the first location 710a to the last location 710d) of the eleventh touch 710 may mean that the contact of the eleventh touch 710 from the main touch screen 190a to the first edge touch screen 190b is continuously maintained. Further, in the successive motions of the eleventh touch 710, the contact on the first edge touch screen 190b may be touch-released at the last location 710d.

Referring to FIG. 7C, the successive motions of the eleventh touch 710 in the left direction from the main touch screen 190a may include drag, drag & drop, flick, or swipe.

In operation S435 of FIG. 4B, successive motions of the twelfth touch are detected.

Referring to FIG. 7C, the controller 110 may detect (or calculate) successive motions (for example, a plurality of X and Y coordinates corresponding to the successive touches) of the twelfth touch 711 by using the main touch screen 190a and the edge touch screen controller 195. The successive motions of the twelfth touch 711 may be stored in the storage unit 175 under a control of the controller 110. The number of touches contacted on the main touch screen 190a may be singular or plural.

The successive motions (for example, a movement from a first location 711a, a second location 711b, and a third location 711c, to a last location 711d) of the twelfth touch 711 may refer to a twelfth touch gesture detected on the main touch screen 190a. The successive motions (for example, the movement from the first location 711a to the last location 711d) of the twelfth touch 711 may refer to a twelfth touch gesture detected on the main touch screen 190a in a right direction (for example, x axis direction).

The successive motions (for example, the movement from the first location 711a to the last location 711d) of the twelfth touch 711 may mean that the contact between the main touch screen 190a and the twelfth touch 711 is continuously maintained. Further, in the successive motions of the twelfth touch 711, the contact on the main touch screen 190a may be touch-released at the last location 711d.

The successive motions (for example, the movement from the first location 711a to the last location 711d) of the twelfth touch 711 may refer to a twelfth touch gesture detected from the main touch screen 190a to the second edge touch screen 190c beyond the virtual line 190c1. The successive motions (for example, the movement from the initial location 711a to the last location 711d) of the twelfth touch 711 may mean that the contact of the twelfth touch 711 from the main touch screen 190a to the second edge touch screen 190c is continuously maintained. Further, in the successive motions of the twelfth touch 711, the contact on the second edge touch screen 190c may be touch-released at the last location 711d.

Referring to FIG. 7C, the successive motions of the twelfth touch 711 in the left direction from the main touch screen 190a may include drag, drag & drop, flick, or swipe.

In operation S436 of FIG. 4B, the successive motions of the eleventh touch are detected on the first edge touch screen, and the successive motions of the twelfth touch are detected on the second edge touch screen.

Referring to FIG. 7C, the eleventh touch 710 successively moving in the left direction (for example, −x axis direction) may arrive at the last location 710d from the first location 710a. The controller 110 may calculate the last location 710d of the eleventh touch 710 moving in the left direction on the first edge touch screen 190b by using the edge touch screen controller 195 and the storage unit 175.

The last location of the eleventh touch 710 successively moving in the right direction may be on the first edge touch screen 190b. The first location 710a of the eleventh touch 710 may be in one area of the main touch screen 190a. The last location of the eleventh touch 710 may be on the first edge touch screen 190b.

The controller 110 may detect the successive motions of the eleventh touch 710 in the left direction by using an allowable slope range (not shown). The controller 110 may calculate a slope between the first location 710*a* of the eleventh touch 710 and the third location 710*c* that is at an intersection point of the eleventh touch 710 and the virtual line 190*b*1 which separates the main touch screen 190*a* and the first edge touch screen 190*b*. An allowable slope range of the successive motions of the eleventh touch 710 on the first edge touch screen 190*b* in the left direction may refer to an area between an extension line corresponding to a slope of +45 degrees in a +x axis direction and an extension line corresponding to a slope of −45 degrees in an x axis direction based on the slope between the first location 710*a* and the intersection point at the third location 710*c*. The slope of −45 degrees in the x axis direction may be limited by the edge area 190*b*2. The allowable slope range may be equal to or smaller than 5, equal to or smaller than 15, equal to or smaller than 25, equal to or smaller than 35, or equal to or smaller than 65, but embodiments are not limited thereto.

In an embodiment of the present disclosure, the last location of the eleventh touch 710 successively moving in the down direction may be in an area within the allowable slope range.

The controller 110 may detect the successive motions of the eleventh touch 710 in the left direction by using a setting area (not shown). The setting area may refer to a semicircle with a radius of 3 cm having the intersection point at the third location 710*c* of the eleventh touch 710 as the center. The semicircle with the radius of 3 cm in an x axis direction may be limited by the edge area 190*b*2. The radius of the setting area may be equal to or smaller than 1 cm, equal to or smaller than 2 cm, equal to or smaller than 3 cm, equal to or smaller than 4 cm, or equal to or smaller than 5 cm. The aforementioned setting area is only an embodiment, and the present disclosure is not limited thereto.

In an embodiment of the present disclosure, the last location of the eleventh touch 710 successively moving in the left direction may be within the setting area. Further, the route from the first location 710*a* to the last location of the eleventh touch 710 successively moving in the left direction may pass through the setting area.

The controller 110 may detect the successive motions of the eleventh touch 710 in the left direction based on a combination of the allowable slope range, the setting area, and a time interval. For example, the controller 110 may detect the successive motions of the eleventh touch 710 in the down direction by using a combination of the allowable slope range and the time interval, and a combination of the setting area and the time interval.

The time interval may refer to an interval between the time of the first location 710*a* of the eleventh touch 710, and the time of the last location 710*d*. For example, the time interval may be equal to or smaller than 500 ms. The time interval may be equal to or smaller than 100 ms, equal to or smaller than 200 ms, equal to or smaller than 300 ms, equal to or smaller than 500 ms, equal to or smaller than 700 ms, or equal to or smaller than 1000 ms, but embodiments are not limited thereto.

In an embodiment of the present disclosure, the last location of the eleventh touch 710 successively moving in the left direction may be in an area within the allowable slope range within the time interval.

In an embodiment of the present disclosure, the last location of the eleventh touch 710 successively moving in the left direction may be within the setting area within the time interval. Further, the route from the first location 710*a* to the last location of the eleventh touch 710 successively moving in the left direction may pass through the setting area within the time interval.

Referring to FIG. 7C, the twelfth touch 711 successively moving in the right direction (for example, x axis direction) may arrive at the last location 711*d* from the first location 711*a*. The controller 110 may calculate the last location 711*d* of the twelfth touch 711 moving in the down direction on the second edge touch screen 190*c* by using the edge touch screen controller 195 and the storage unit 175.

The last location of the twelfth touch 711 successively moving in the right direction may be on the second edge touch screen 190*c*. The first location 711*a* of the twelfth touch 711 may be in one area of the main touch screen 190*a*. The last location of the twelfth touch 711 may be on the second edge touch screen 190*c*.

The controller 110 may detect the successive motions of the twelfth touch 711 in the right direction by using an allowable slope range (not shown). The controller 110 may calculate a slope between the first location 711*a* of the twelfth touch 711 and the third location 711*c* that is at an intersection point of the twelfth touch 711 and the virtual line 190*c*1 which separates the main touch screen 190*a* and the second edge touch screen 190*c*. An allowable slope range of the successive motions of the twelfth touch 711 on the second edge touch screen 190*c* in the left direction may refer to an area between an extension line corresponding to a slope of +45 degrees in a −y axis direction and an extension line corresponding to a slope of −45 degrees in a +y axis direction based on the slope between the first location 711*a* and the intersection point 711*c*. The slope of +45 degrees in the −y axis direction may be limited by the edge area 190*b*2. The allowable slope range may be equal to or smaller than ±5 degrees, equal to or smaller than ±15 degrees, equal to or smaller than ±25 degrees, equal to or smaller than ±35 degrees, or equal to or smaller than ±65 degrees, but embodiments are not limited thereto.

In an embodiment of the present disclosure, the last location of the twelfth touch 711 successively moving in the down direction may be in an area within the allowable slope range.

The controller 110 may detect the successive motions of the twelfth touch 711 in the right direction by using a setting area (not shown). The setting area may refer to a semicircle with a radius of 3 cm having the intersection point 711*c* of the twelfth touch 711 as the center. The semicircle with the radius of 3 cm in a −y axis direction may be limited by the edge area 190*b*2. The radius of the setting area may be equal to or smaller than 1 cm, equal to or smaller than 2 cm, equal to or smaller than 3 cm, equal to or smaller than 4 cm, or equal to or smaller than 5 cm, but embodiments are not limited thereto.

In an embodiment of the present disclosure, the last location of the twelfth touch 711 successively moving in the right direction may be within the setting area. Further, the route from the first location 711*a* to the last location of the twelfth touch 711 successively moving in the left direction may pass through the setting area.

The controller 110 may detect the successive motions of the twelfth touch 711 in the right direction based on a combination of a time interval as well as the allowable slope range and the setting area. For example, the controller 110 may detect the successive motions of the twelfth touch 711 in the down direction by using a combination of the allowable slope range and the time interval and a combination of the setting area and the time interval.

The time interval may refer to an interval between the time of the first location 711*a* of the twelfth touch 711 and the time of the last location 711*d*. For example, the time interval may be equal to or smaller than 500 ms. The time interval may be equal to or smaller than 100 ms, equal to or smaller than 200 ms, equal to or smaller than 300 ms, equal to or smaller than 500 ms, equal to or smaller than 700 ms, or equal to or smaller than 1000 ms, but embodiments are not limited thereto.

In an embodiment of the present disclosure, the last location of the twelfth touch 711 successively moving in the right direction may be in an area within the allowable slope range within the time interval.

In an embodiment of the present disclosure, the last location of the twelfth touch 711 successively moving in the right direction may be within the setting area within the time interval. Further, the route from the first location 711*a* to the last location of the twelfth touch 711 successively moving in the right direction may pass through the setting area within the time interval.

In operation S437 of FIG. 4B, the second screen of the second application, which is executed before the execution of the third application, is displayed.

Figure 7D:
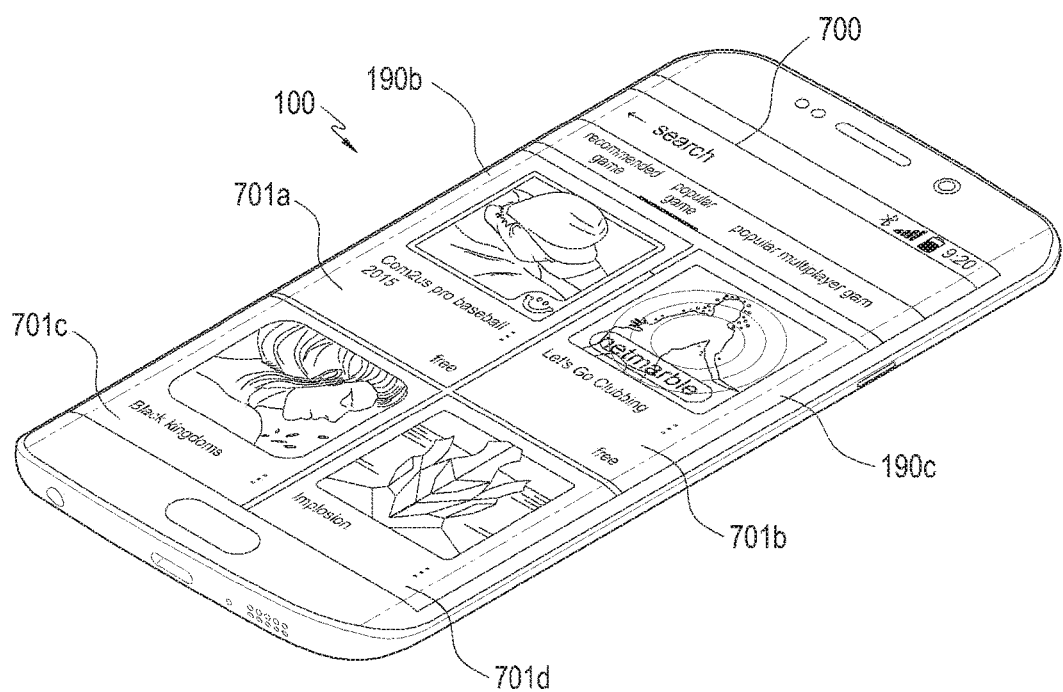

Referring to FIG. 7D, the controller 110 displays the second screen 700 of the second application, which was executed before the execution of the third application, in response to the arrival of the eleventh touch 710 at the first edge touch screen 190*b* of the edge touch screen 190 as in FIG. 7A. The second screen 700 displays a title bar (not shown) for showing a name of the second application (for example, a game market) executed in the portable device 100 and one or more games (for example, games 701*a*, 701*b*, 701*c* and 701*d*) displayed through the second application. The controller 110 displays the second screen of the second application, which is executed before the execution of the third application, in response to the arrival of the twelfth touch 711 at the second edge touch screen 190*c* of the edge touch screen 190.

The controller 110 may display the second screen 700 of the second application, which is executed before the execution of the third application, in response to the arrival of the eleventh touch 710 at the first edge touch screen 190*b* of the edge touch screen 190 and the arrival of the twelfth touch 711 at the second edge touch screen 190*c* of the edge touch screen 190.

When the eleventh touch 710 in the left direction and the twelfth touch 711 in the right direction successively move, the controller 110 may display the second screen 700, which is executed before the execution of the third application, in response to the first arrival of the eleventh touch 710 at the first edge touch screen 190*b*. Further, when the eleventh touch 710 in the left direction and the twelfth touch 711 in the right direction successively move, the controller 110 may display the second screen 700, which is executed before the execution of the third application, in response to the first arrival of the twelfth touch 711 at the second edge touch screen 190*c*.

When the eleventh touch 710 successively moves in the left direction, but the twelfth touch 711 does not move, the controller 110 may display the second screen 700, which is executed before the execution of the third application, in response to the first arrival of the eleventh touch 710 at the first edge touch screen 190*b*. When the twelfth touch 711 successively moves in the right direction, but the eleventh touch does not move, the controller 110 may display the second screen 700, which is executed before the execution of the third application, in response to the first arrival of the twelfth touch 711 at the second edge touch screen 190*c*.

The controller 110 may provide feedback corresponding to the displaying of the second screen 700 of the second application. The provided feedback may be provided as one of a visual feedback, an audible feedback, and a tactile feedback. Further, the controller 110 may provide a combination of the visual feedback, the audible feedback, and the tactile feedback to the user.

Since the feedback corresponding to the displaying of the second screen 700 of the second application in operation S437 of FIG. 4B is substantially similar (for example, a screen difference) to the feedback corresponding to the change to the other screen 520 in operation S407 of FIG. 4A, a duplicate description will be omitted.

When the controller 110 changes the screen to the second screen of the second application in operation S437 of FIG. 4B, the screen changing method of the portable device ends.

Figure 4C:
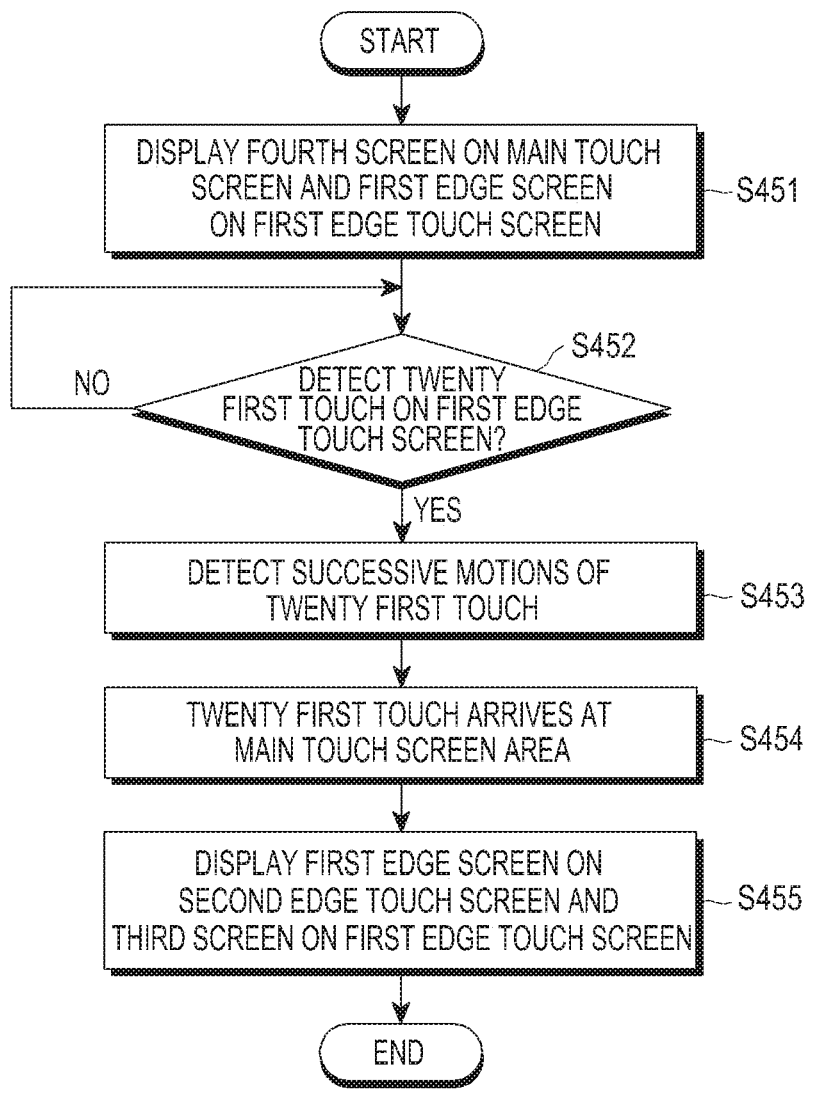
FIG. 4C is a flowchart illustrating a screen changing method of a portable device according to an embodiment of the present disclosure.

FIG. 4C is a flowchart illustrating a screen changing method of a portable device according to another embodiment of the present disclosure.

In operation S451 of FIG. 4C, a fourth screen is displayed on the main touch screen and a first edge screen is displayed on the first edge touch screen.

Figure 8A:
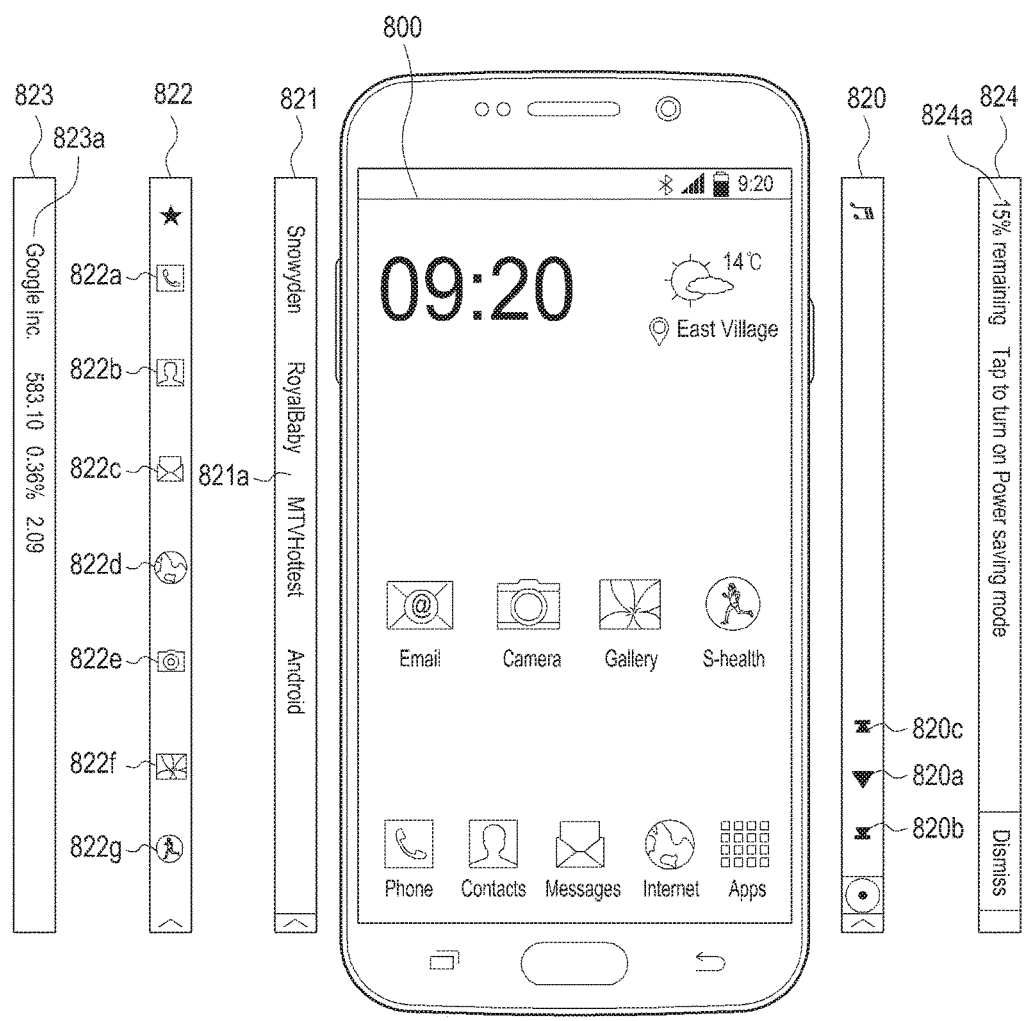
FIGS. 8A to 8F illustrate screens of a portable device according to another embodiment of the present disclosure.
Figure 8B:
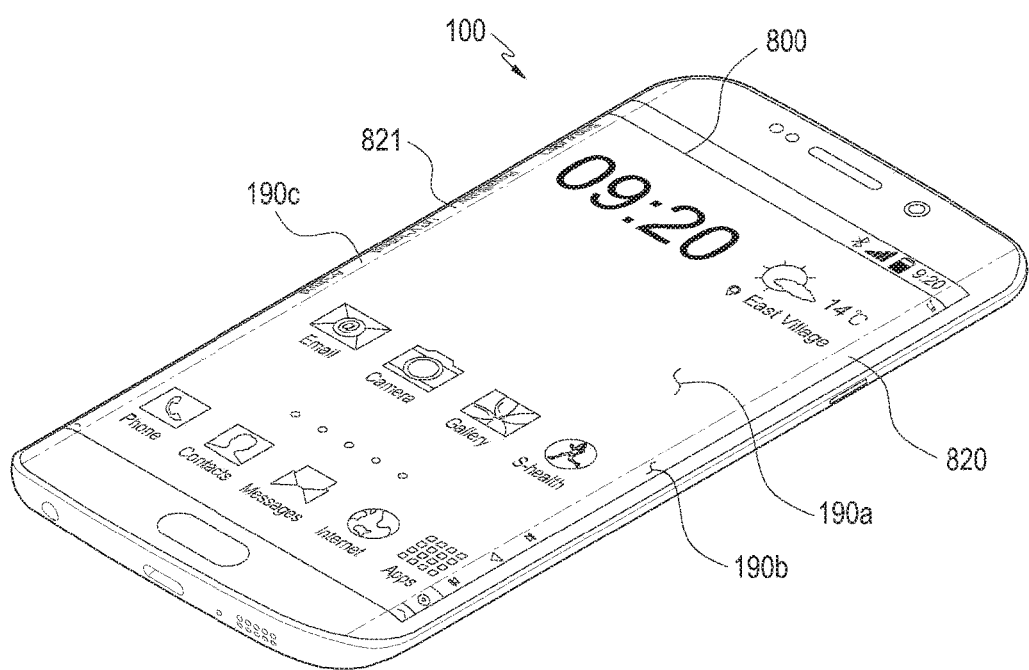

Referring to FIGS. 8A and 8B, a fourth screen 800 is displayed on the main touch screen 190*a* of the portable device 100 and a first edge screen 820 is displayed on the first edge touch screen 190*b*. FIG. 8A illustrates a screen display of the main edge touch screen and at opposite sides thereof, illustrates several screen displays of the first (left) and second (right) edge touch screen. The screen displays of the first (left) and second (right) edge touch screen are rotated and presented in a flat manner to simplify descriptions. In contrast to FIG. 1, the positions of the first edge touch screen 190*b* and the second edge touch screen 190*c* in FIGS. 8A to 8F are reversed.

The controller 110 may display edge screens 820, 821, 822, 823 and 824 on the edge touch screens 190*b* and 190*c*, as well as the fourth screen 800 on the main touch screen 190*a*.

The plurality of edge screens 820 to 824 displayed on the edge touch screens 190*b* and 190*c* may be screens of applications executed in the portable device 100 or screens of widgets. The edge screens 820 to 824 may have sizes corresponding to the sizes of the edge touch screens 190*b* and 190*c*.

For example, a music edge screen corresponding to the first edge screen 820 may be a reduced control panel of a music player (not shown). The first edge screen 820 may include a play button 820*a*, a next button 820*b*, or a previous button 820*c*. The music player may be controlled through the first edge screen 820. The buttons displayed on the first edge screen 820 are only examples, and the present disclosure is not limited thereto. Further, the first edge screen 820 may be a reduced control panel of a video player (not shown). When the video player is played, the reduced control panel may be displayed on the edge touch screen 190*b* or 190*c*.

A social network edge screen 821 corresponding to the second edge screen may be a screen of a SNS application. A received message 821*a* of the SNS application received through the second edge screen 821 may be displayed.

A preference edge screen 822 corresponding to a third edge screen may display short cut icons 822*a*, 822*b*, 822*c*, 822*d*, 822*e*, 822*f* and 822*g* corresponding to preferred applications among the applications installed in the portable device 100. When one of the short cut icons 822*a* to 822*g* displayed on the third edge screen 822 is selected, the controller 110 may display an application corresponding to the short cut icon on the main touch screen 190a.

A stock edge screen 823 corresponding a fourth edge screen may display information of a preferred item 823a, such as in a stock application. The information (or quotes) may include an offer price, a bid price, a current price, or a price compared to the previous day's price.

A battery edge screen 824 corresponding to a fifth edge screen may display a residual battery amount 824a. Further, the battery edge screen 824 may display an available battery use time (for example, 15 min).

The controller 110 may revolve the plurality of edge screens 820 to 824 according to a user input. For example, two edge screens may be displayed on the two edge touch screens 190b and 190c. The remaining edge screens, which are not displayed, may be revolved to take the place of previous screens in order for each screen to be displayed according to one of a repeating first order (for example, 820→821→822→823→824→820→821→822→823→824) and a repeating second order (for example, 824→823→822→821→820→824→823→822→821→820).

When the edge screens are revolved according to the first order, the controller 110 may sequentially display the edge screens from the first edge screen 820 to the fifth edge screen 824 on the two edge touch screens 190b and 190c in accordance with a user input. When the edge screens are revolved according to the first order, the controller 110 may sequentially display the edge screens from the first edge screen 820 to the fifth edge screen 824 on the two edge touch screens 190b and 190c in accordance with a user input.

Referring to FIG. 8B, the controller 110 may display the fourth screen 800 on the main touch screen 190a. The controller 110 may display the first edge screen 820 on the first edge touch screen 190b and the second edge screen 821 on the second edge touch screen 190c. The edge touch screens and the edge screens displayed on the edge touch screens are only examples, and it is easily understood by those skilled in the art that the edge touch screens and the edge screens can be variously changed.

In operation S452 of FIG. 4B, a twenty first touch is detected on the first edge touch screen.

Figure 8C:
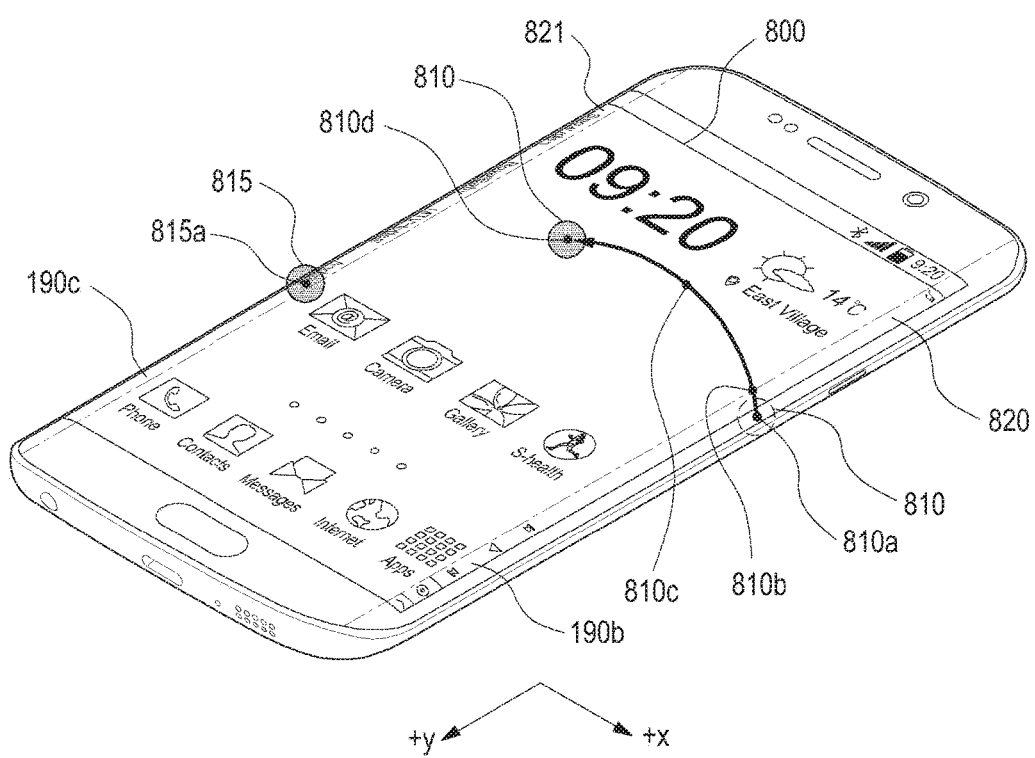

Referring to FIG. 8C, the user conducts a twenty first touch 810 on the first edge touch screen 190b. The controller 110 may detect the twenty first touch 810 by using the edge touch screen 190 and the edge touch screen controller 195. Further, the controller 110 may detect the twenty first touch 810 by using the first edge touch screen 190b and the edge touch screen controller 195. The controller 110 may calculate a twenty first touch location 810a (for example, X21 and Y21 coordinates) corresponding to the twenty first touch 810 by using an electrical signal received from the edge touch screen controller 195.

The controller 110 may store twenty first touch location information corresponding to the twenty first touch location 810a in the storage unit 175. The stored twenty first touch location information may include a touch ID, a touch location, a touch detection time, or touch information (for example, a touch pressure, touch direction, and touch duration time) for history management.

Since the detection of the twenty first touch in operation S452 of FIG. 4C is substantially similar (for example, a touch difference) to the detection of the first touch in operation S402 of FIG. 4A, a duplicate description will be omitted.

In another embodiment of the present disclosure, when the portable device 100 is grasped by the user's left hand (or right hand), the twenty first touch 810 may be input by the thumb. Further, another touch 815 may be detected on the second edge touch screen 190c by one of the remaining fingers except for the thumb. Since the detection of the other touch 815 and calculation of a location 815a of the other touch are substantially similar (for example, a touch difference) to the detection of the twenty first touch 810 and calculation of a location 810a of the twenty first touch, a duplicate description will be omitted.

When successive motions of the twenty first touch 810 are detected, the portable device 100 may be supported by the other touch 815 (for example, a reaction of the successive motions of the twenty first touch). Further, when the successive motions of the twenty first touch 810 are detected, the other touch 815 may maintain the contact on the second edge touch screen 190c.

In operation S453 of FIG. 4C, the successive motions of the twenty first touch are detected.

Referring to FIG. 8C, the controller 110 may detect (or calculate) the successive motions (for example, a plurality of X and Y coordinates corresponding to the successive touches) of the twenty first touch 810 by using the first edge touch screen 190b and the edge touch screen controller 195. The successive motions of the twenty first touch 810 may be stored in the storage unit 175 under a control of the controller 110. The number of touches contacted on the first edge touch screen 190b may be singular or plural.

The successive motions (for example, a movement from a first location 810a, a second location 810b, and a third location 810c, to a last location 810d) of the twenty first touch 810 may refer to a twenty first touch gesture detected on the first edge touch screen 190b. The successive motions (for example, the movement from the first location 810a to the last location 810d) of the twenty first touch 810 may refer to a twenty first touch gesture detected on the first edge touch screen 190b in a left direction (for example, −x axis direction).

The successive motions (for example, the movement from the first location 810a to the last location 810d) of the twenty first touch 810 may mean that the contact between the first edge touch screen 190b and the twenty first touch 810 is continuously maintained. Further, in the successive motions of the twenty first touch 810, the contact on the first edge touch screen 190b may be touch-released at the last location 810d.

Since the detection of the successive motions of the twenty first touch in operation S453 of FIG. 4C is substantially similar (for example, a touch difference) to the detection of the successive motions of the first touch in operation S404 of FIG. 4A, a duplicate description will be omitted.

In operation S454 of FIG. 4C, the twenty first touch arrives at the main touch screen.

Referring to FIG. 8C, the twenty first touch 810 successively moving in the main touch screen direction (for example, −x axis direction) may arrive at the last location 810d from the first location 810a. The controller 110 may calculate the last location 810d of the twenty first touch 810 moving in the main touch screen direction on the main touch screen 190a by using the edge touch screen controller 195 and the storage unit 175.

The last location of the twenty first touch 810 successively moving in the main touch screen direction may be different according to a route and/or a movement distance of the successive motions of the twenty first touch 810. For example, the last location of the twenty first touch 810 successively moving in the left direction may be one of 810b, 810c, and 810d, included along the route of the successive motions of the twenty first touch 810. Further, when the movement distance of the successive motions of the twenty first touch 810 is short, the last location of the twenty first touch 810 successively moving in the left direction may be the location 810*b*. When the movement distance of the successive motions of the twenty first touch 810 is long, the last location of the twenty first touch 810 successively moving in the left direction may be the location 810*d* or 810*c*.

The route of the successive motions of the twenty first touch 810 moving from the first edge touch screen 190*b* to the main touch screen 190*a* may be a curved line. The route of the twenty first touch 810 successively moving from the first edge touch screen 190*b* to the main touch screen 190*a* may be a curved line following a curvature of the first edge touch screen 190*b*.

The controller 110 may detect the arrival of the twenty first touch 810 moving in the left direction at the main touch screen 190*a* by using an allowable slope range. The controller 110 may calculate a slope of a straight line (or arc) connecting the first location 810*a* and the last location 810*b*, 810*c*, or 810*d* of the twenty first touch 810.

Since the detection of the arrival of the twenty first touch 810 at the main touch screen 190*a* using the allowable slope range in operation S454 of FIG. 4C is substantially similar to the detection of the successive motions of the first touch 510 in the left direction using the allowable slope range in operation S410 of FIG. 4A, a duplicate description will be omitted.

In an embodiment of the present disclosure, the last location of the twenty first touch 810 successively moving in the direction of the main touch screen 190*a* may be in an area within the allowable slope range. In an embodiment of the present disclosure, the last location of the twenty first touch 810 successively moving in the main touch screen direction may be on the main touch screen 190*a*.

The controller 110 may detect the arrival of the twenty first touch 810 moving in the left direction at the main touch screen 190*a* by using a setting area. The setting area may refer to a semicircle with a radius of 3 cm having the first location 810*a* of the twenty first touch 810 as the center in a y axis direction.

Since the detection of the arrival of the twenty first touch 810 moving in the left direction at the main touch screen 190*a* using the setting area in operation S454 of FIG. 4C is substantially similar to the detection of the arrival of the last location of the first touch 510 successively moving in the left direction in operation S410 of FIG. 4A, a duplicate description will be omitted.

In an embodiment of the present disclosure, the last location of the twenty first touch 810 successively moving in the main touch screen direction may be within the setting area. In an embodiment of the present disclosure, the last location of the twenty first touch 810 successively moving in the main touch screen direction may be on the main touch screen 190*a*. Further, the route from the first location 810*a* to the last location 810*d* of the twenty first touch 810 successively moving in the main touch screen direction may pass through the setting area.

The controller 110 may detect the successive motions of the twenty first touch 810 in the main touch screen direction based on a combination of a time interval as well as the allowable slope range and the setting area. For example, the controller 110 may detect the successive motions of the twenty first touch 810 in the main touch screen direction by using a combination of the allowable slope range and the time interval and a combination of the setting area and the time interval.

Since the detection of the arrival of the twenty first touch 810 at the main touch screen 190*a* using the combination of the allowable slope range and the time interval and the combination of the setting area and the time interval in operation S454 of FIG. 4C is substantially similar to the detection of the arrival of the last location of the first touch 510 successively moving in the left direction using the combination of the allowable slope range and the time interval, and the combination of the setting area and the time interval in operation S410 of FIG. 4A, a duplicate description will be omitted.

In an embodiment of the present disclosure, the last location of the twenty first touch 810 on the main touch screen 190*a* may be in an area within the allowable slope range within the time interval.

In an embodiment of the present disclosure, the last location of the twenty first touch 810 on the main touch screen 190*a* may be within the setting area within the time interval. Further, the route from the first location 810*a* to the last location of the twenty first touch 810 on the main touch screen 190*a* may pass through the setting area within the time interval.

The controller 110 may provide feedback corresponding to the arrival of the twenty first touch 810 at the main touch screen 190*a* to the user. The provided feedback may be provided as one of a visual feedback, an audible feedback, and a tactile feedback. Further, the controller 110 may provide a combination of the visual feedback, the audible feedback, and the tactile feedback to the user.

Since the feedback corresponding to the arrival of the twenty first touch 810 at the main touch screen 190*a* in operation S454 of FIG. 4C is substantially similar (for example, a direction difference) to the feedback corresponding to the arrival at the last location of the first touch 510 successively moving in the left direction in operation S410 of FIG. 4A, a duplicate description will be omitted.

Figure 8D:
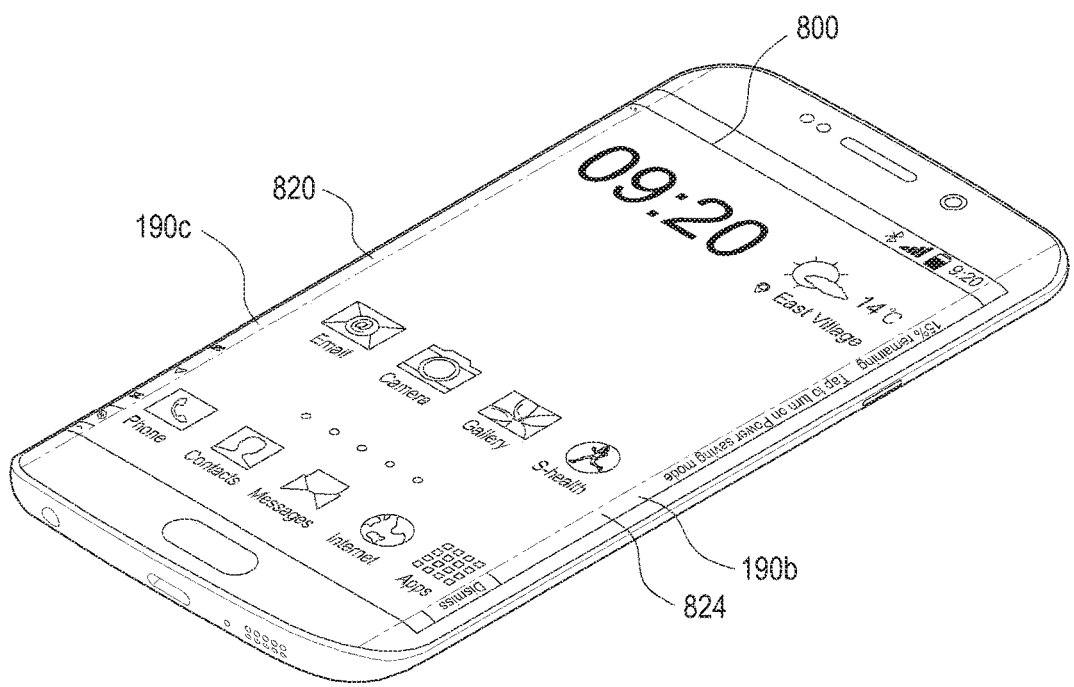
Figure 8E:
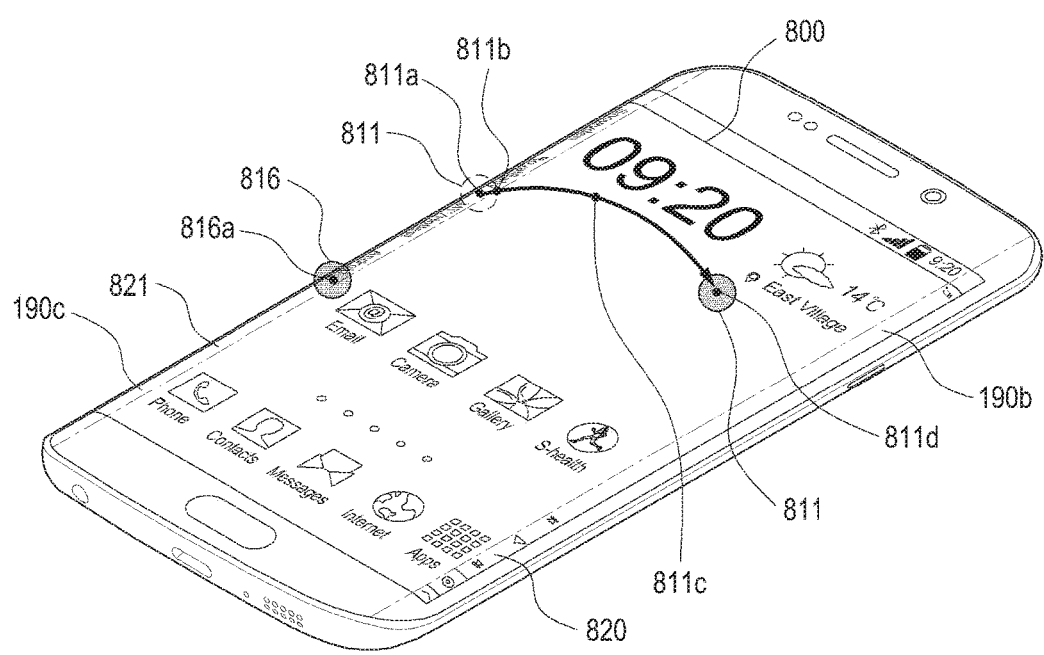

Referring to FIG. 8E, in another embodiment of the present disclosure, a twenty second touch 811 may be detected on the second edge touch screen 190*c*. Successive motions (for example, from a first location 811*a*, a second location 811*b*, a third location 811*c*, to a last location 811*d*) of the twenty second touch 811 may be detected. The arrival of the twenty second touch 811 successively moving may be detected on the main touch screen 190*a*.

Since the detection of the arrival of the twenty second touch 811 at the main touch screen 190*a* from the second edge touch screen 190*c* in FIG. 8E is substantially similar (for example, a touch difference) to the detection of the arrival of the twenty second touch 811 at the main touch screen 190*a* from the first edge touch screen 190*b* in FIG. 8C, a duplicate description will be omitted.

In operation S455 of FIG. 4C, the first edge screen is displayed on the second edge touch screen and the third edge screen is displayed on the first edge touch screen.

Referring to FIG. 8D, the controller 110 may display the first edge screen 820 on the second edge touch screen 190*c* and the fifth edge screen 824 on the first edge touch screen in response to the arrival of the twenty first touch 810 at the main touch screen 190*a*.

The controller 110 may display the first edge screen 820 displayed on the first edge touch screen 190*b* on the second edge touch screen 190*c*. Further, the controller 110 may display the fifth edge screen 824 on the first edge touch screen 190*b* in response to the movement of the first edge screen 820 displayed on the first edge touch screen 190b to the second edge touch screen 190c.

The controller 110 may provide feedback corresponding to the change to the other screen. The provided feedback may be provided as one of a visual feedback, an audible feedback, and a tactile feedback. Further, the controller 110 may provide a combination of the visual feedback, the audible feedback, and the tactile feedback to the user.

Since the feedback corresponding to the displaying of the other edge screen 821 in operation S455 of FIG. 4C is substantially similar (for example, a screen difference) to the feedback corresponding to the change to the other screen 520 in operation S407 of FIG. 4A, a duplicate description will be omitted.

Figure 8F:
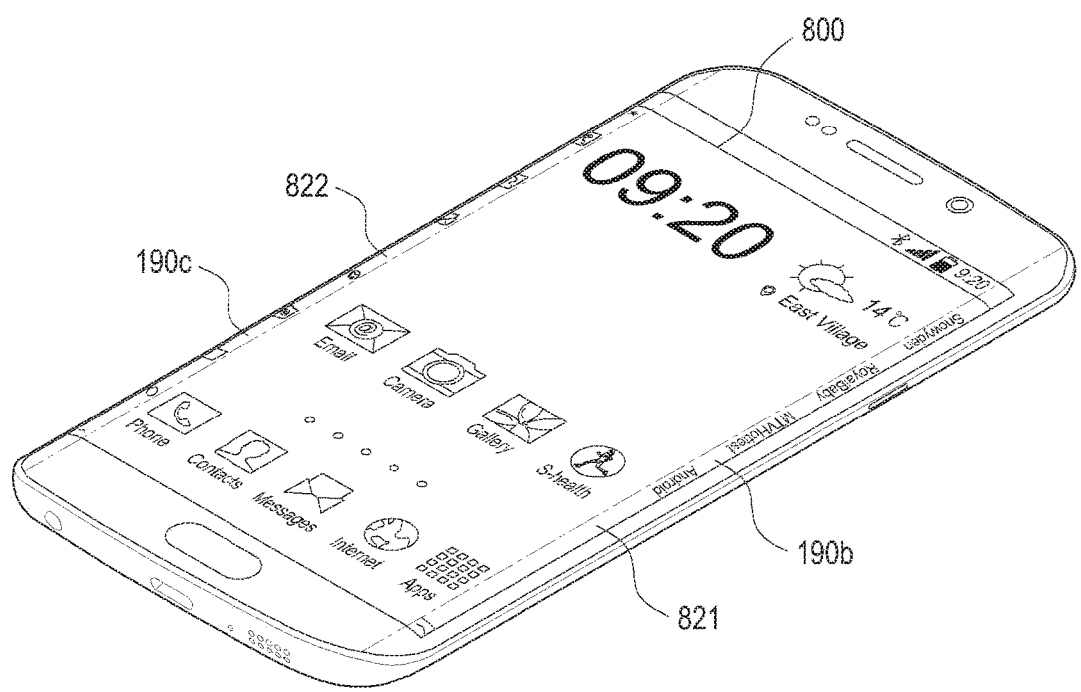

Referring to FIG. 8F, in another embodiment of the present disclosure, the controller 110 may display the third edge screen 822 on the second edge touch screen 190c and the second edge screen 821 on the first edge touch screen 190b in response to the arrival of the successively moving twenty second touch 811 at the main touch screen 190a.

When the controller 110 displays the other edge screen 821 in response to the successive motions of the twenty first touch 810 in operation S455 of FIG. 4C, the screen changing method of the portable device ends.

The methods according to the various embodiments of the present disclosure may be in a form of program commands executed through various computer means to be recorded in a non-transitory computer readable medium. The computer readable medium may include a program command, a data file, a data structure, and the like independently or in combination. The computer readable medium may be stored, for example, in a volatile or non-volatile storage device such as a ROM, a memory such as a RAM, a memory chip, a memory device, a memory integrated chip (IC), or a storage medium that is optically or magnetically recordable and simultaneously machine (for example, a computer)-readable, such as a compact disc (CD), a digital versatile disc (DVD), a magnetic disk, or a magnetic tape, regardless of its ability to be erased or re-recorded.

It is appreciated that the storage unit included in the portable device is one example of the machine-readable storage media suitable for storing a program or programs including commands for implementing various embodiments of the present disclosure. The program command recorded in the medium may be things specially designed and configured for the present disclosure, or things that are well known to and can be used by those skilled in the computer software related art.

Although the present disclosure has been described by the embodiments and the drawings as described above, the present disclosure is not limited to the aforementioned embodiments, and various modifications and alterations can be made from the descriptions by those skilled in the art to which the present disclosure pertains.

While the present disclosure has been shown and described with reference to various embodiments thereof, it will be understood by those skilled in the art that various changes in form and detail may be made therein without departing from the spirit and scope of the present disclosure as defined by the appended claims and their equivalents.

What is claimed is:

1. A portable device, comprising:
   an edge touch screen that has a main display area, a left edge display area, and a right edge display area, each of the left edge display area and the right edge display area being extended from the main display area; and
   at least one processor configured to:
   control each of the main display area, the left edge display area, and the right edge display area to display a first screen among a plurality of screens, and
   based on a first direction of successive motions of a first touch detected over a first portion of the first screen on the left edge display area and a second direction of successive motions of a second touch detected over a second portion of the first screen on the right edge display area, control to display a second screen different from the first screen among the plurality of screens on the edge touch screen,
   wherein the at least one processor is further configured to detect the first direction of the successive motions of the first touch and the second direction of the successive motions of the second touch by using one of an allowable slope or a setting area.

2. The portable device of claim 1, wherein the at least one processor is further configured to detect the successive motions of the first touch starting from a first location of the first touch detected on the left edge display area and arriving at a last location.

3. The portable device of claim 2, wherein the at least one processor is further configured to control a display of one of an initial screen and a last screen among the plurality of screens on the edge touch screen in accordance with a direction of the successive motions of the first touch and a direction of the successive motions of the second touch.

4. The portable device of claim 2, wherein the second screen comprises one of the plurality of screens displayed according to a determined order.

5. The portable device of claim 2, wherein the last location of the first touch is on one of the main display area or the first edge display area.

6. The portable device of claim 2, wherein a last location of the second touch is on one of the main display area or the second edge display area.

7. The portable device of claim 1, wherein a route of the successive motions of the first touch includes one of a straight line or a curved line.

8. The portable device of claim 7, wherein the last location of the first touch, of which the route of the successive motions is the curved line following a curvature of the first edge display area, is on the main display area.

9. The portable device of claim 1, wherein a route of the successive motions of the second touch includes one of a straight line or a curved line.

10. The portable device of claim 9, wherein a last location of the second touch, of which the route of the successive motions is the curved line following a curvature of the first edge display area, is on the main display area.

11. The portable device of claim 2, wherein the at least one processor is further configured to provide feedback corresponding to at least one of an arrival at the last location of the first touch successively moving or an arrival at a last location of the second touch successively moving.

12. The portable device of claim 11, wherein the feedback is provided as one of a visual feedback, an audible feedback, or a tactile feedback.

13. The portable device of claim 1, wherein the at least one processor is further configured to, based on the first direction of the successive motions of the first touch detected on the left edge display area and the second direction of the successive motions of the second touch detected on the right edge display area, control a display of a third screen different from the first screen and the second screen among the plurality of screens for a determined time before displaying the second screen different from the first screen among the plurality of screens on the edge touch screen.

14. The portable device of claim 1, wherein the at least one processor is further configured to, when one of the detected first touch and second touch successively moves but the other is fixed and in response to the first touch detected on the left edge display area and second touch detected on the right edge display area, control a display of the second screen different from the first screen among the plurality of screens on the edge touch screen.

15. A method of changing a screen of a portable device, the method comprising:
    detecting a first direction of successive motions of a first touch detected on a first edge display area displaying a first portion of a first screen on an edge touch screen that has a main display area, the first edge display area, and a second edge display area, each of the first edge display area and the second edge display area being extended from the main display area;
    controlling each of the main display area, the first edge display area, and the second edge display area to display the first screen among a plurality of screens;
    detecting a second direction of successive motions of a second touch detected on the second edge display area displaying a second portion of the first screen; and
    based on at least one of the detected first direction of successive motions of the first touch or the detected second direction of successive motions of the second touch, displaying a second screen different from the first screen among the plurality of screens on the edge touch screen,
    wherein the first direction of successive motions of the first touch and the second direction of successive motions of the second touch are detected by using one of an allowable slope or a setting area.

16. The method of claim 15, further comprising displaying one of an initial screen or a last screen among the plurality of screens on the edge touch screen in accordance with a direction of the successive motions of the first touch and a direction of the successive motions of the second touch.

17. The method of claim 15, further comprising:
    providing feedback in accordance with one of the direction of the successive motions of the first touch or the direction of the successive motions of the second touch, wherein the feedback includes at least one of a visual feedback, an audible feedback, or a tactile feedback.

18. A portable device, comprising:
    an edge touch screen that has a main display area, a left edge display area, and a right edge display area, each of the left edge display area and the right edge display area being extended from the main display area; and
    at least one processor configured to:
        control each of the main display area, the left edge display area, and the right edge display area to display a first screen among a plurality of screens, and
        control a determined function in accordance with a combination of a direction of successive motions of a first touch detected on the left edge display area displaying a first portion of the first screen and a direction of successive motions of a second touch detected on the right edge display area displaying a second portion of the first screen,
    wherein the at least one processor is further configured to detect the direction of the successive motions of the first touch and the direction of the successive motions of the second touch by using one of an allowable slope or a setting area.

19. The portable device of claim 18, wherein the determined function includes one of:
    a first function for, when the direction of the detected successive motions of the first touch and the direction of the detected successive motions of the second touch in the right edge display area correspond to a first direction, changing the first screen to an initial screen among the plurality of screens,
    a second function for, when the direction of the detected successive motions of the first touch and the direction of the detected successive motions of the second touch in the right edge display area correspond to a second direction, changing the first screen to a last screen among the plurality of screens, or
    a third function for, when the direction of the detected successive motions of the first touch and the direction of the detected successive motions of the second touch in the right edge display area correspond to a third direction, capturing the first screen.

* * * * *